US008702049B2

(12) United States Patent
Vieira

(10) Patent No.: US 8,702,049 B2
(45) Date of Patent: Apr. 22, 2014

(54) ERGONOMIC SPACE-SAVING CUSTOMIZABLE WORKSTATION

(76) Inventor: Benedict Vieira, Brampton (CA)

( * ) Notice: Subject to any disclaimer, the term of this patent is extended or adjusted under 35 U.S.C. 154(b) by 39 days.

(21) Appl. No.: 13/607,808

(22) Filed: Sep. 10, 2012

(65) Prior Publication Data

US 2014/0070059 A1  Mar. 13, 2014

(51) Int. Cl.
*A47G 29/02* (2006.01)
(52) U.S. Cl.
USPC ......... 248/245; 248/125.1; 312/408; 108/108
(58) Field of Classification Search
USPC .............. 248/280.11, 245, 125.1, 122.1; 108/108; 297/217.3, 188.21; 312/408
See application file for complete search history.

(56) References Cited

U.S. PATENT DOCUMENTS

| | | | | |
|---|---|---|---|---|
| 3,256,658 A * | 6/1966 | Seery | ............................... | 52/292 |
| 3,885,846 A * | 5/1975 | Chuang et al. | ................. | 312/306 |
| 4,365,561 A * | 12/1982 | Tellier et al. | ....................... | 108/7 |
| 4,516,751 A * | 5/1985 | Westbrook | ................. | 248/279.1 |
| 4,527,942 A * | 7/1985 | Smith | ........................... | 414/590 |
| 4,614,273 A * | 9/1986 | Ishii | ............................... | 211/183 |
| 4,638,969 A * | 1/1987 | Brown | ........................ | 248/122.1 |
| 4,753,354 A * | 6/1988 | Patterson et al. | ............... | 211/26 |
| 4,779,922 A * | 10/1988 | Cooper | .................... | 297/188.21 |
| 4,848,710 A * | 7/1989 | Newman | ........................ | 248/129 |
| 4,895,331 A * | 1/1990 | Nehls | ............................ | 248/245 |
| 5,154,385 A * | 10/1992 | Lindberg et al. | ......... | 248/225.11 |
| 5,609,316 A * | 3/1997 | Tigliev | ..................... | 248/123.11 |
| 5,630,566 A * | 5/1997 | Case | .......................... | 248/122.1 |
| 5,645,177 A * | 7/1997 | Lin | ............................... | 211/70.6 |
| 5,709,365 A * | 1/1998 | Howard | ........................ | 248/454 |
| 5,738,316 A * | 4/1998 | Sweere et al. | ............ | 248/123.11 |
| 5,772,174 A * | 6/1998 | Hirsch et al. | ............... | 248/447.1 |
| 5,779,209 A * | 7/1998 | Rello | .......................... | 248/278.1 |
| 5,786,008 A * | 7/1998 | Humphry et al. | ............... | 426/89 |
| 5,918,841 A * | 7/1999 | Sweere et al. | ........... | 248/123.11 |
| 6,045,179 A * | 4/2000 | Harrison | .................... | 297/188.2 |
| 6,105,794 A * | 8/2000 | Bauer | ........................ | 211/94.01 |
| 6,286,794 B1 * | 9/2001 | Harbin | ........................ | 248/123.2 |
| 6,425,631 B1 * | 7/2002 | Lin | ............................... | 297/173 |
| 6,540,093 B1 * | 4/2003 | Shumway | .................. | 211/90.02 |
| 6,712,008 B1 * | 3/2004 | Habenicht et al. | .............. | 108/96 |
| 7,063,296 B2 * | 6/2006 | Williams | .................... | 248/285.1 |
| 7,134,719 B2 * | 11/2006 | Moglin et al. | ............. | 297/217.3 |
| 7,195,213 B2 * | 3/2007 | Weatherly | .................. | 248/125.1 |
| 7,322,653 B2 * | 1/2008 | Dragusin | .................... | 297/300.3 |
| 7,798,339 B2 * | 9/2010 | Brooks et al. | ................. | 211/103 |
| 7,823,973 B2 * | 11/2010 | Dragusin | ................... | 297/217.3 |
| 7,828,252 B2 * | 11/2010 | Parsons | ..................... | 248/125.1 |
| 8,191,487 B2 * | 6/2012 | Theesfeld et al. | ....... | 108/144.11 |
| 8,226,184 B2 * | 7/2012 | Kang et al. | .................... | 312/408 |
| 8,403,274 B1 * | 3/2013 | Parsons | ..................... | 248/125.1 |
| 8,529,001 B2 * | 9/2013 | Calvillo et al. | ............... | 312/408 |
| 8,567,735 B2 * | 10/2013 | Burgess et al. | .......... | 248/280.11 |

(Continued)

*Primary Examiner* — Terrell McKinnon
*Assistant Examiner* — Daniel J Breslin

(57) ABSTRACT

An ergonomic portable space saving workstation includes at least one rail, at least one support arm connected to the rail for supporting different types of components, and a mounting interface connected to the rail for connecting the rail to a wall, desktop, or wheel mount. The workstation can be used by individuals in lying, sitting, or standing positions and used with objects of various sizes and shapes, such as computer keyboards, monitors, notebooks, desktop computers, footrests, printers, fax machines, projectors, televisions, canvases, desktop surfaces, whiteboards, or chalkboards. The support arm can be adjusted vertically and horizontally to facilitate use in various positions and with various objects.

16 Claims, 57 Drawing Sheets

(56) References Cited

U.S. PATENT DOCUMENTS

2006/0207480 A1\* 9/2006 Knight ........................ 108/50.01
2008/0073946 A1\* 3/2008 Maione ......................... 297/161
2010/0201165 A1\* 8/2010 Dankovich .................... 297/135

\* cited by examiner

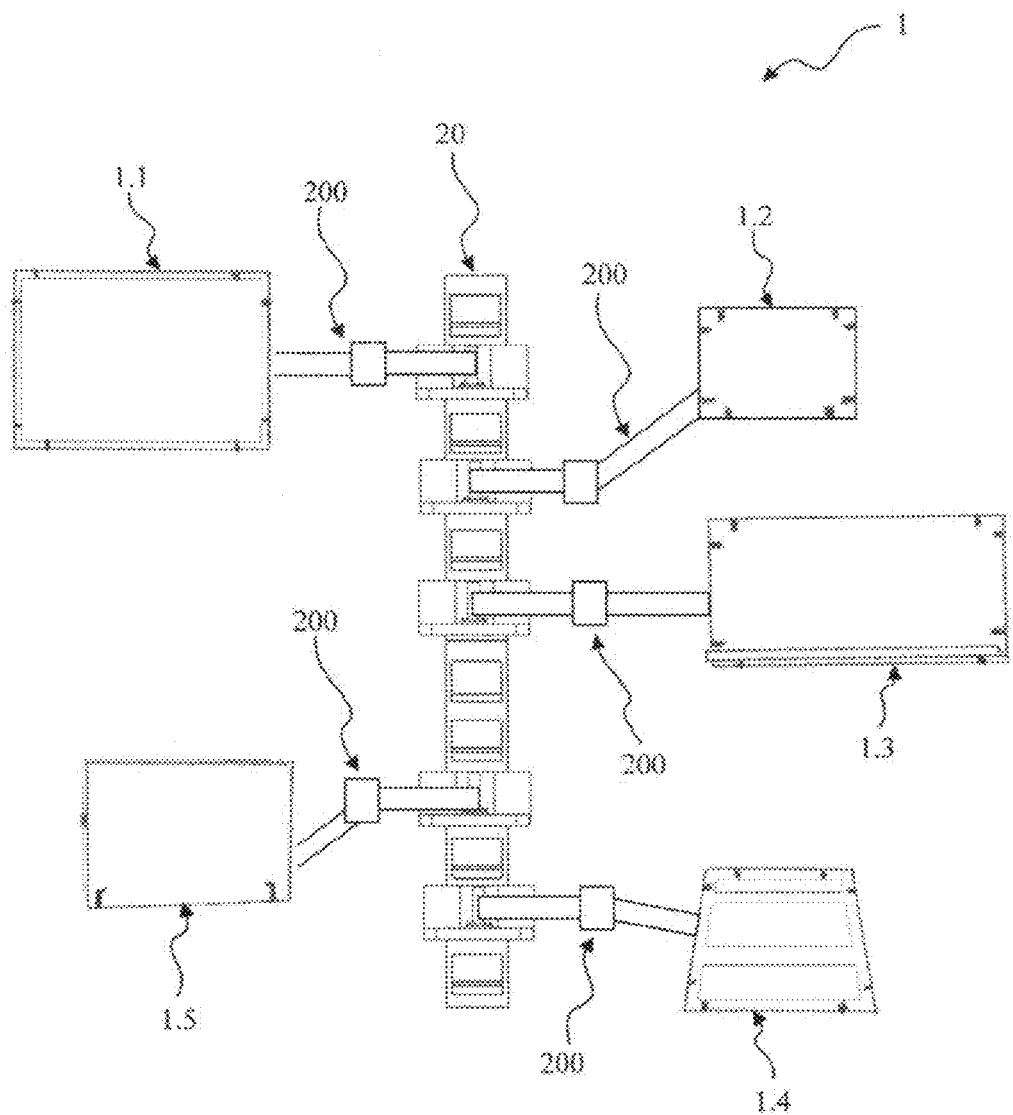

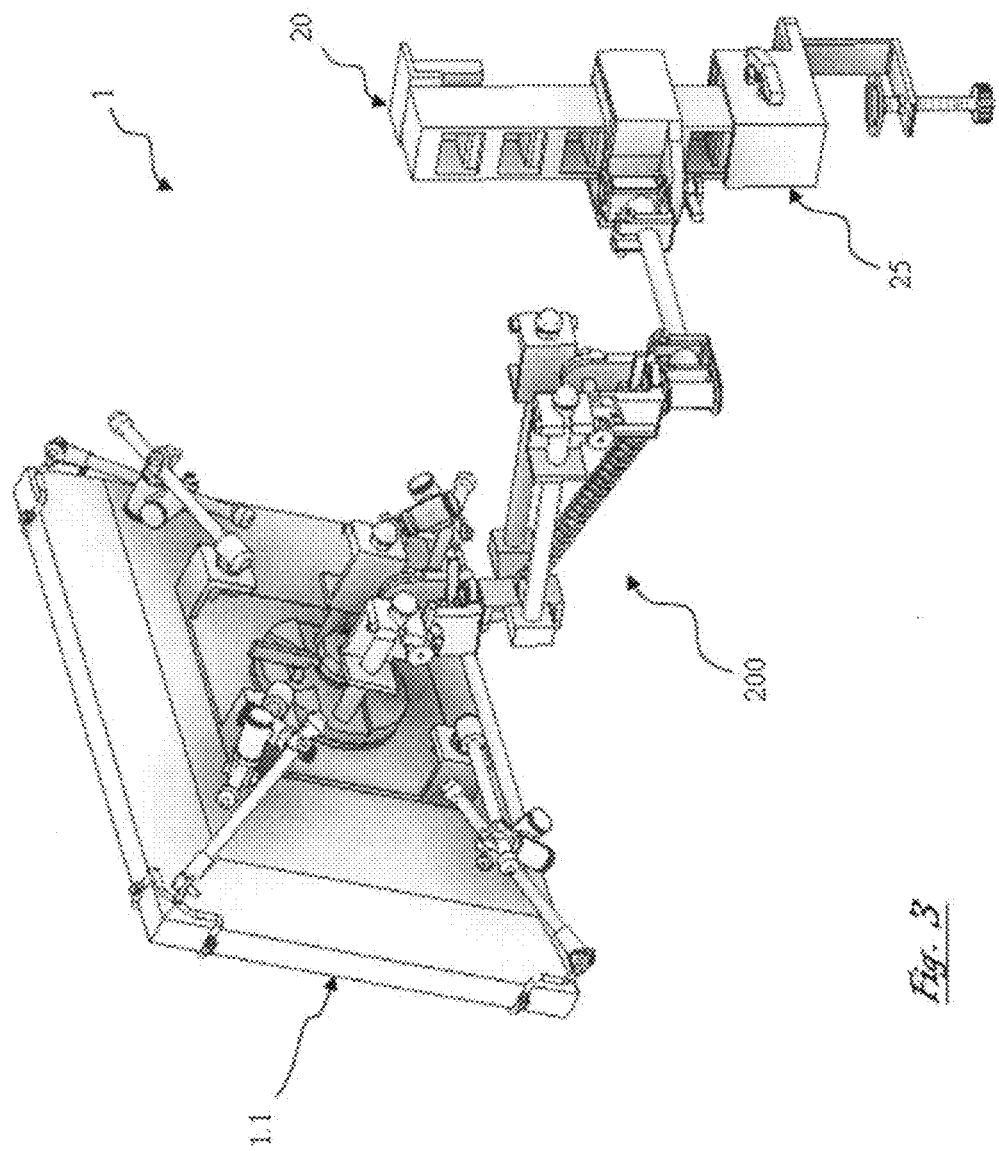

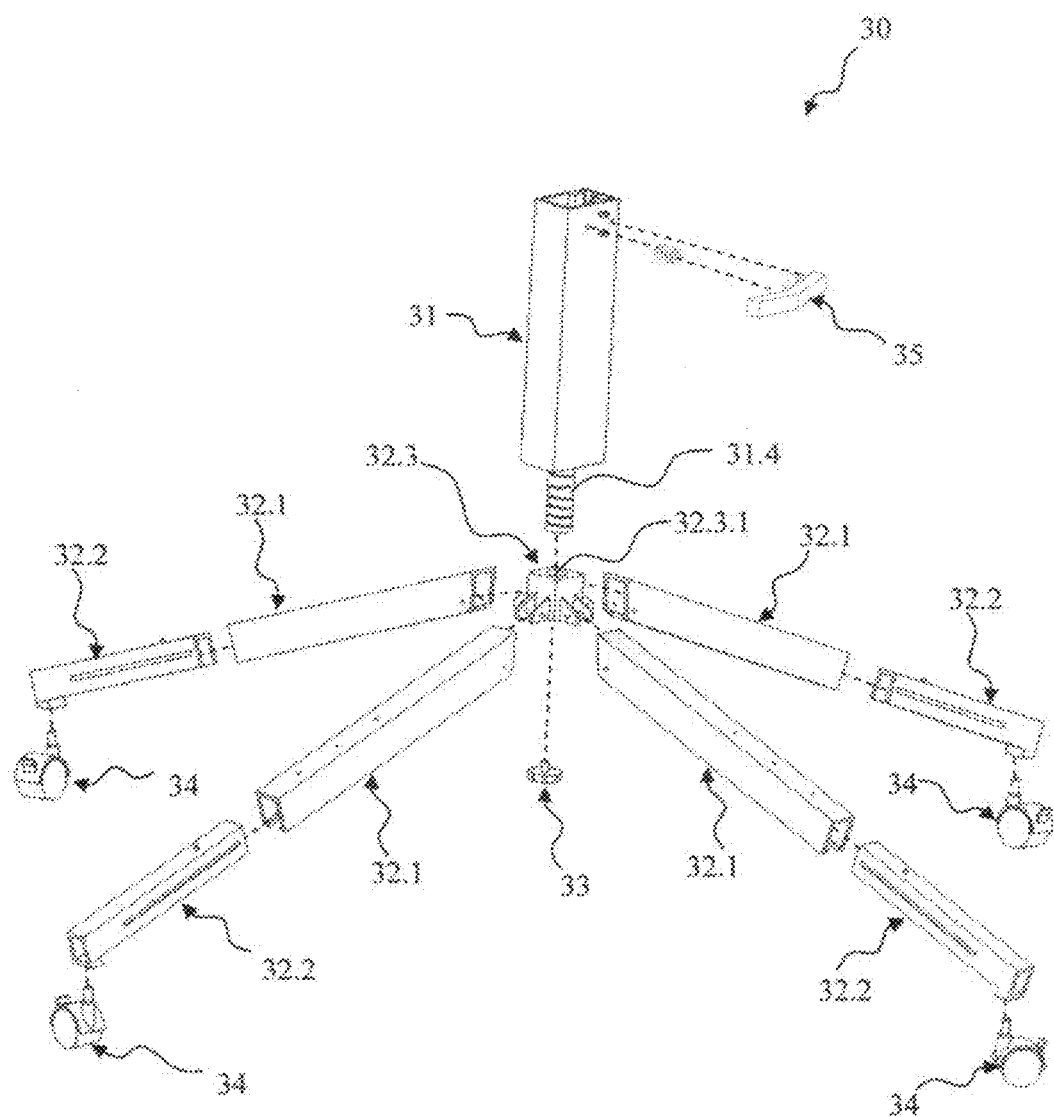

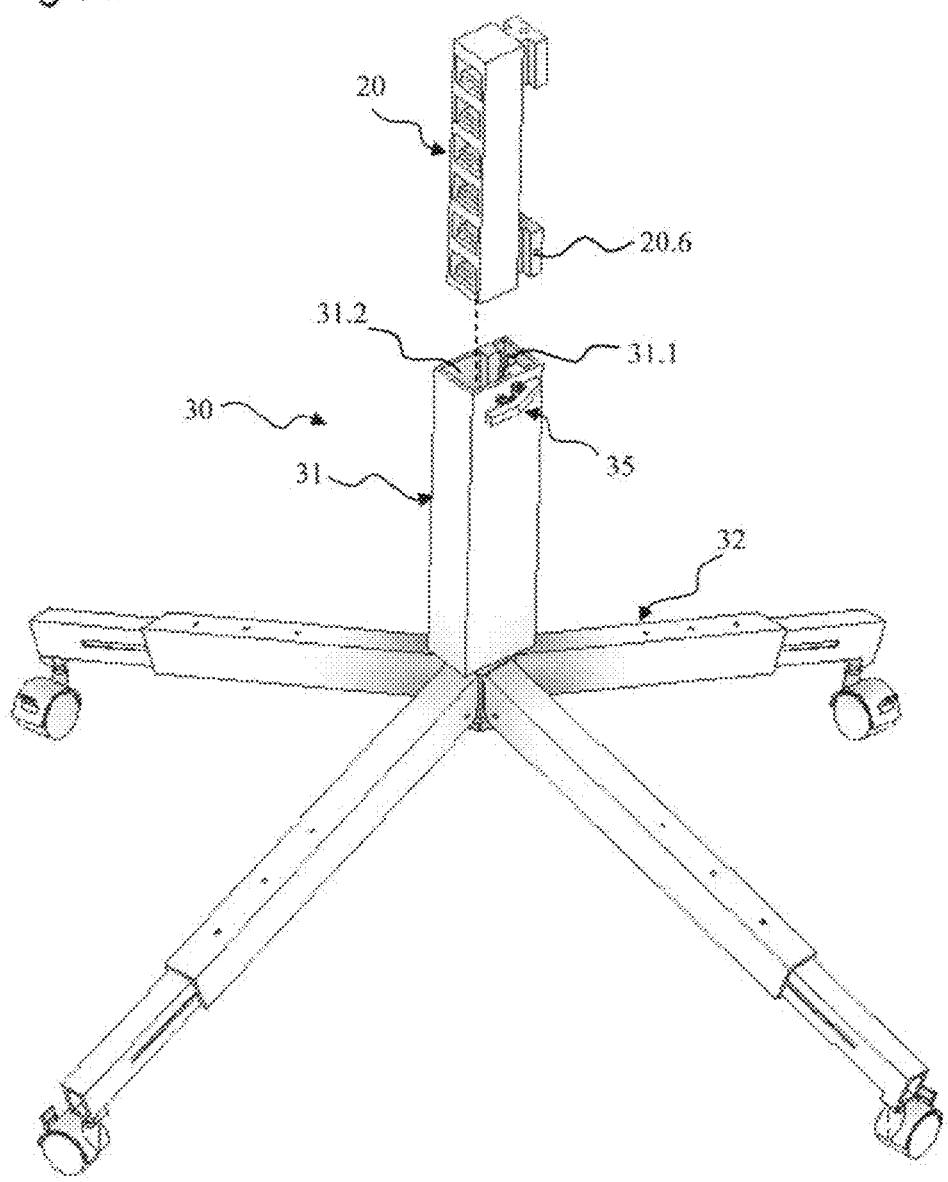

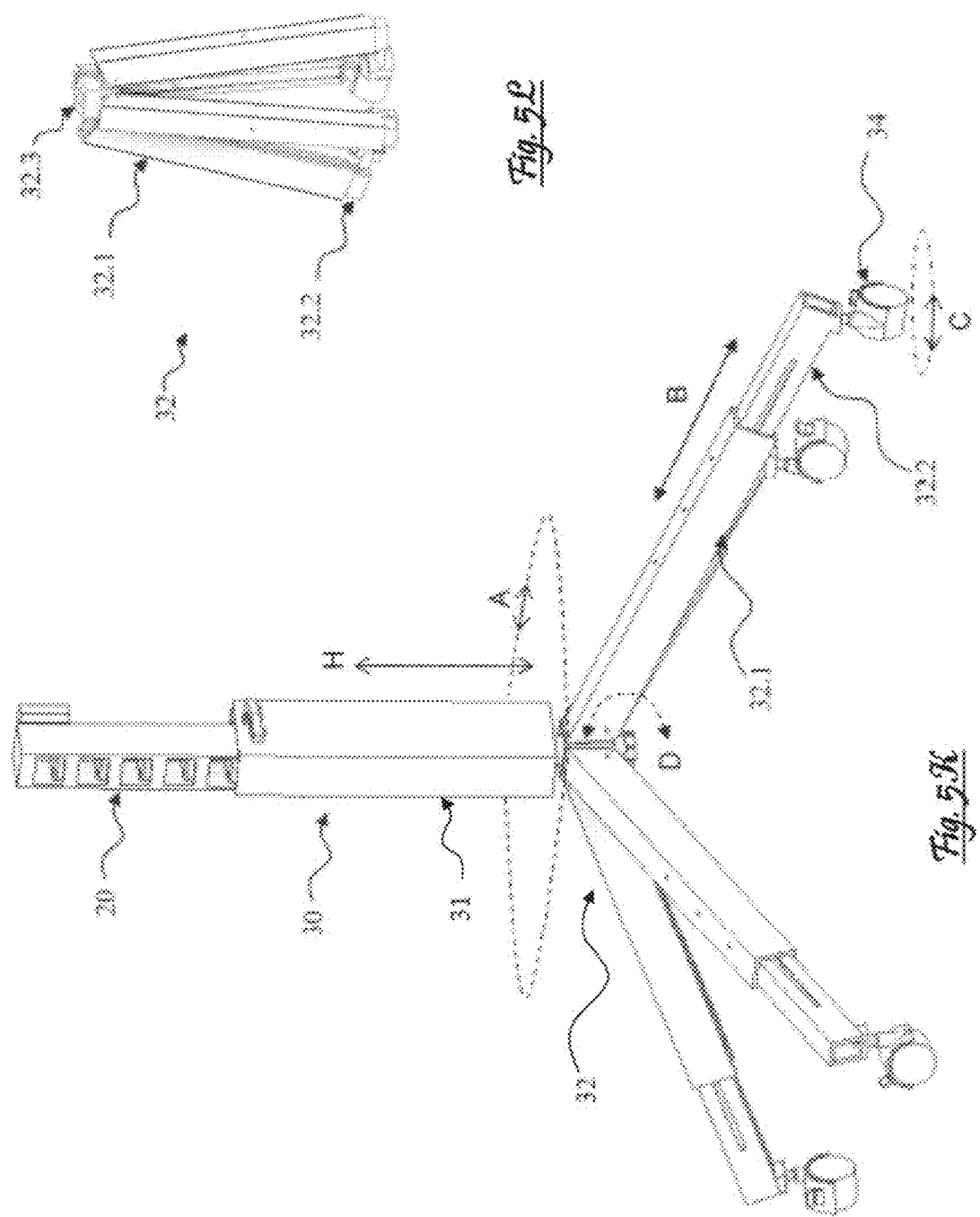

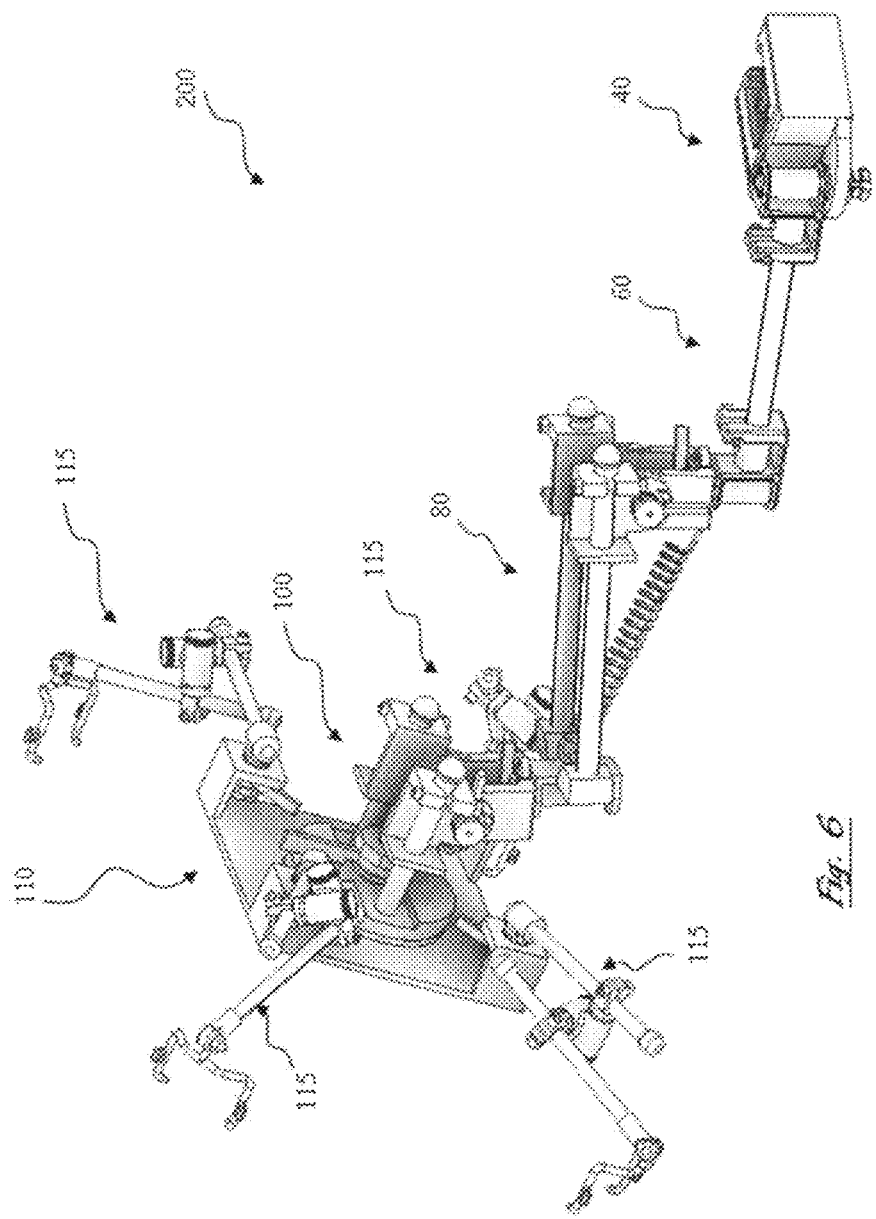

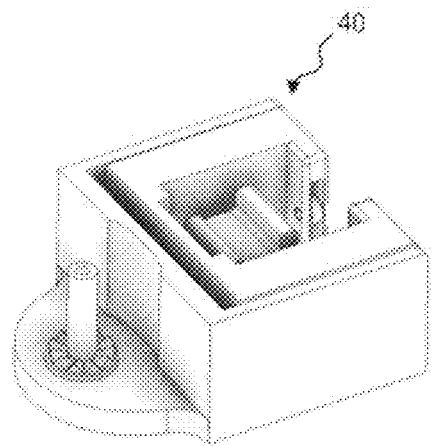
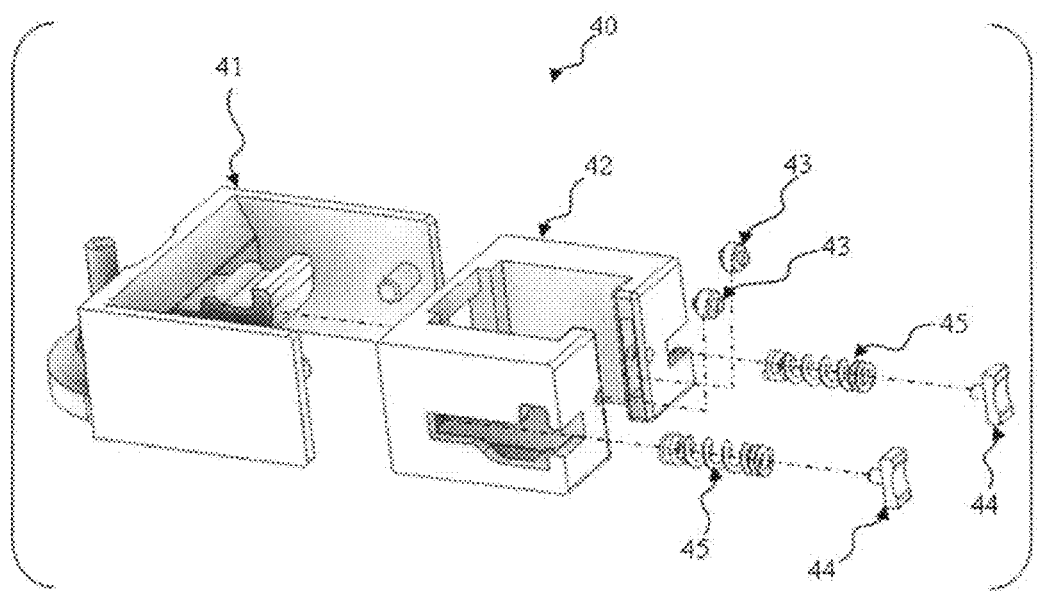

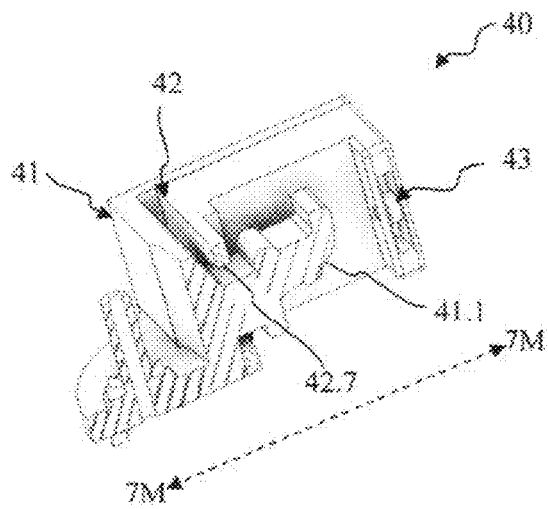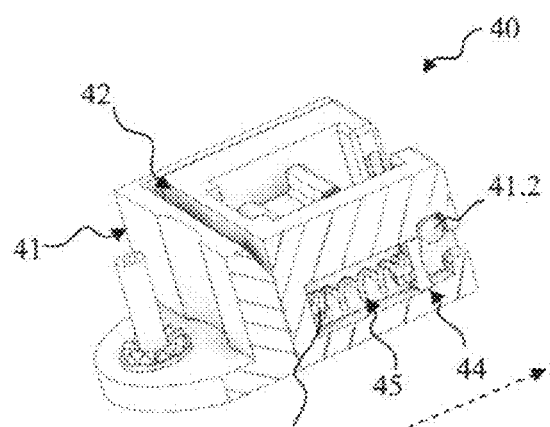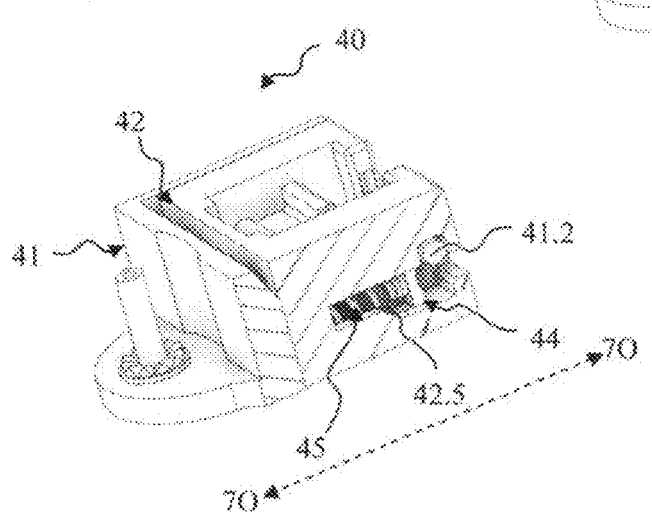

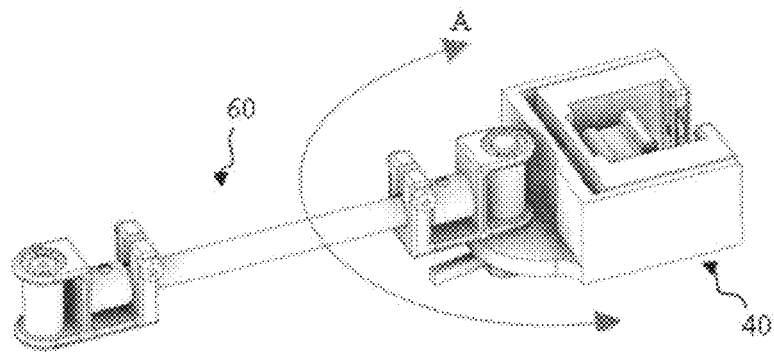
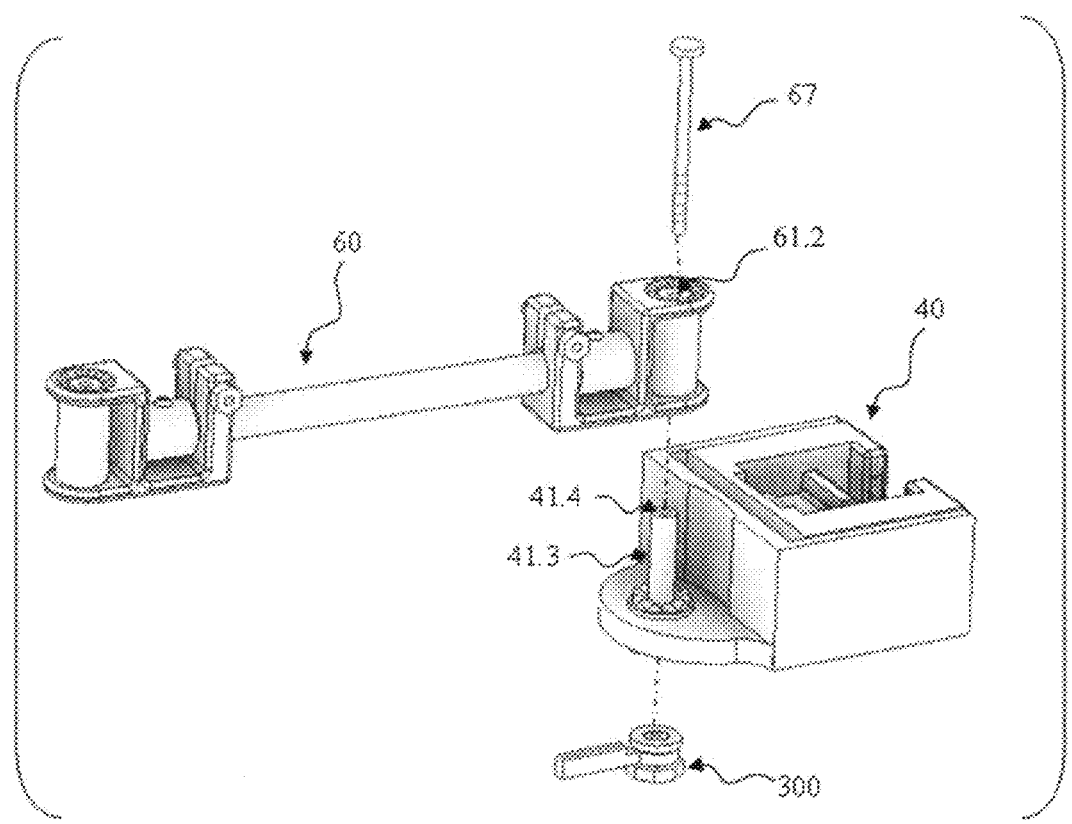

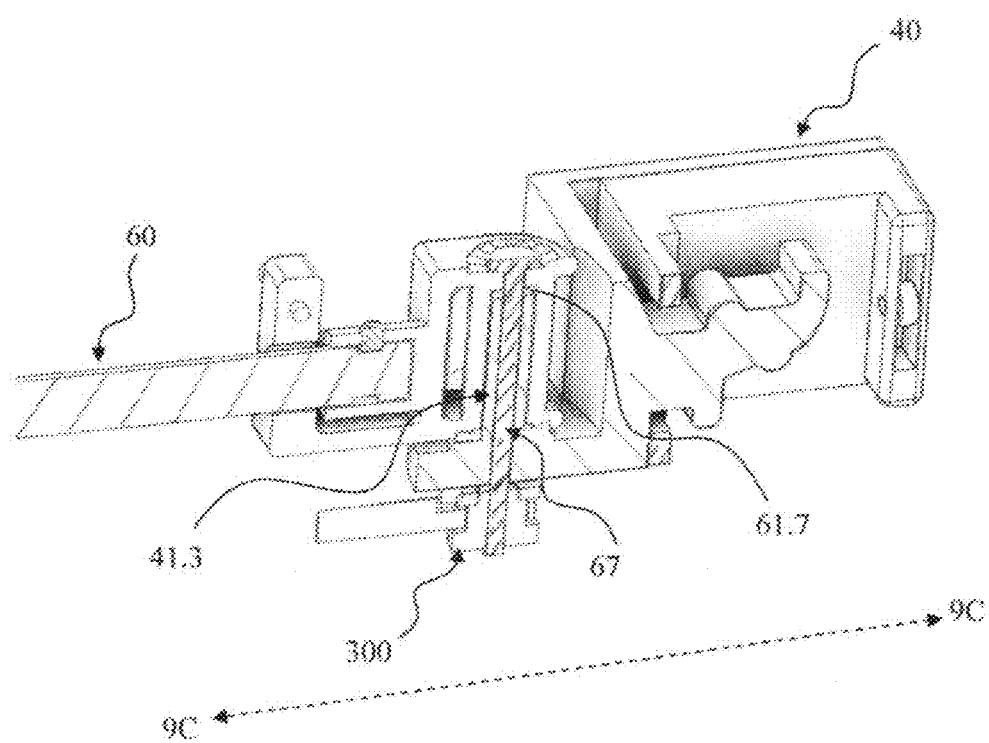

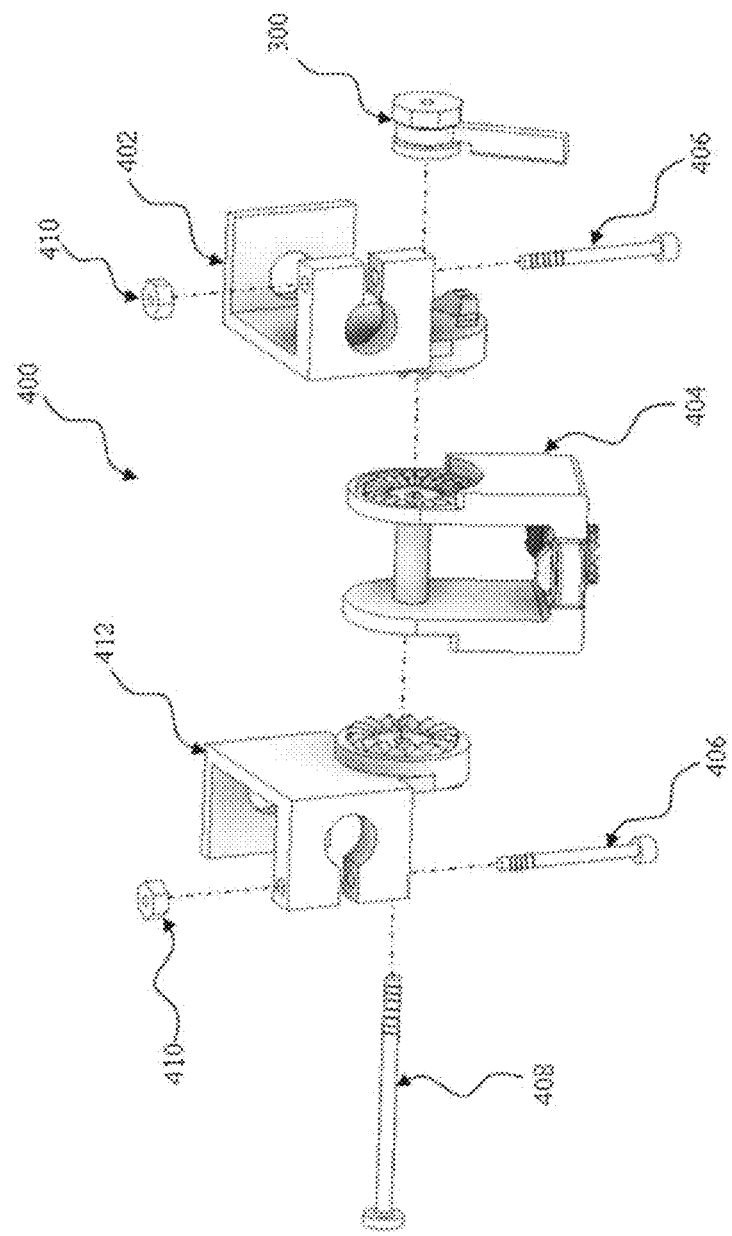

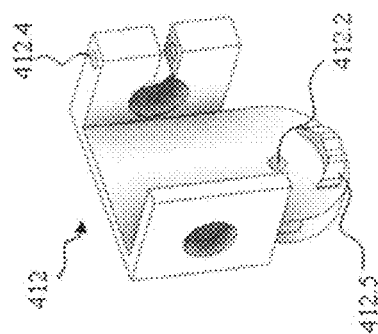
Fig. 120.2
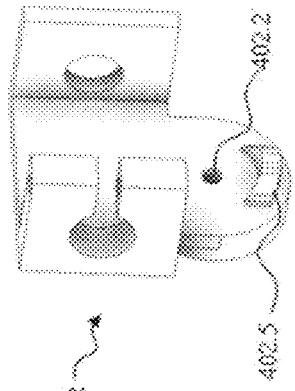
Fig. 120.4
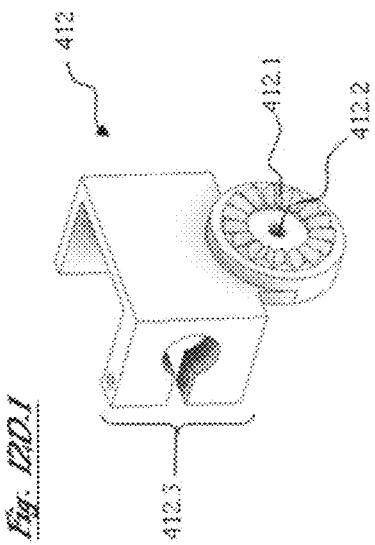
Fig. 120.1
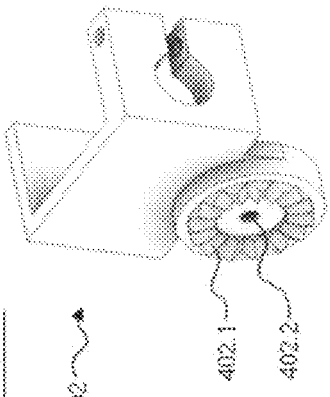
Fig. 120.3

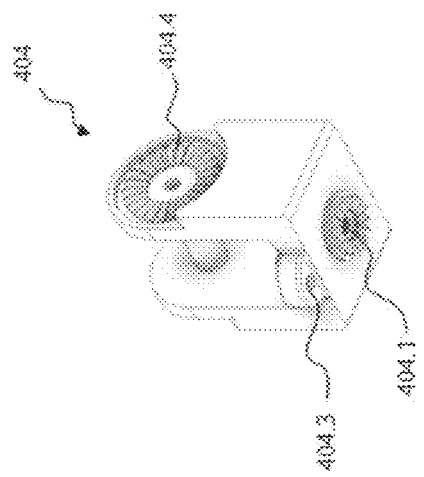
Fig. 12E.1
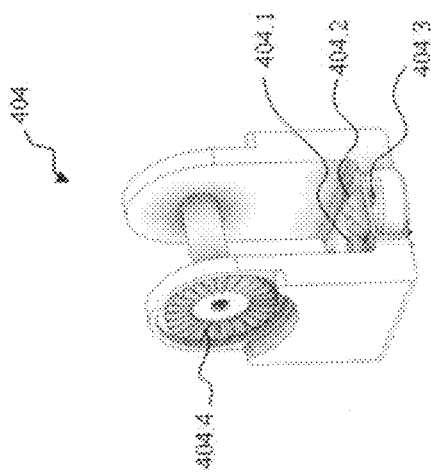
Fig. 12E.2

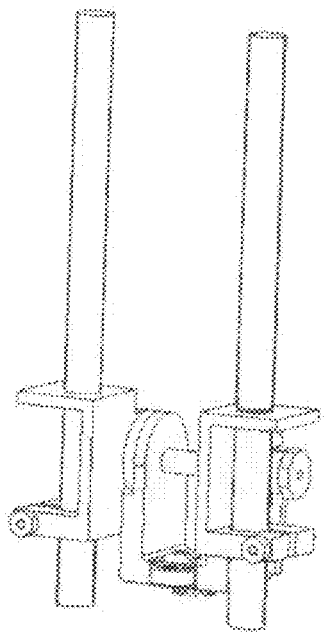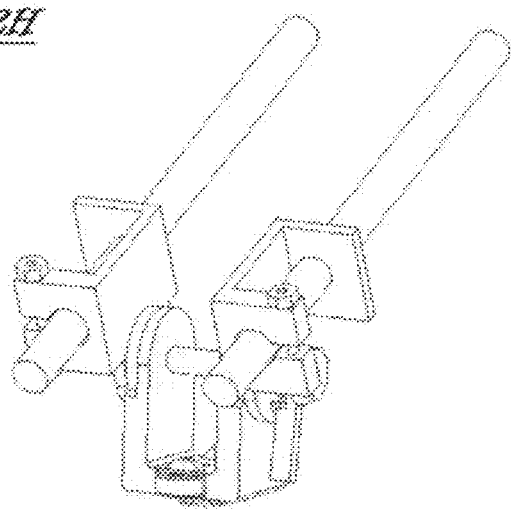
Fig. 12H
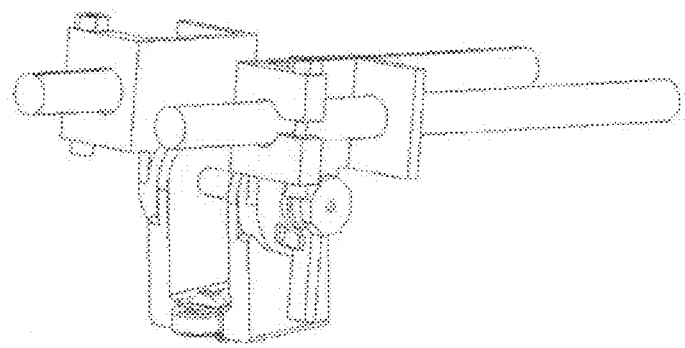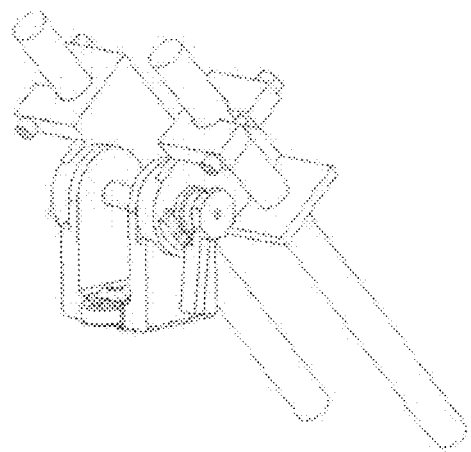

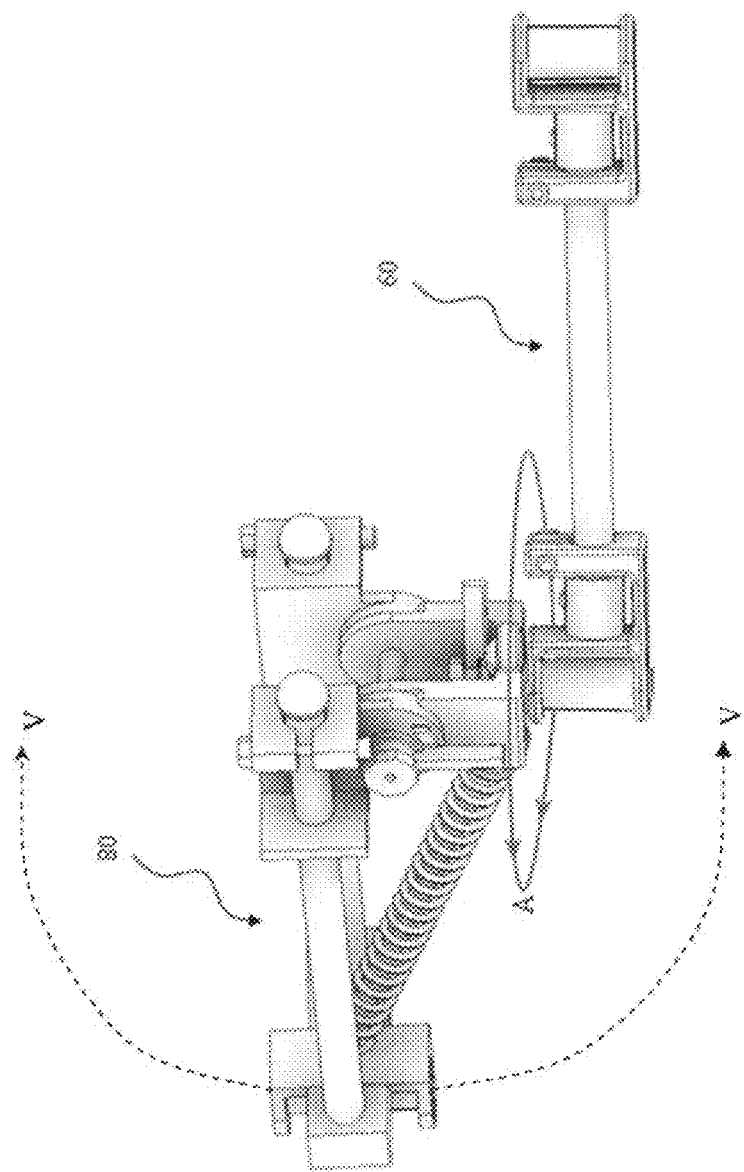

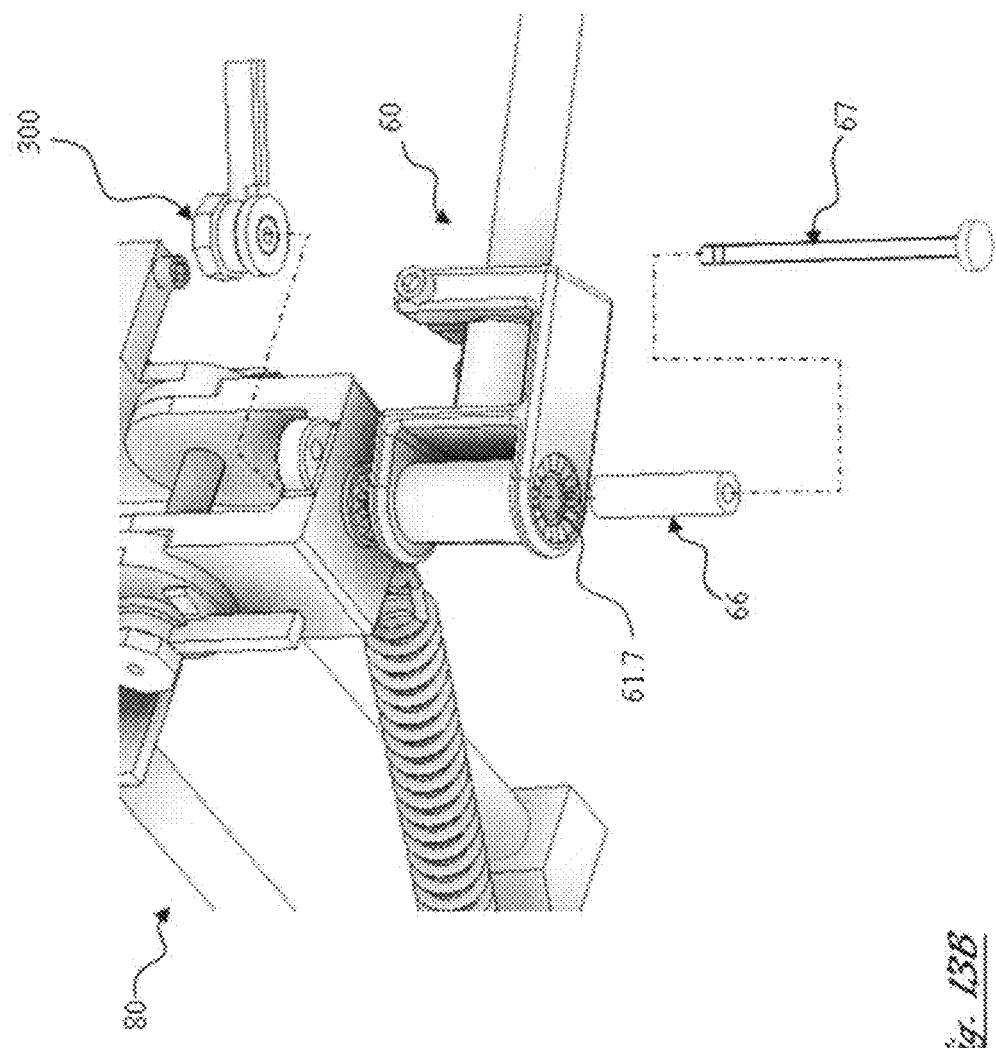

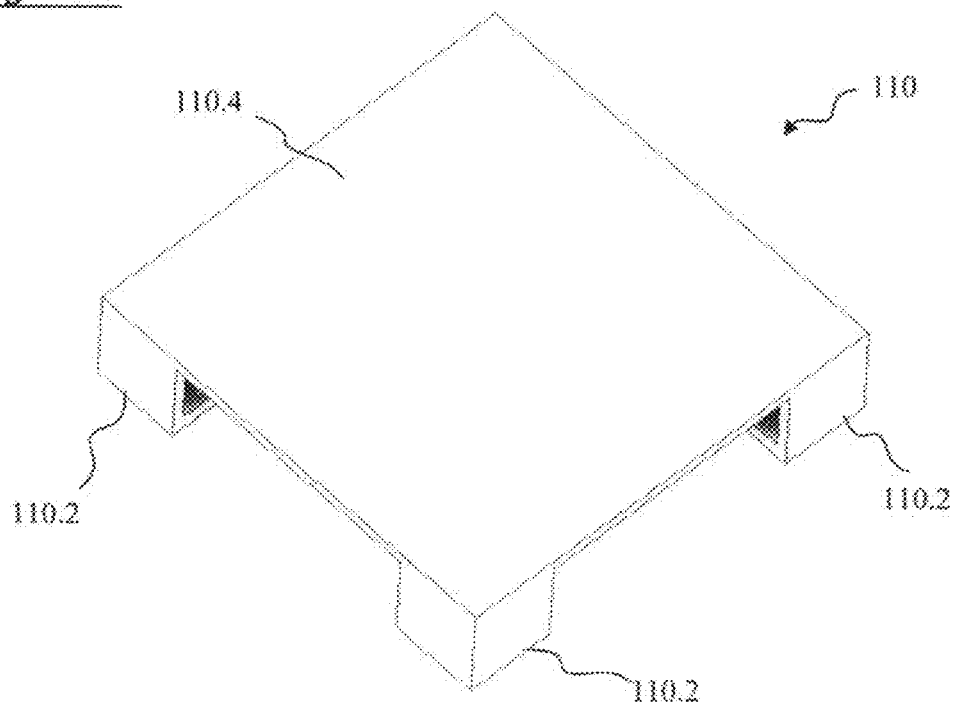
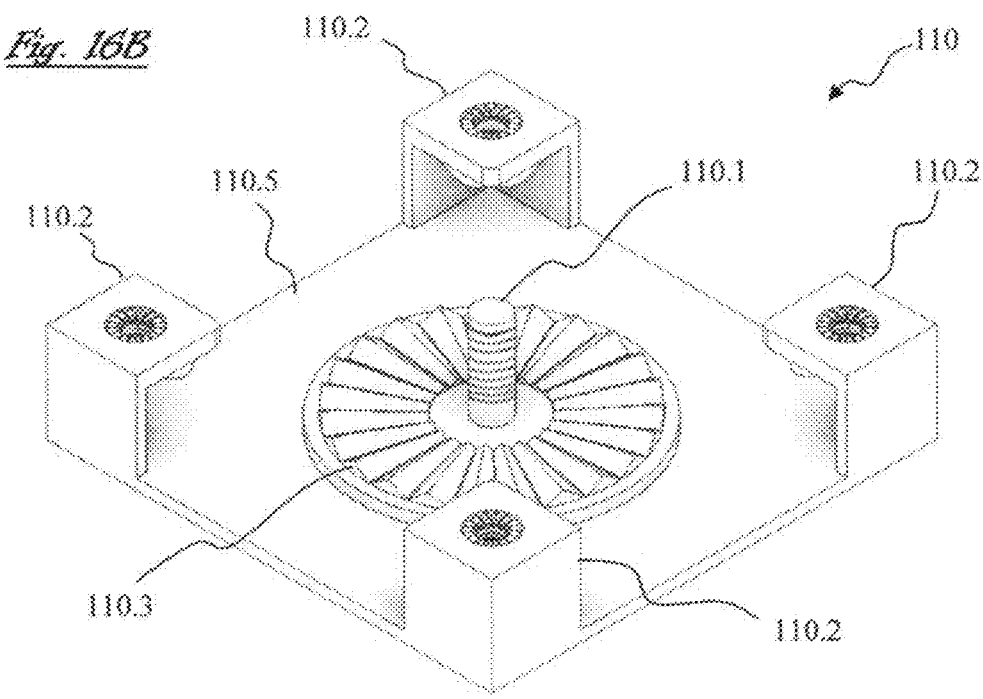

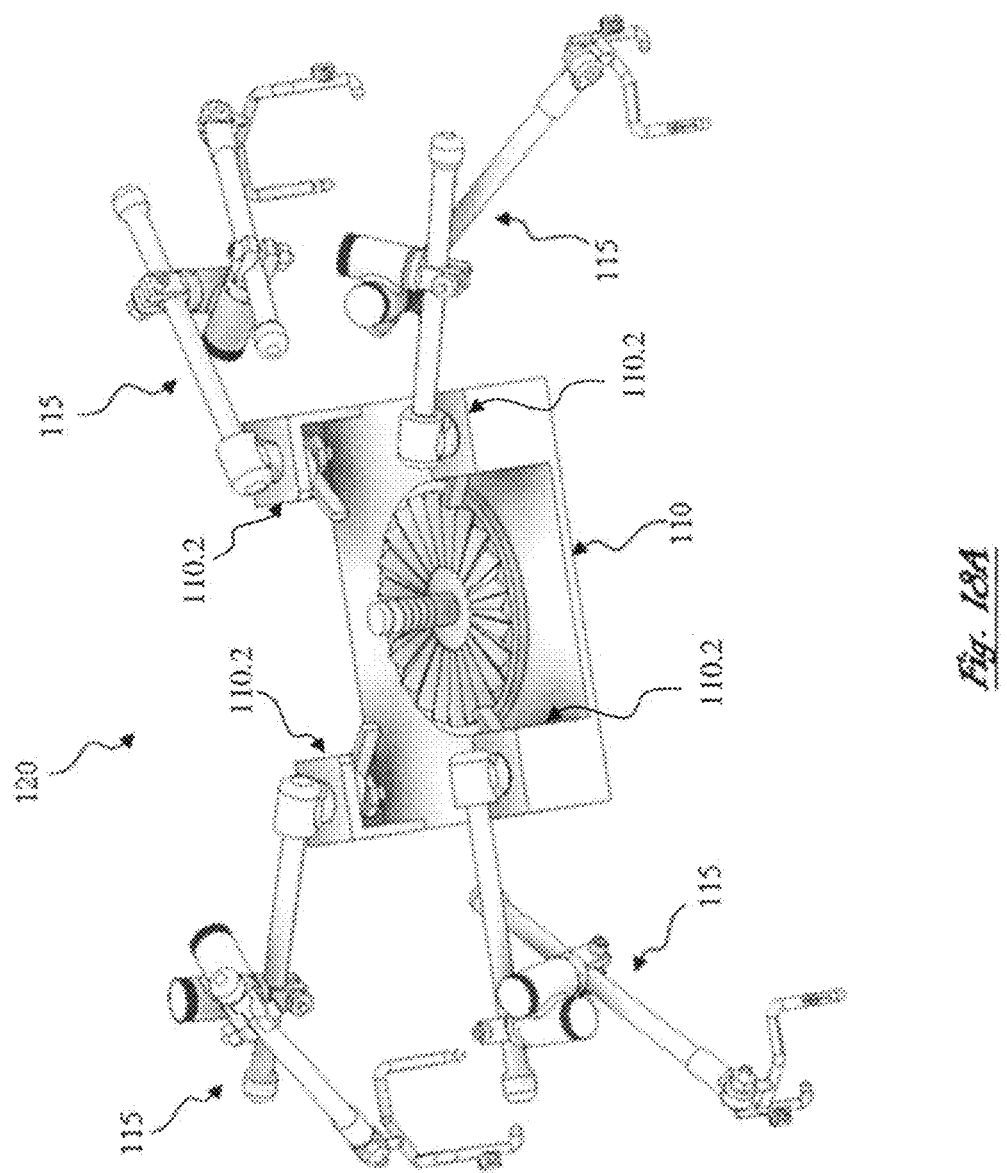

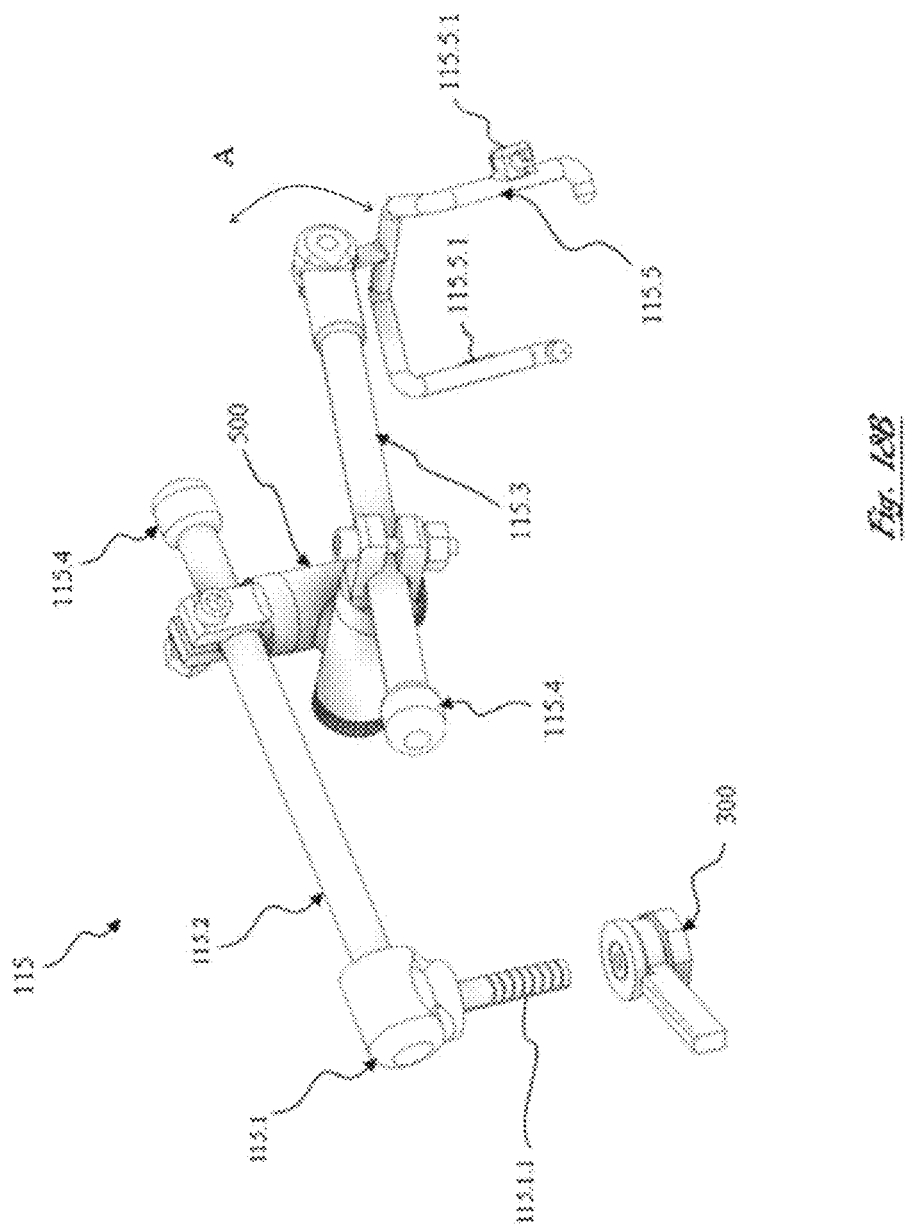

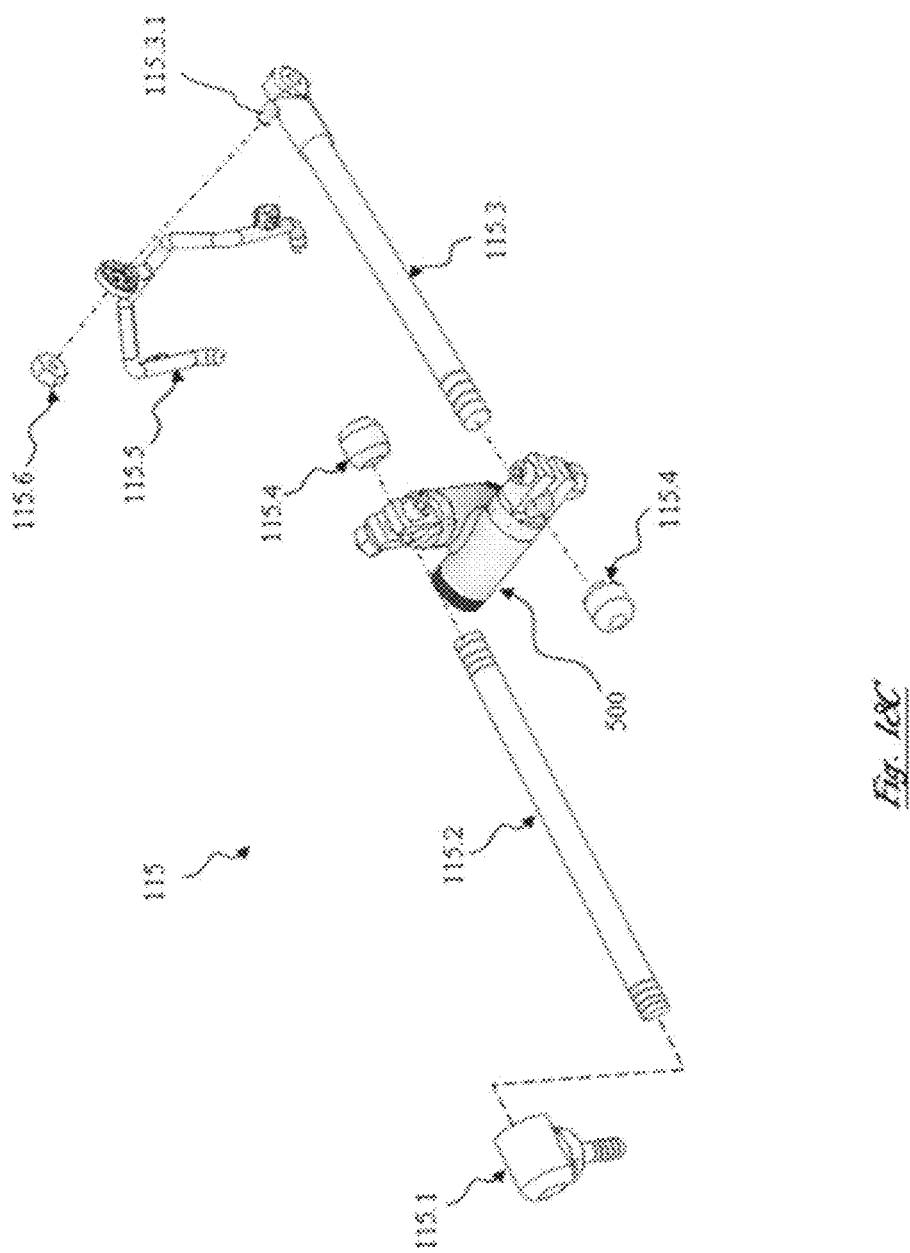

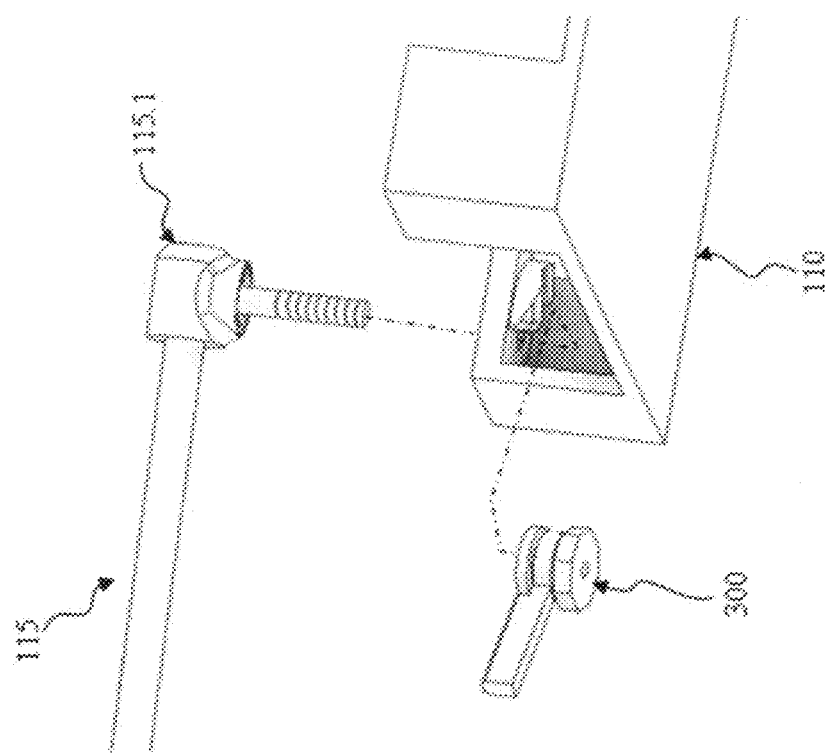

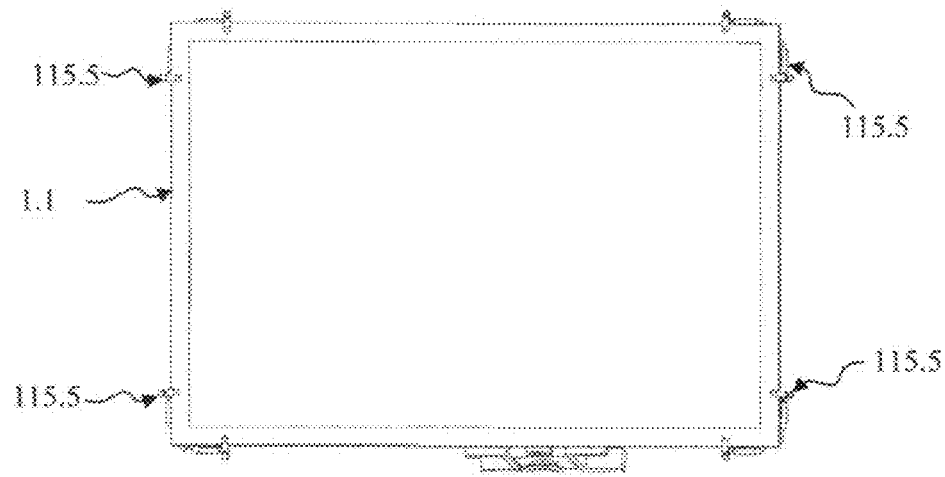
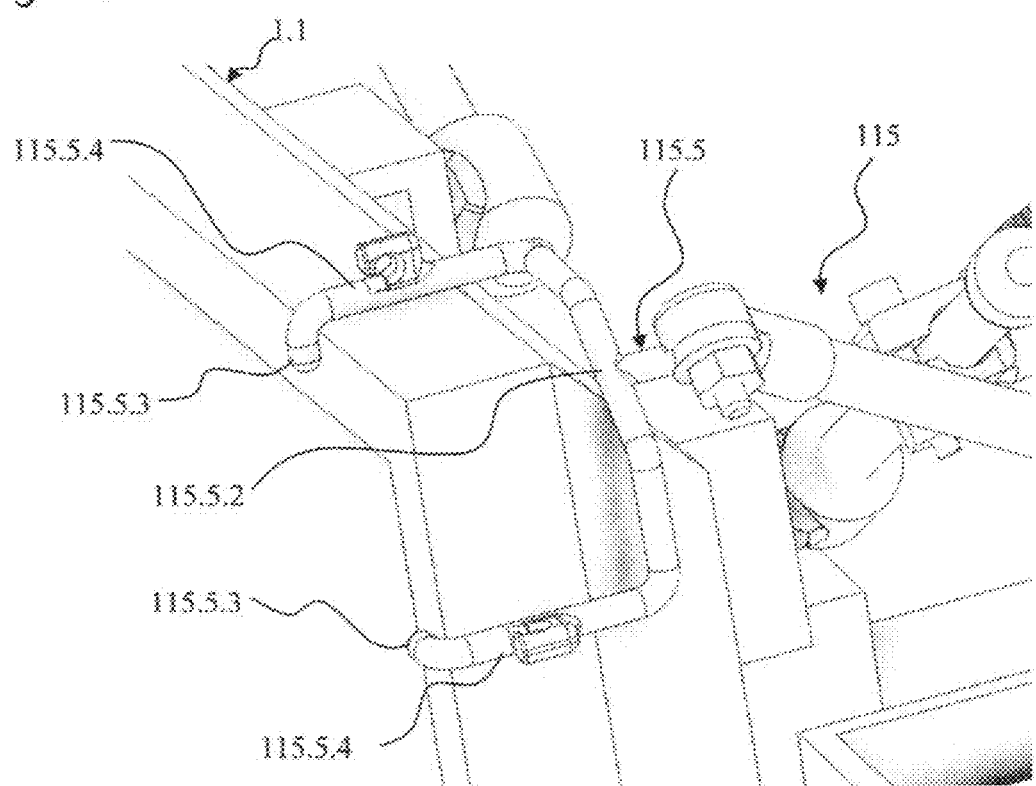

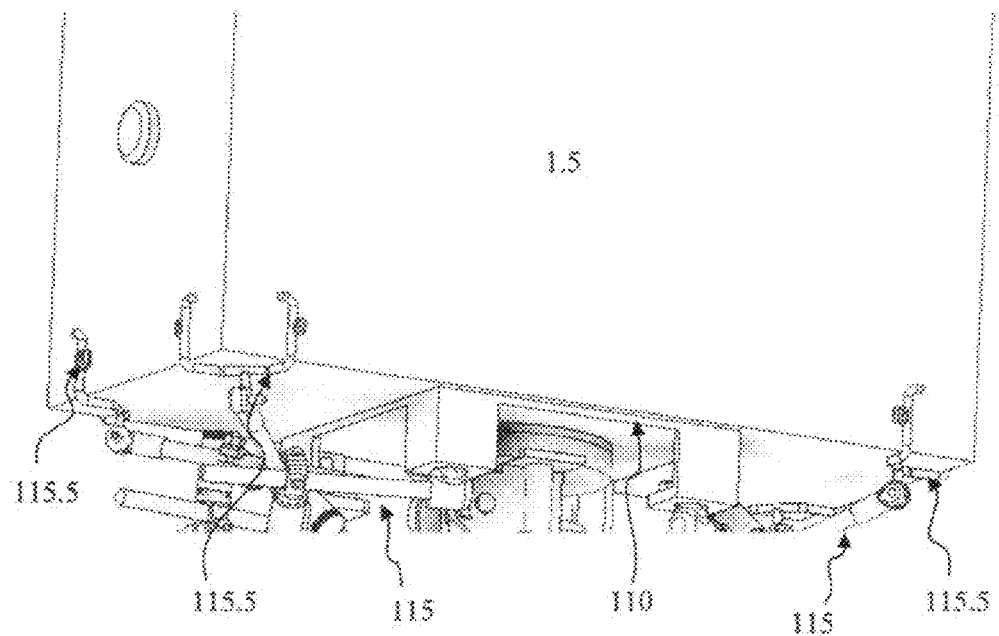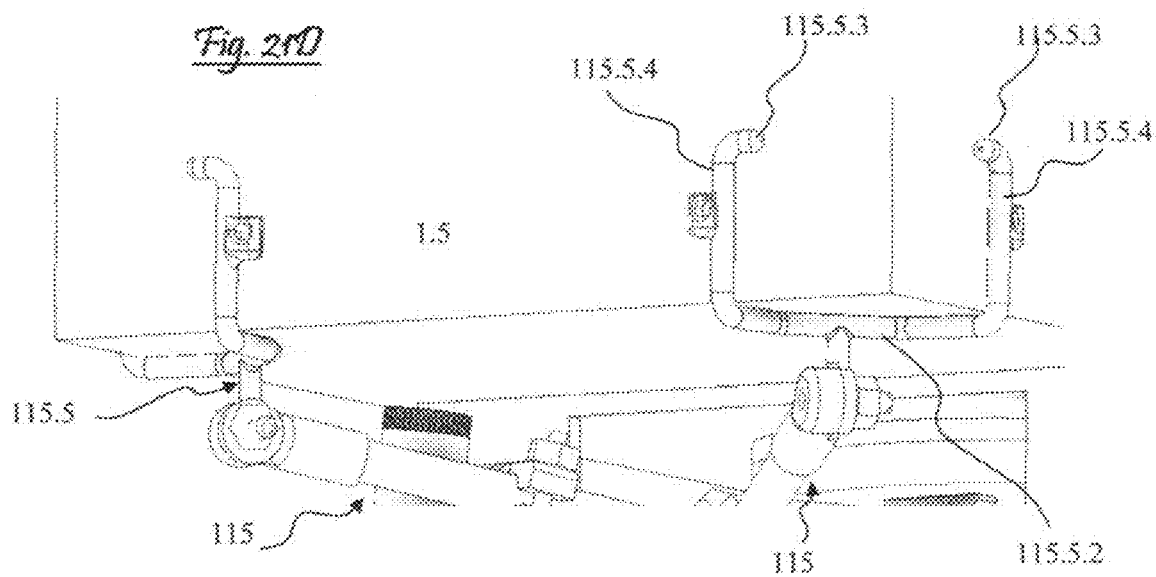

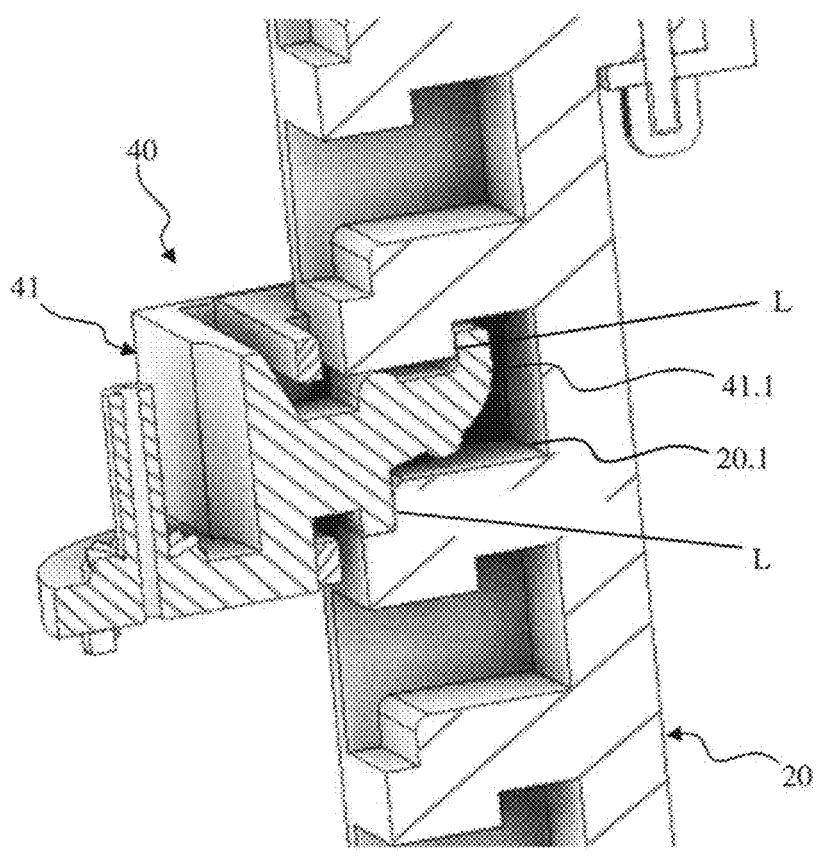

ERGONOMIC SPACE-SAVING CUSTOMIZABLE WORKSTATION

BACKGROUND OF THE INVENTION

1. Field of the Invention

This invention relates to a workstation, capable of use as a computer workstation, which optimizes available space when the workstation is or isn't in use, whilst providing full ergonomic capabilities for all peripherals or objects attached to the workstation while allowing the user to customize the various parts of the workstation based on the individual's requirements.

2. Description of Prior Art

Ergonomic workstations are well known, and because of design, are used primarily as computer workstations being utilized in a wide variety of tasks, including employment, recreation and study. In such devices, it is usually necessary to have specific interfaces on the peripheral devices or objects such as computer monitors or flat surfaces, in order to attach them to the workstation support arms which limits the number of devices that can be utilized, or different support arms may be used to connect different objects, which increases the complexity and cost of the workstation. In addition, these workstations tend to be portable wheel based, desk mounted or wall mounted but not capable of all three. This shortcoming doesn't provide multi-geographic portability and restricts users to the ergonomic benefit in a single geographic location or makes moving the workstation in a different geographic location difficult. Most portable versions have wheel bases that make them moveable, but they still rely on desks or other office equipment should additional workstation features be required, which cannot be attached to the respective support arms or may not be directly related to computers, eg. a desktop surface to write on, a white-board or a multi-media projector. Most incorporate a fixed design, including the available angles and dimension of movement of the arm attachments, and the vertical range of motion of attached arms, hence they are normally restricted to supporting computer related devices such as a monitor, keyboard, mouse pad, notebook and possibly a UPS or desktop computer, and in most cases utilize more space than a standard workstation. In addition these workstations are provided in a what-you-see is what-you-get configuration where the end user has no input in the workstation's configuration or look-and-feel As technology continues to miniaturize everything whilst enabling geographic portability, the workstation unfortunately seems to have been left behind. In addition, geographic space, be it office space, home space, etc. is continually decreasing to keep up with the cost of living and population growth whilst full ergonomic workstations still consume plenty of space. In addition, portability is provided by a wheel-base which allows the workstation to be moved around in its current location but doesn't provide any easy way for moving the workstation across geographic locations.

U.S. Pat. No. 5,738,316 provides similar support to Computer peripherals but by design, is not portable and provides limited ergonomic capabilities.

U.S. Pat. No. 5,630,566 provides similar capabilities to the current invention but by design isn't easily portable across geographic locations, doesn't provide the ability to be wall or desktop mounted, and uses different support arms to connect different objects to the workstation which may increase the complexity and cost of the workstation.

U.S. Pat. No. 4,848,710 provides some ergonomic capabilities for a bed ridden user but is restricted to that use and seemingly does not provide for the addition of additional objects to the workstation, or portability.

U.S. Pat. No. 4,638,969 is designed for a specific use in manufacturing and doesn't provide portability, doesn't provide for the attachment of additional objects, provides limited ergonomics of attached devices and isn't designed to save space when not in use.

U.S. Pat. No. 4,516,751 provides some features similar to the current invention but is not portable and has limited ergonomic adjustments for attached objects.

U.S. Pat. No. 4,365,561 is a computer workstation that provides limited ergonomics, isn't portable and doesn't provide space saving capabilities.

U.S. Pat. No. 5,876,008 provides a wall mounted option for supporting a single support arm and attached device but isn't portable, can't support additional devices and has limited ergonomics.

U.S. Pub No. 2010/0201165 provides similar capabilities of the current invention but isn't easily portable and uses different support arms to attach different objects to the workstation. In addition, by design, it doesn't provide space saving capabilities as the current invention.

U.S. Pub No. 2006/0207480 provides similar capabilities of the current invention but isn't easily portable, doesn't allow the addition of additional support arms and the range of motion of the attached objects is very limited in comparison to the current invention.

BRIEF SUMMARY OF THE INVENTION

The present invention overcomes 12 problems associated with prior art, more specifically 1. Enables the use of a single support arm design to support any object required to be attached to the workstation, because of the flexibility of the Finger Component to contract or extend its reach for small or larger objects and the use of the Multi-Pivot Finger Joint that enables the Finger component to support objects of various dimensional shapes.
2. Enable easy height adjustment of Arm along the workstation Rail without the use of screws or levers or having to reach to the back of the workstation to make adjustments.
3. Due to the unique construction of the Support Arm, the outward reach of the Arm and Tilt Angle of attached objects can easily be increased or decreased as required in a range of angles that is itself modifiable.
4. Attached devices are not required to have any special features for attachment to the Support Arms which increase the number of objects that can be attached and so increases the uses of the current invention.
5. Enable the same workstation to be used as fixed, portable or desktop solution as such providing the ability to easily move the workstation across geographic locations hence providing geographic and ergonomic portability.
6. Provides the ability to easily rotate attached objects out of the way to free up space
7. Provides the ability to easily attach additional objects with additional Support Arms, restricted only by the length of the Workstation Rail which can also by increased by adding additional Rails.
8. Ability to modify the size of the Workstation by adding or removing Rails.
9. The unique design of the current invention allows adapters to be made that would allow pre-existing Support Arms from other manufacturers, to be attached to the current invention's Shoulder Bracket so that they can be used with the current invention.

10. The ability to easily attach objects by separating the Hand from the Arm allowing the Hand to be secured to the object independent of the rest of the Arm which can be positioned onto the Rail, and after securing in position on the Rail, the Hand with the attached object can be reconnected to the Arm.
11. The Unique construction of the Workstation, by utilizing separate detachable components, gives users the ability to dictate the final look-and-feel of the end product hence providing a truly customizable workstation.
12. Enables hot-swapping of attached objects to the Support Arm as separate Hands can be attached to different objects and these Hands can be easily interchanged on the same Support Arm as required.

These, and other problems that will become apparent to one of skill in the art upon a review of this disclosure, are overcome by the present invention of a workstation that includes a rail, a support arm connected to the rail for supporting a plurality of different components, and a mounting interface connected to the rail for mounting the rail to a wall mount, desktop mount, or wheel mount.

BRIEF DESCRIPTION OF THE DRAWINGS

FIG. 2 Is a front view of the Workstation 1 when not in use, with attached peripherals positioned against the wall to make available used space.

FIG. 3 Illustrates a second embodiment of the Workstation 1 including a single Multi-Pivot Support Arm 200, and a single Rail 20 in a Desktop Mount 25 supporting a Monitor 1.1.

FIG. 6 Is a perspective view of one embodiment of the Workstation Arm 200 highlighting the individual components that make up the Arm 200

FIG. 7A Illustrates one embodiment of the Shoulder Bracket 40, which connects the Upper Arm 60 to the Rail 20 and enables the Arm 200 to move vertically.

FIG. 7C Is an exploded view of Shoulder Bracket 40.

FIG. 7M Is a sectional view of Shoulder Bracket 40.

FIG. 7N Is a partial sectional view of Shoulder Bracket 40 revealing one embodiment of a spring mechanism FIG. 7O Is a partial sectional view of Shoulder Bracket 40 revealing one embodiment of a track assembly.

FIG. 9A Illustrates the Upper Arm 60 attached to the Shoulder Bracket 40

FIG. 9B Is an exploded view of the Shoulder Bracket 40, connecting to the Upper Arm component.

FIG. 9C Is a partial sectional view of the Shoulder Bracket 40 connected to the Upper Arm 60.

FIG. 12C Is an exploded view of the Multi-Pivot Joint Assembly 400

FIG. 12D.1 Is front perspective view of one embodiment of the Left Rod Holder 412

FIG. 12D.2 Is rear perspective view of the Left Rod Holder 412

FIG. 12D.3 Is front perspective view of one embodiment of the Right Rod Holder 402

FIG. 12D.4 Is rear perspective view of the Right Rod Holder 402

FIG. 12E.1 Is top perspective view of one embodiment of the Center Bracket 404

FIG. 12E.2 Is bottom perspective view of the Center Bracket 404

FIG. 12H Illustrates how the Multi-Pivot Joint rotates attached Rods.

FIG. 13A Illustrates the Lower Arm 80 attached to the Upper Arm 60 highlighting the 360° horizontal rotational ability of the Lower Arm 80 on the Upper Arm 60, plus the 180°-270° vertical rotational ability of the Lower Arm 80.

FIG. 13B Is a magnified view illustrating the connection between the Lower Arm 80 and the Upper Arm 60.

FIG. 16B Shows a bottom perspective view of the Palm 110 highlighting its features to connect the Fingers 115 and to connect to the Wrist 100

FIG. 18A Illustrates one embodiment of the Hand 120 which constitutes the Palm 110 with the four (4) attached Fingers 115

FIG. 18B Is a perspective view of one embodiment of the Finger 115.

FIG. 18C Is an exploded view of the Finger 115.

FIG. 18D Explains how the Finger 115 is connected to the Palm 110 and secured with a Quick-Lock 300.

FIG. 21A Illustrates one embodiment of the Finger Ends 115.5 clasping a Monitor 1.1

FIG. 21B Is a magnified view of a Finger End 115.5 clasping a Monitor 1.1

FIG. 21C Illustrates the Finger Ends 115.5 supporting a Computer 1.5

FIG. 21D Is a magnified view of the Finger End 115.5 supporting a Computer 1.5

DETAILED DESCRIPTION OF THE PREFERRED EMBODIMENTS

Figure 1:
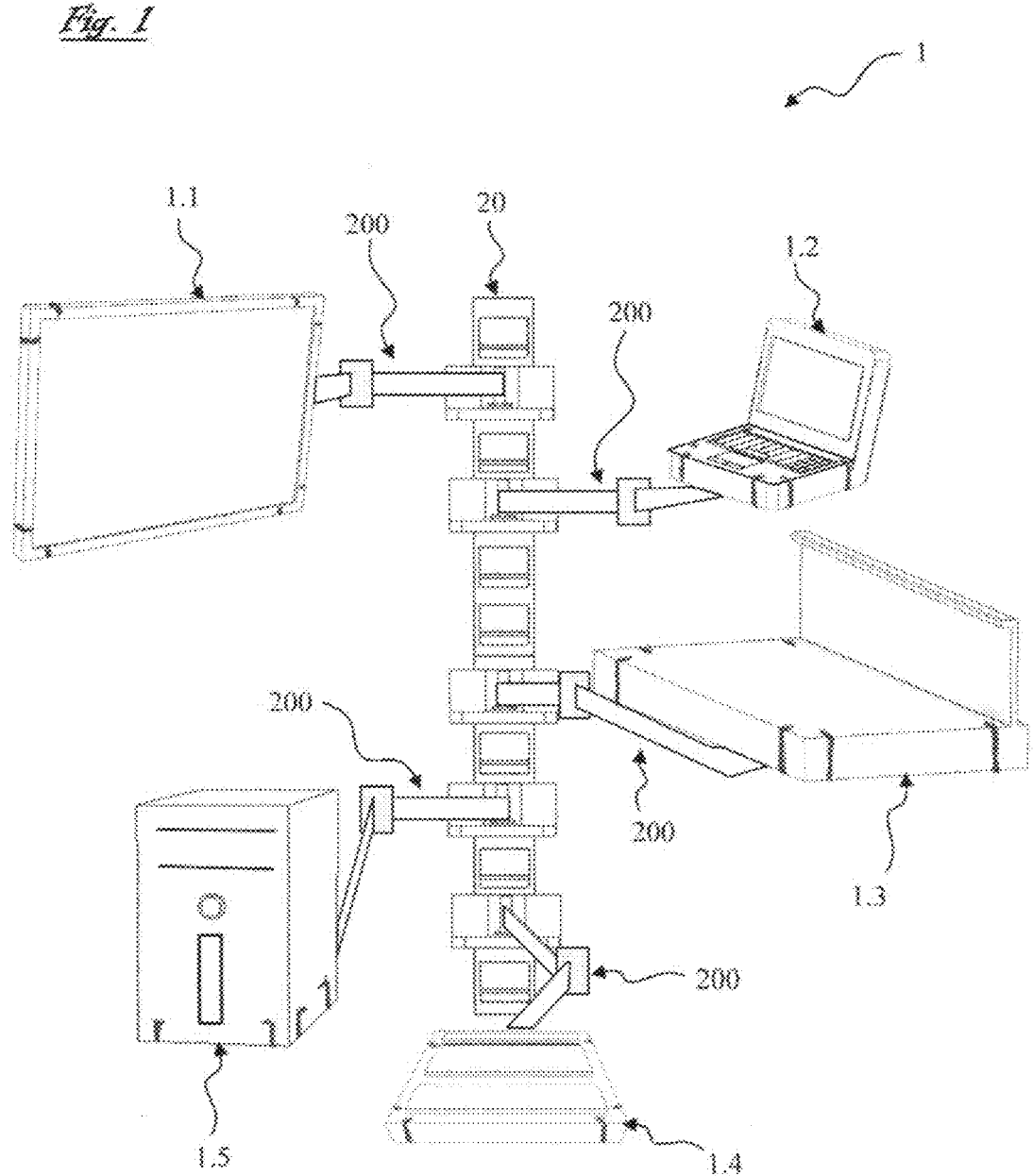
FIG. 1 Is a front view of one embodiment of the Workstation 1 of the present invention showing some attached peripherals devices as it would look attached to a wall.

FIG. 1 is a sketch of one embodiment of the Ergonomic Space Saving Customizable Workstation 1 of the present invention, hereinafter referred to as Workstation, as it would look attached to a wall, showing some attached peripheral devices including a Computer Monitor 1.1, a Notebook Computer 1.2, A desktop surface 1.3, a Foot Rest 1.4 and a Desktop Computer 1.5. As can be seen from FIG. 1 all attached devices are attached using the same Support Arm type 200 attached to a Rail 20.

FIG. 2 is a sketch of the Workstation 1 when stored away to make available, used space, and so demonstrate the effectiveness of the design in relation to space saving. Attached devices have been simply rotated horizontally and moved against the wall. In one embodiment, the Workstation consists of a single Multi-Pivot Support Arm 200, hereinafter referred to as the Arm, and a single Rail 20 in a mount supporting a single object, in this instance a Monitor 1.1, as demonstrated in FIG. 3. This configuration can be modified, which will be illustrated in Mode Of Operation, by adding additional Rails 20, changing the Mounting interface be it wall, desktop or wheel-based, adding additional Arms 200 or modifying the physical composition of the Arm 200 itself.

Figure 4B:
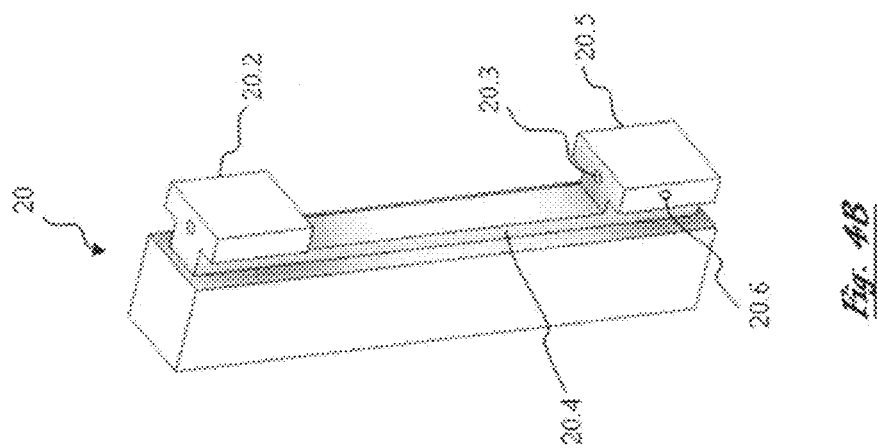
FIG. 4B Illustrates a rear perspective view of the Rail 20 showing the rail mounts and track.
Figure 4A:
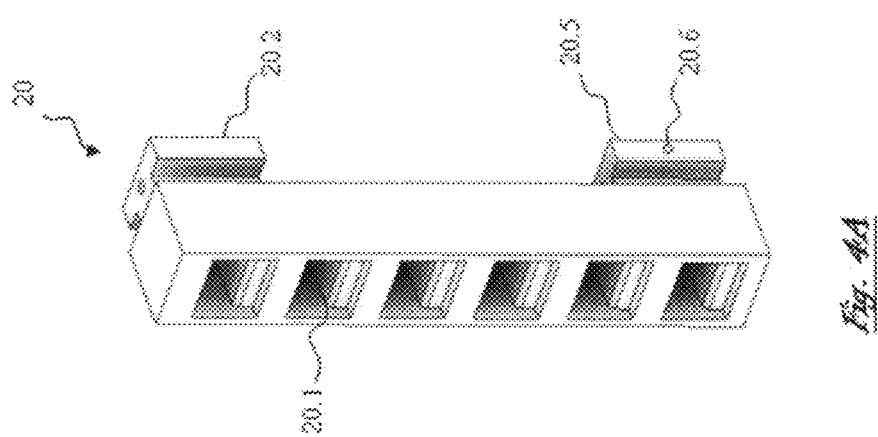
FIG. 4A Illustrates a front perspective view of one embodiment of the Rail 20 which acts as the backbone of the Workstation and provides support for all attached Arms 200 and enables vertical movement of the Arms 200 for ergonomic adjustment.
Figure 4D:
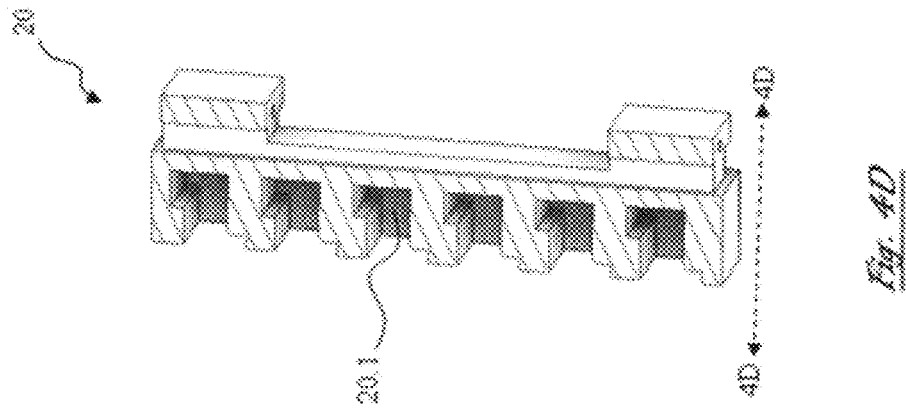
FIG. 4D Illustrates a rear sectional perspective view of the Rail 20 showing Docking Port 20.1
Figure 4C:
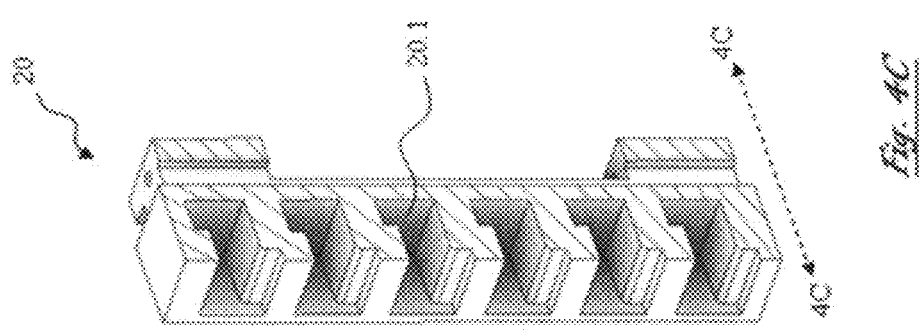
FIG. 4C Illustrates a front sectional perspective view of the Rail 20 showing one embodiment of the Docking Port 20.1

The Rail 20, one embodiment of which is illustrated in FIG. 4A, serves as the backbone of the workstation and provides a track along which the Arms 200 can move vertically up or down for height adjustment, secures the Shoulder Bracket 40 in place once the height adjustment is completed so that the Arm 200 doesn't move, and enables the Workstation 1 to be converted into a Portable workstation using the Wheel-base mount 30 or Desktop Mount 25.

Referring to FIG. 4A the front of the Rail 20 is composed of numerous Ports 20.1 which provide a feature for the Shoulder Bracket 40 to securely dock itself, to lock the Shoulder Bracket 40 within the Rail 20. FIG. 4B displays the rear of the Rail 20 which has a Wheel Track 20.4, the Rail Top-Mount 20.2 and the Rail Bottom-Mount 20.5. The Wheel Track 20.4 runs the full length of the Rail 20, along which the two Shoulder-Bracket Wheels 43 travel, to facilitate the smooth vertical movement of the Arm 200 along the Rail 20 as illustrated in FIG. 7P. FIG. 4 (C-D) illustrates sectional views of the Rail 20 highlighting the inner design of the Rail Port 20.1.

Figure 5B:
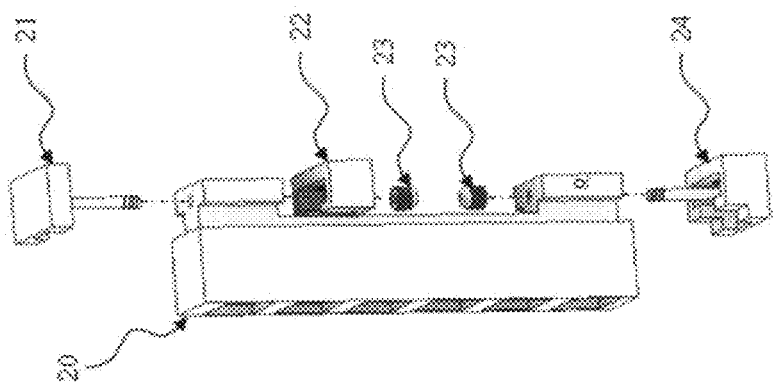
FIG. 5A Is an exploded view of the Rail 20 with one embodiment of the Wall mounts FIG. 5B Illustrates how the Rail 20 attaches to the Wall mounts FIG. 5C Is a perspective view of the Rail 20 attached to the Wall mounts FIG. 5D Is a top perspective view of one embodiment of the Desktop Mount 25
FIG. 5E Is an exploded view of the Desktop Mount 25
FIG. 5F Is a bottom perspective view of the Desktop Mount 25
FIG. 5G Is an exploded view of the Rail 20 with the Desktop Mount 25
FIG. 5H Shows the Rail 20 mounted into the Desktop Mount 25
FIG. 5I Is an exploded view of the Wheel Mount 30
FIG. 5J Illustrates the positioning of the Rail 20 when mounting into the Wheel Mount 30
FIG. 5K Illustrates the Rail 20 mounted into the Wheel Mount 30
FIG. 5L Illustrates the folded Wheel Base 32
Figure 5A:
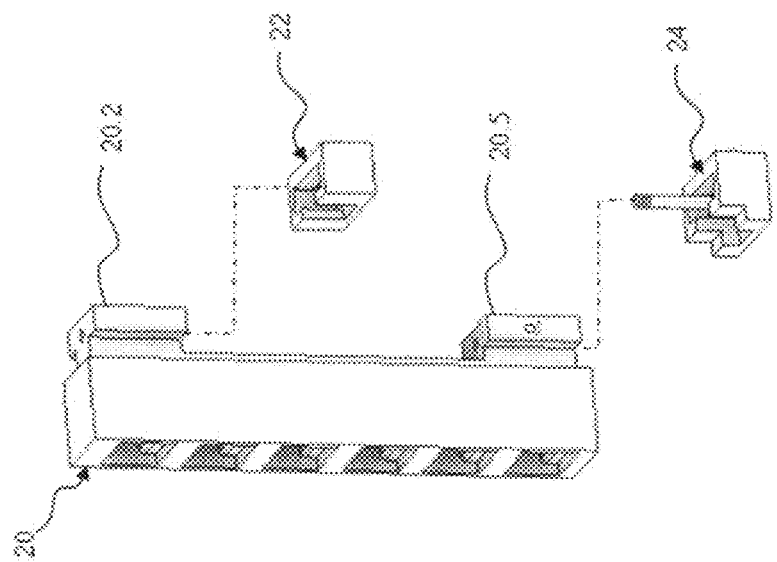
Figure 5C:
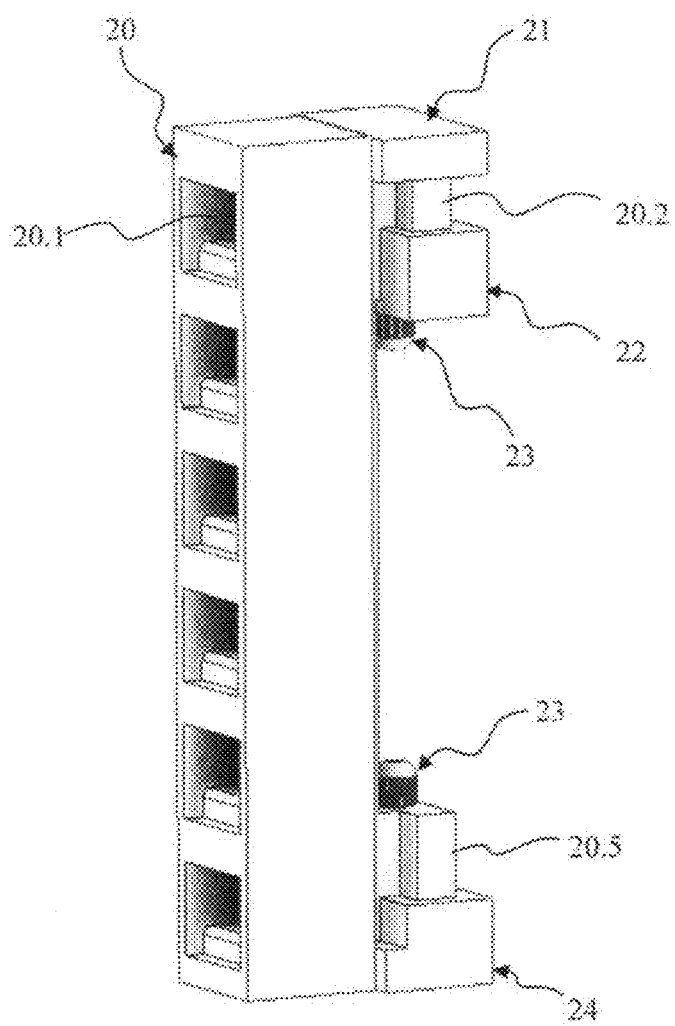
Figure 5D:
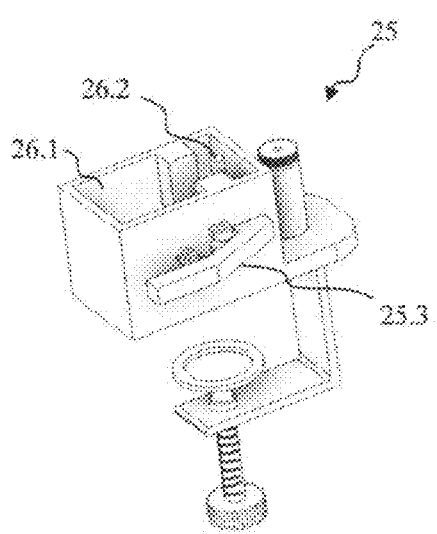
Figure 5E:
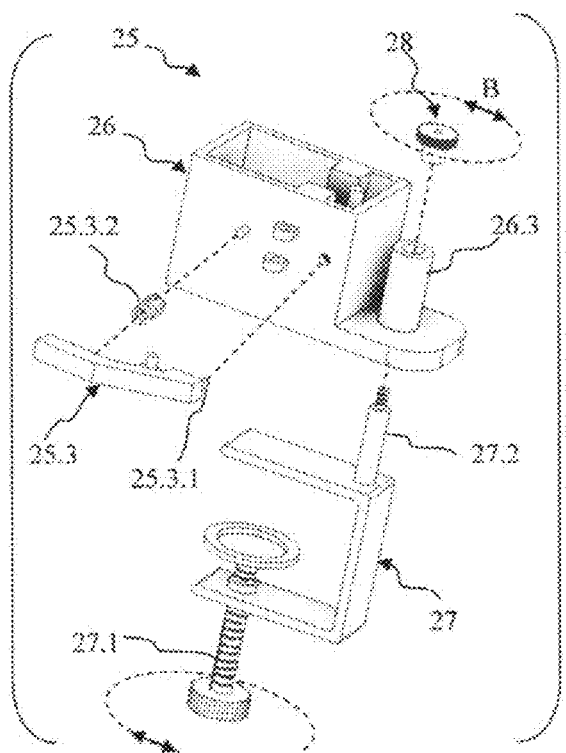
Figure 5F:
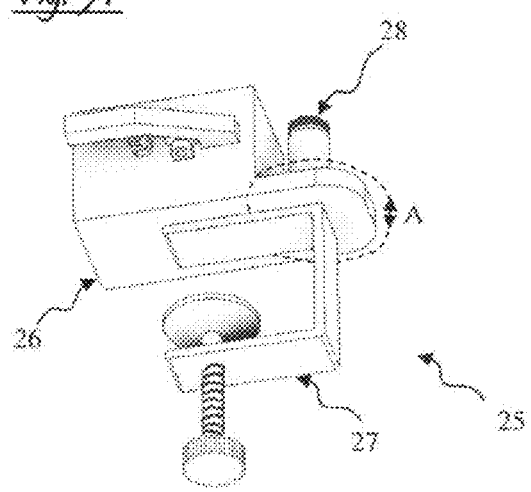
Figure 5G:
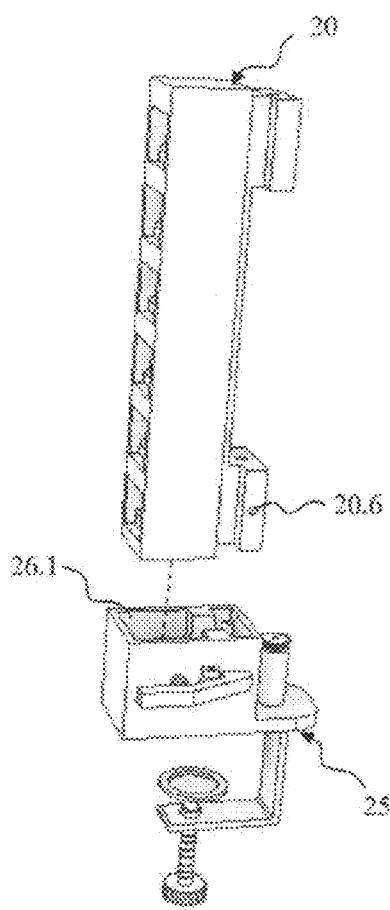
Figure 5H:
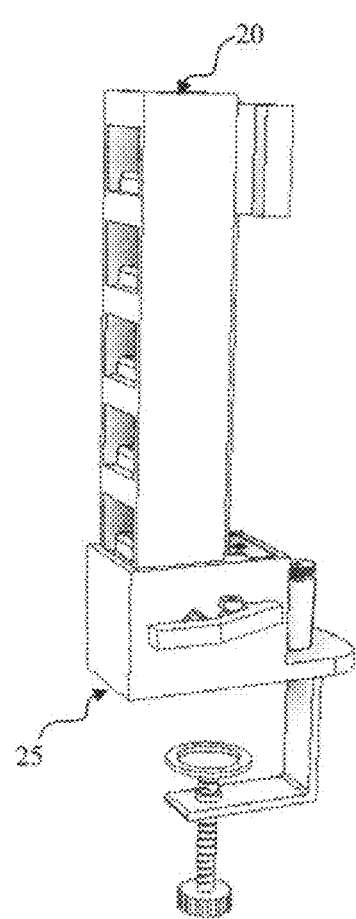

In FIG. 5A, the Rail Top-Mount 20.2 inserts into the Top Wall-Mount Bracket 22 when the Rail 20 is wall mounted, and secured using the Rail Top-Cap 21 and a Mount Nut 23 as shown in FIG. 5B. The Rail Top-Cap 21 also prevents the Shoulder Brackets 40 from being removed from the Rail 20. Referring back to FIG. 5A, the Rail Bottom-Mount 20.5 inserts into in the Bottom Wall-Mount Bracket 24 and is secured using the Mount Nut 23 as shown in FIG. 5B. FIG. 5C illustrates the Rail 20 as it would appear secured to the respective Wall Mounts. The Rail 20 can also be mounted in the Desktop Mount 25 as shown in FIG. 5 (D-H). FIG. 5D shows a perspective top view of the Desktop Mount 25 identifying key features for securing the Rail 20 including the Mounting Port 26.1 into which the Rail 20 docks, the Mount Bolt 26.2 which helps align the Rail 20 into the Mount Port 26.1 and the Lock Lever 25.3. The parts which make up the Desktop Mount 25 are illustrated in the exploded view FIG. 5E and is composed of two (2) major parts namely the Desktop Rail-Mount 26 and the Desktop Clamp 27. Referring to FIG. 5E the Desktop Clamp-Shaft 27.2 is inserted into the Desktop Rail-Mount Shaft Receptacle 26.3 and secured with the Rotation Clamp 28 which rotates, as illustrated by Arrow B, clockwise to lock the Desktop Rail-Mount 26 to the Desktop Clamp 27 or anti-clockwise, to enable the Desktop Rail-Mount 26 to rotate 360° horizontally about the Desktop Clamp 27, whilst the Clamp Vice 27.1 also rotates clockwise to clamp firmly onto a desktop surface or anti-clockwise to release the Desktop Mount 25 as shown by Arrow A. The Lever-Shaft 25.3.1 protrudes into the Mount Port 26.1 and is mounted onto the Desktop Mount 25 as shown in FIG. 5E, and kept in position by the Lever Spring 25.3.2. When the Rail 20 is inserted into the Mount Port 26.1, the Shaft feature 25.3.1 is forced temporarily out of the Mount Port 26.1 and then snaps back into the Rail Slot 20.6 as the Rail 20 is fully inserted into the Mount Port 26.1 securing the Rail 20 in position as shown in FIG. 5G-H.

The Rail 20 can also be mounted in the Wheel Mount 30 illustrated in FIG. 5J, which contains three (3) major parts namely the Upper Rail Mount 31, the Wheel Base 32 and the Base Cap 33 which is shown in FIG. 5I. Referring to FIG. 5J the Upper Rail Mount 31 has a Mount Port 31.2 within which the Rail 20 is inserted, a Mount Bolt 31.1 for aligning the Rail 20 and a Lock Lever 35 for locking in the Rail 20. The Lock Lever 35 works identical to the Lock Lever 25.3 in the Desktop Mount 25. The Wheel base 32 has a square shaped Base Joint 32.3 with four (4) identical connected legs each composed of an Upper Leg 32.1 a Lower Leg 32.2 and a Wheel 34 as illustrated in FIG. 5I. Referring to FIG. 5K, the Lower Leg 32.2 can move within the Upper Leg 32.1 as shown by arrow B to extend the leg for supporting the workstation or retract the legs for saving space and improving portability. The extended legs are each longer than a fully extended Support Arm 200 to ensure the Workstation 1 doesn't tilt, and each has a Wheel 34 which can rotate 360° as shown by arrow C in FIG. 5K. The Wheels 34 can be locked to prevent movement of the Wheel Mount 30 or un-locked to allow the Wheel Mount 30 to be moved. The Upper Rail Mount 31 attaches to the Wheel Base 32 by screwing in the Base Shaft 31.4 into the Wheel Base Hole 32.3.1 as illustrated FIG. 5I. The Base Cap 33 is then screwed into the Base Shaft 31.4 as shown in FIG. 5I. Rotating the Upper Rail Mount 31 about the Wheel base 32 as shown by arrow A in FIG. 5K increases or decreases the vertical height of the Wheel Base 30 as indicated by arrow H.

The Arm 200 is an important component of the Workstation 1 and as shown in FIG. 6, is composed of nine (9) major components, namely the Shoulder Bracket 40, the Upper Arm 60, the Lower Arm 80, the Wrist 100, the Palm 110, and four (4) identical Fingers 115.

The part of the Arm 200 directly attached to the Rail 20 is the Shoulder Bracket 40 whose responsibility is securing the Arm 200 to the Rail 20 and enables vertical movement of the Arm 200 along Rail 20 to facilitate height adjustment of attached objects. FIG. 7A illustrates an assembled Shoulder Bracket 40. FIG. 7C illustrates an exploded view of the Shoulder Bracket 40 which is composed of the Outer Shoulder Bracket 41, the Inner Shoulder Bracket 42, two (2) Shoulder-Bracket Wheels 43, two (2) Spring Blocks 44 and two (2) Compression Springs 45.

Figure 7D:
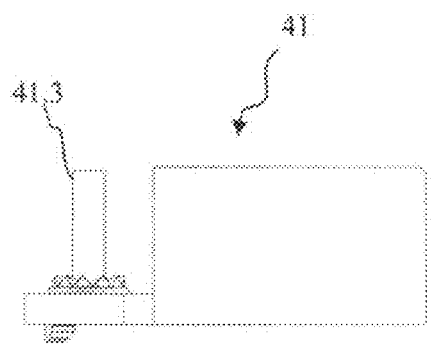
FIG. 7D Is a Side view of one embodiment of the Outer Bracket 41
Figure 7E:
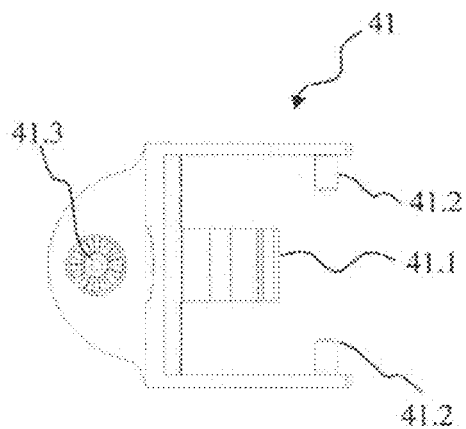
FIG. 7E Is a Top view of Outer Bracket 41
Figure 7F:
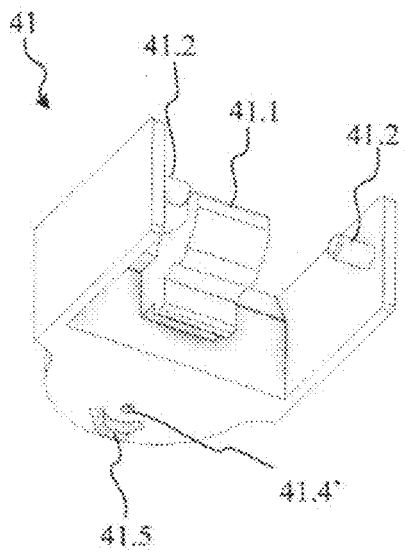
FIG. 7F Is a Bottom perspective view of Outer Bracket 41
Figure 7G:
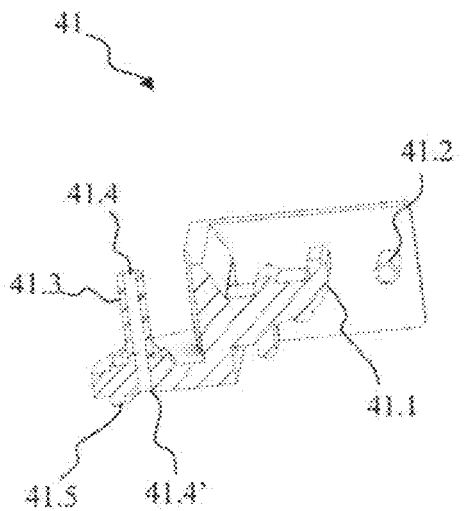
FIG. 7G Is a sectional view of Outer Bracket 41

FIG. 7 (D-G) illustrates the features of the Outer Shoulder Bracket 41 including the Bracket Shaft 41.3, shown in FIG. 7D, that inserts into the Upper Arm Joint 61 to secure the Upper Arm 60 to the Shoulder Bracket 40, the Rail Insert 41.1 that passes through the Bracket Window 42.7 to secure the Shoulder Bracket 40 inside the Rail Port 20.1 and the two (2) Bracket Guides 41.2, shown in FIG. 7(E-F), which functions to help position the Outer Shoulder Bracket 41 correctly over the Inner Shoulder Bracket 42 and compress the Compression Springs 45 when moving the Arm 200, and ensuring that the Outer Shoulder Bracket 41 travels along the Bracket Track 42.5 throughout its movement. The Lock Mound 41.5 shown in FIG. 7(F-G) is used when securing the Upper Arm 60. FIG. 7G shows a sectional view of the Outer Shoulder Bracket 41 highlighting the important features of the Rail Insert 41.1 which enables its functions.

Figure 7H:
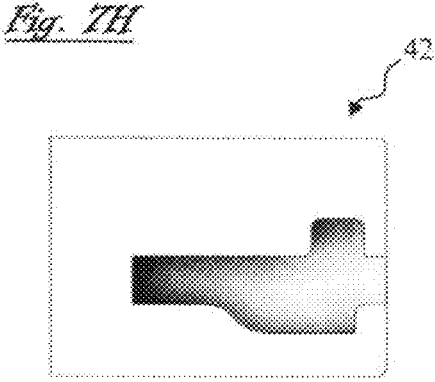
FIG. 7H Is a Side view of one embodiment of the Inner Bracket 42
Figure 7I:
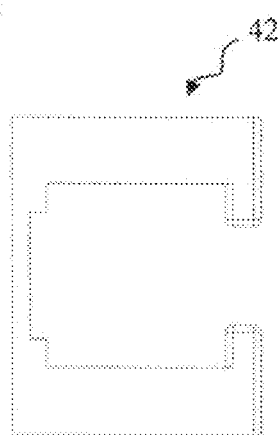
FIG. 7I Is a Top view of Inner Bracket 42
Figure 7J:
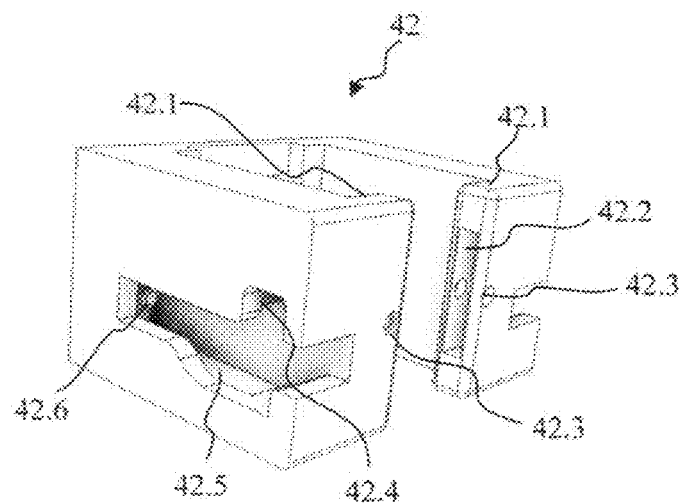
FIG. 7J Is a Rear perspective view of Inner Bracket 42
Figure 7K:
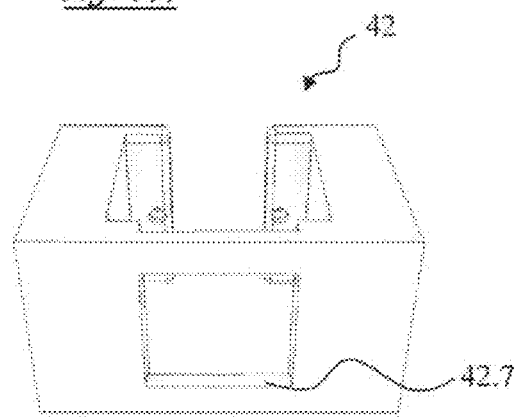
FIG. 7K Is a Front perspective view of Inner Bracket 42 revealing one embodiment of the Window 42.7
Figure 7L:
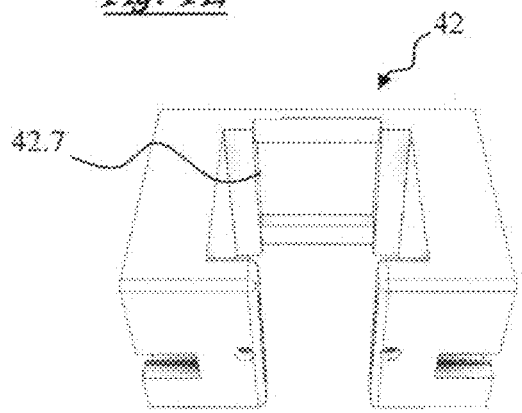
FIG. 7L Is a Rear perspective view of Inner Bracket 42 revealing Window 42.7
Figure 7P:
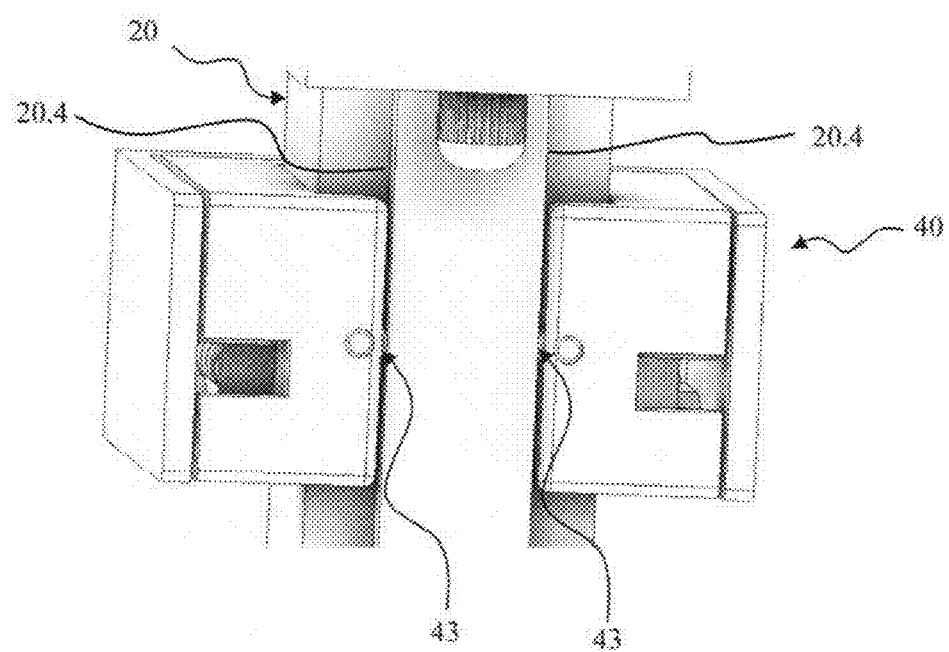
FIG. 7P Is a rear view of Shoulder Bracket 40 attached to Rail.

FIG. 7 (H-L) illustrates the Inner Shoulder Bracket 42 with FIG. 7H showing a side view of the Inner Shoulder Bracket 42. FIG. 7I shows a top view of the Inner Shoulder Bracket 42. FIG. 7J illustrates a rear perspective view of the Inner Shoulder Bracket 42 and highlights some of its features including the 2 Rail Guards 42.1, the Wheel Well 42.2, the two (2) Wheel Slots 42.3, the Bracket Guide Dock 42.4, the Bracket Track 42.5 and the Spring Retainer 42.6. FIG. 7K shows a front perspective view of the Inner Shoulder Bracket 42 highlighting the Bracket Window 42.7 and FIG. 7L shows a rear perspective view of the Inner Shoulder Bracket 42 illustrating the Bracket Window 42.7.

The Outer Shoulder Bracket 41 facilitates the locking and unlocking of the Shoulder Bracket 40 inside the Rail 20 via the Rail Insert 41.1. The two Bracket Guides 41.2 position themselves in the two (2) Bracket Tracks 42.5, and together with the Rail Insert 41.1, help to keep the Outer Shoulder Bracket 41 in position over the Inner Shoulder Bracket 42. Referring back to the sectional view of the Shoulder Bracket 40 in FIG. 7 (N-O), the two Compression Springs 45 are positioned inside the Shoulder Bracket Tracks 42.5 on both sides of the Inner Shoulder Bracket 42 and are secured between the Spring Guide 42.6 and the Spring Block 44 and serves, to keep the Rail Insert 41.1 inserted in the Bracket Window 42.7 as shown in FIG. 7M, and provide resistance when trying to pull the Outer Shoulder Bracket 41 out of the Inner Shoulder Bracket 42.

The Shoulder Bracket 40 wraps around the Rail 20 as illustrated in FIG. 7P.

Figure 8A:
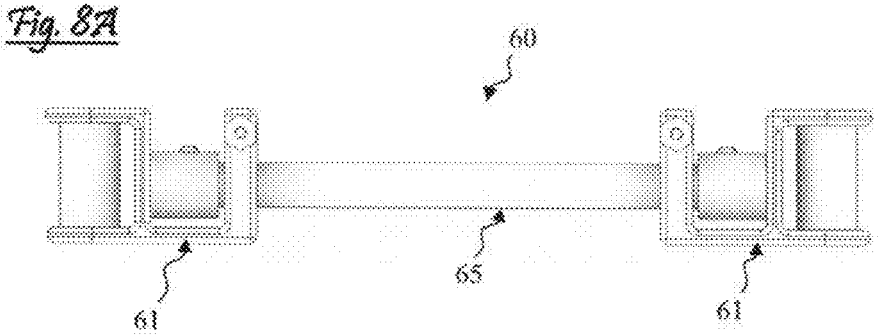
FIG. 8A Is a Side view of one embodiment of the Upper Arm 60
Figure 8B:
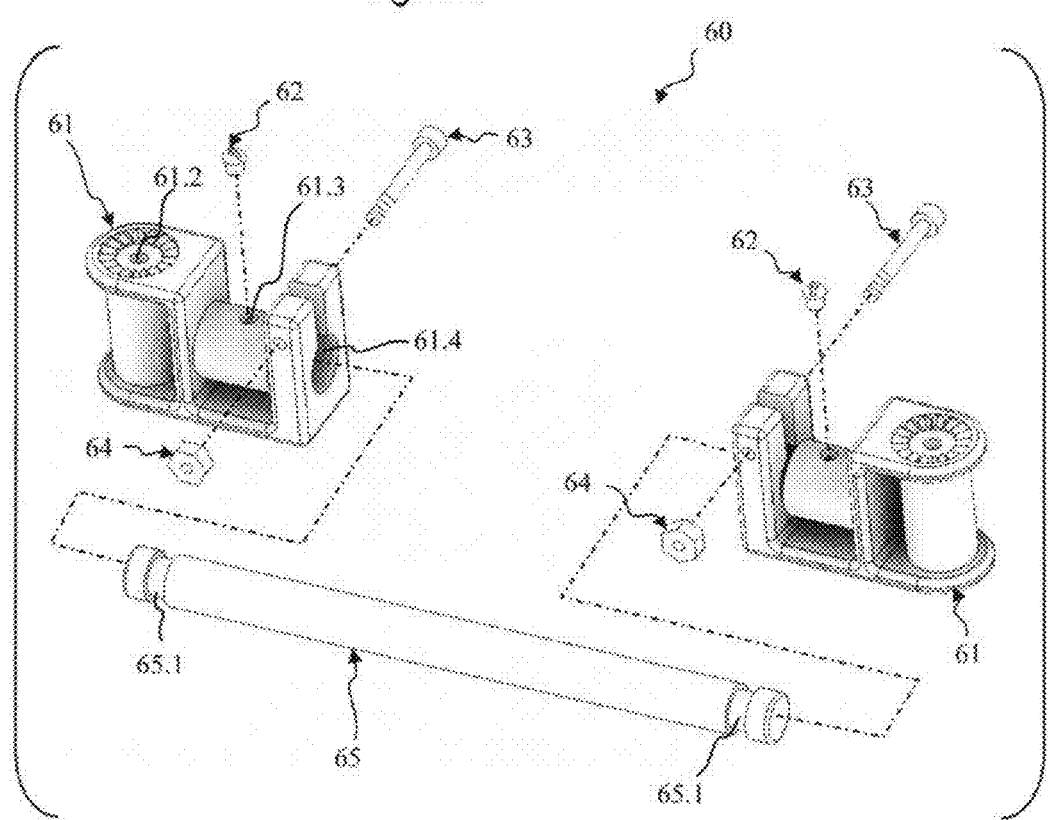
FIG. 8B Is an exploded view of the Upper Arm 60
Figure 8C:
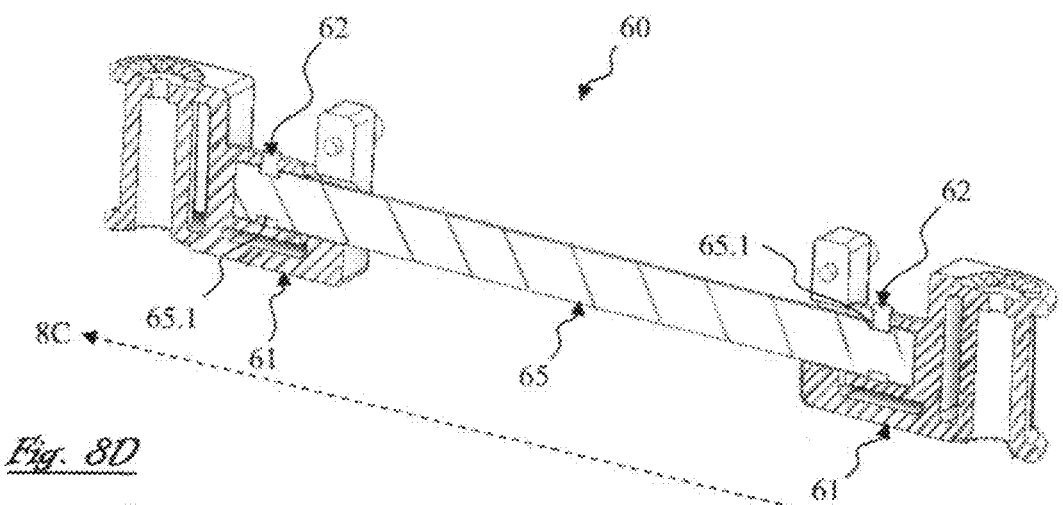
FIG. 8C Is a sectional view of the Upper Arm 60
Figure 8D:
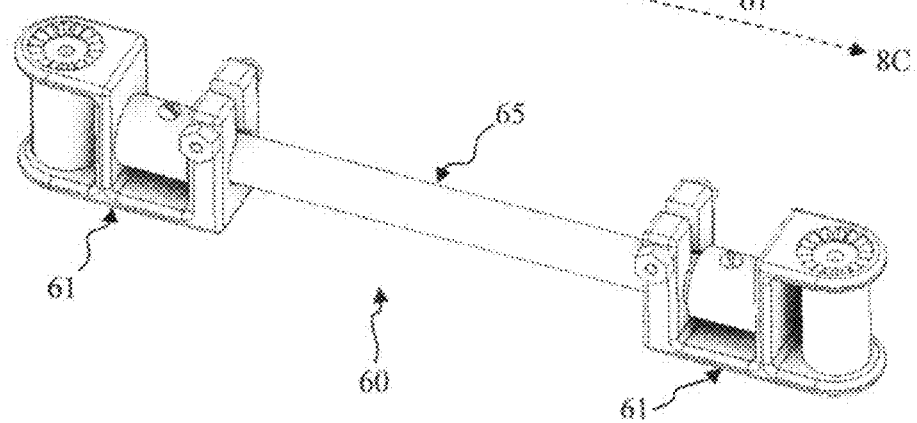
FIG. 8D Is a Top perspective view of the Upper Arm 60
Figure 8E:
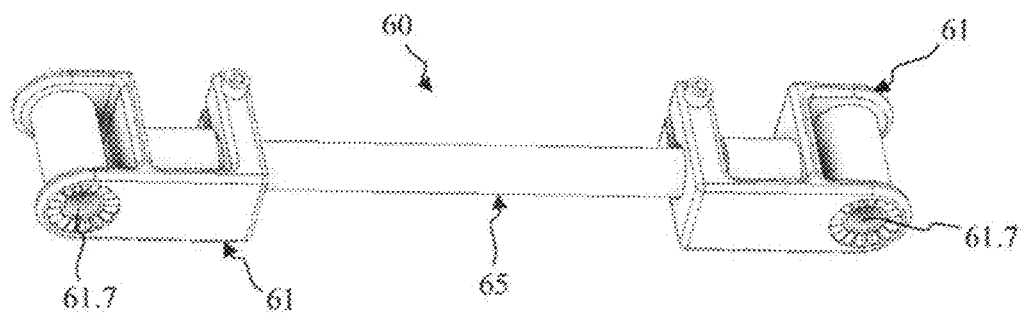
FIG. 8E Is a Bottom perspective view of the Upper Arm 60

Referring back to FIG. 6, attached to the Shoulder Bracket 40 is the Upper Arm 60 which, as shown in FIG. 8A, contains 3 major parts namely the Upper-Arm Rod 65 and two (2) Upper-Arm Joints 61 which are identical in structure and are positioned on each end of the Upper-Arm Rod 65. Referring to FIG. 8B, the Upper Arm 60 contains other parts including two (2) identical Rod Screws 62, two (2) Upper-Arm Bolts 63 and two (2) Upper-Arm Nuts 64. The Upper Arm 60 is assembled by inserting each end of the Upper-Arm Rod 65 completely into the Upper-Arm Rod Hole 61.4 of each Upper-Arm Joint 61 aligning the Rod slots 65.1 with the each Upper-Arm Joint screw hole 61.3 which allows the Rod Screw 62 to be screwed in and project itself into the Rod slot 65.1 securing the Upper-Arm Rod 65 inside the Upper-Arm Joint 61 as projected in the sectional view of the Upper Arm 60 in FIG. 8C. The Upper-Arm Bolt 63 and Nut 64 are used to secure and prevent the Upper-Arm Rod 65 from spinning and keeps it in place inside the Upper-Arm Joints 61. FIG. 8D shows a top perspective view of the assembled Upper Arm 60 and FIG. 8E shows a bottom perspective view of the assembled Upper Arm 60.

Referring to FIG. 9A, the Upper Arm 60 attaches directly to the Shoulder Bracket 40 and can rotate horizontally 180° illustrated by directional arrow A. FIG. 9B illustrates that the Upper Arm 60 is mounted onto the Shoulder Bracket 40 by inserting the Bracket Shaft 41.3, into the Upper-Arm Joint slot 61.7 previously shown in FIG. 8E, after which a Joint Bolt 67 is passed through the Upper-Arm Joint bolt hole 61.2 and through the Bracket Shaft protrusion bolt hole 41.4 and then secured with a Quick-Lock 300. FIG. 9C illustrates a sectional view of the Upper Arm 60 securely positioned on the Shoulder Bracket 40. Once secured to the Shoulder Bracket 40, the Upper Arm 60 can be utilized as a handle to assist in moving the Arm 200 along the Rail 20.

Figure 10A:
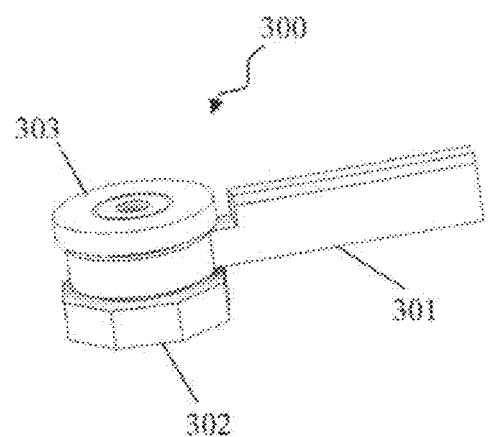
FIG. 10A Illustrates one embodiment of the Quick-Lock mechanism 300
Figure 10B:
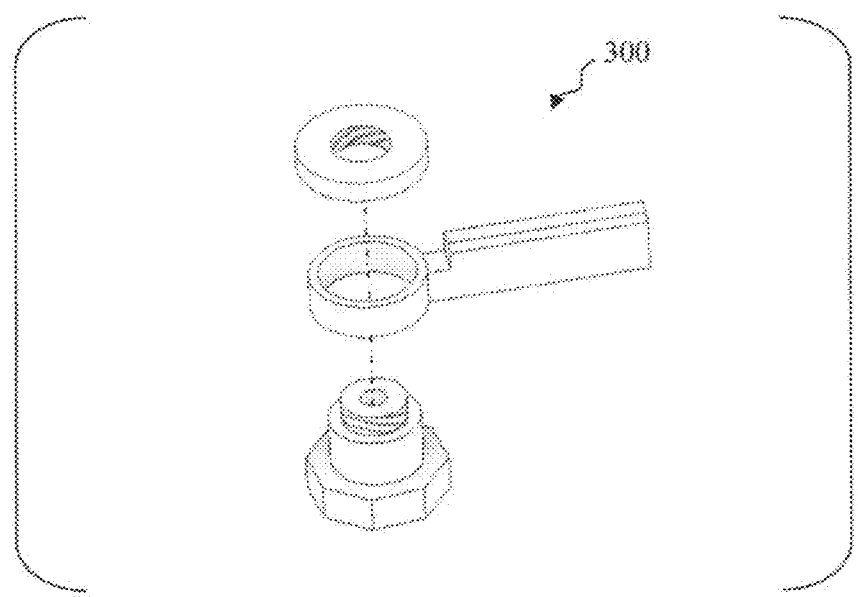
FIG. 10B Is an exploded view of the Quick-Lock 300
Figure 10C:
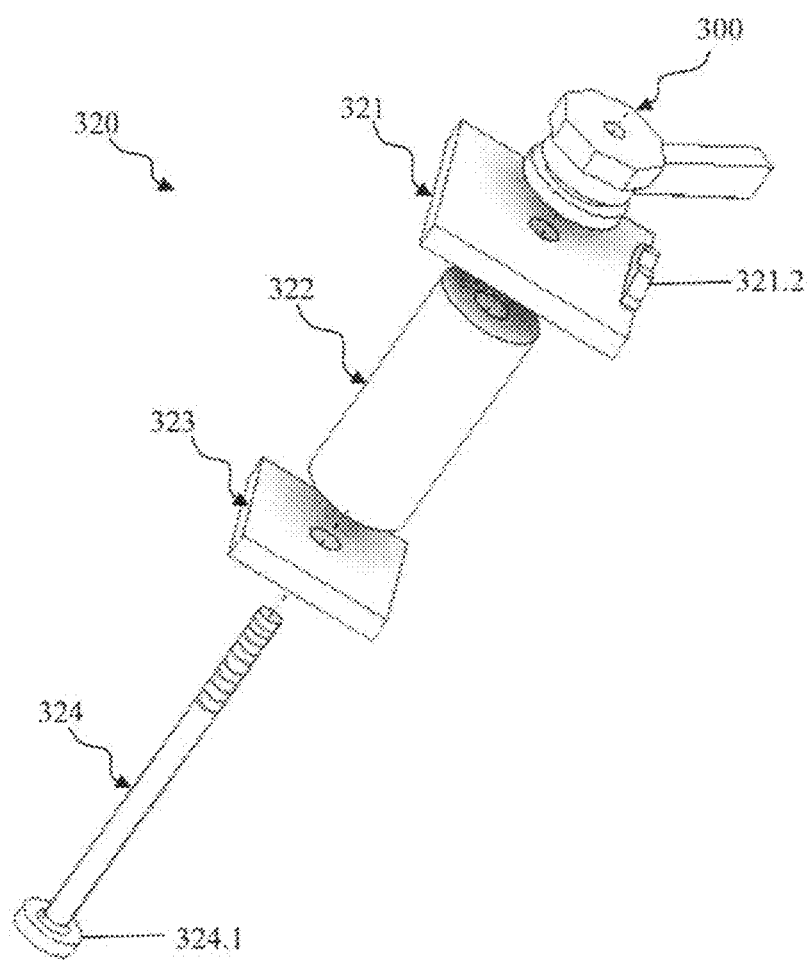
FIG. 10C Illustrates how the Quick-Lock 300 works
Figure 10D:
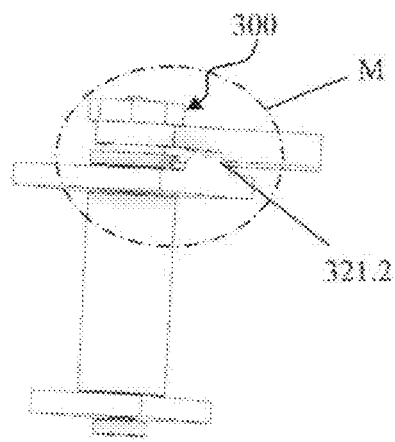
FIG. 10D Shows the Quick-Lock 300 un-locked
Figure 10E:
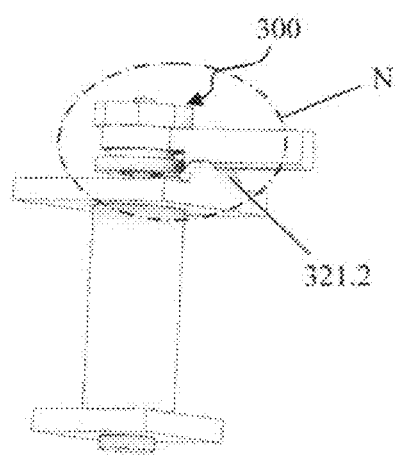
FIG. 10E Shows the Quick-Lock 300 locked
Figure 10F:
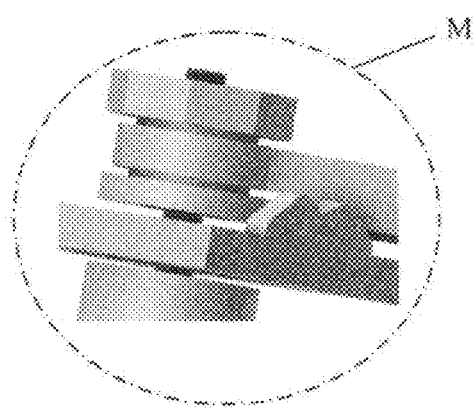
FIG. 10F Shows magnified view of Quick-Lock 300 un-locked
Figure 10G:
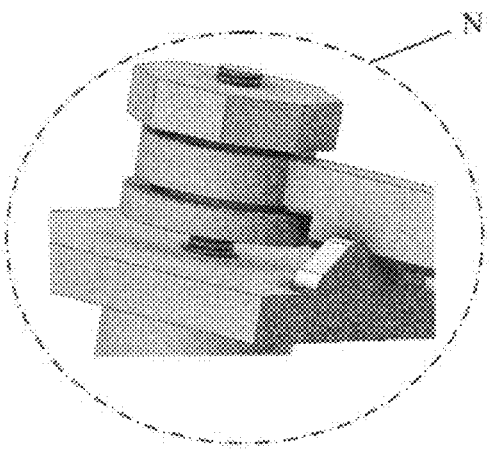
FIG. 10G Shows magnified view of Quick-Lock 300 locked

The Quick-Lock 300 as shown in FIG. 10A is used to secure the Upper Arm 60 to the Shoulder Bracket 40 and is used in numerous places in the Arm 200 for securing components to each other. FIG. 10B shows an exploded view of the Quick-Lock 300. Illustrated in FIG. 10(C-E) the Quick-Lock 300 works with the Lock Mound 321.2 and a Lock Bolt 324 to lock or unlock devices to each other. Here three (3) objects, Plate 321, Cylinder 322 and Plate 323 are being locked to each other. Moving the Lever over the Lock Mound 321.2 forces the Plate 321 down and the Lock Bolt 324 up. Because the Lock-Bolt head 324.1 is behind the Plate 323, this forces Plate 323 up. The upward movement of Plate 323 and downward movement of Plate 321 force all 3 objects to compress each other.

Figure 11A:
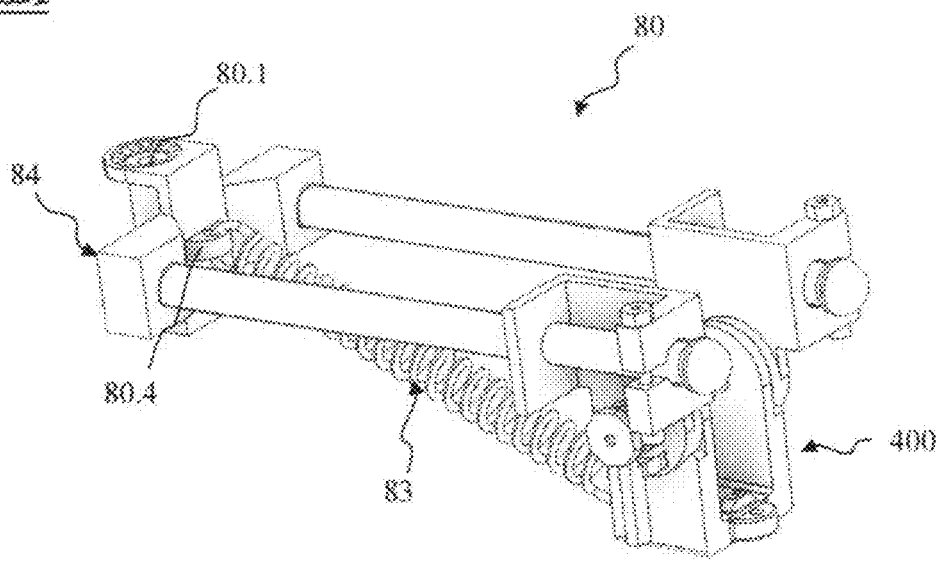
FIG. 11A Shows a top perspective view of one embodiment of the Lower Arm 80
Figure 11B:
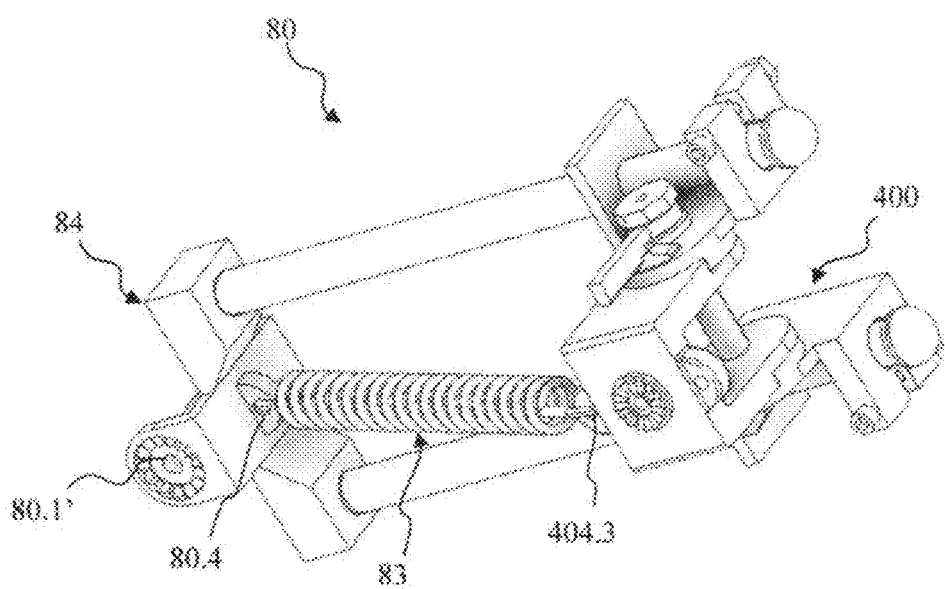
FIG. 11B Shows a bottom perspective view of the Lower Arm 80
Figure 11C:
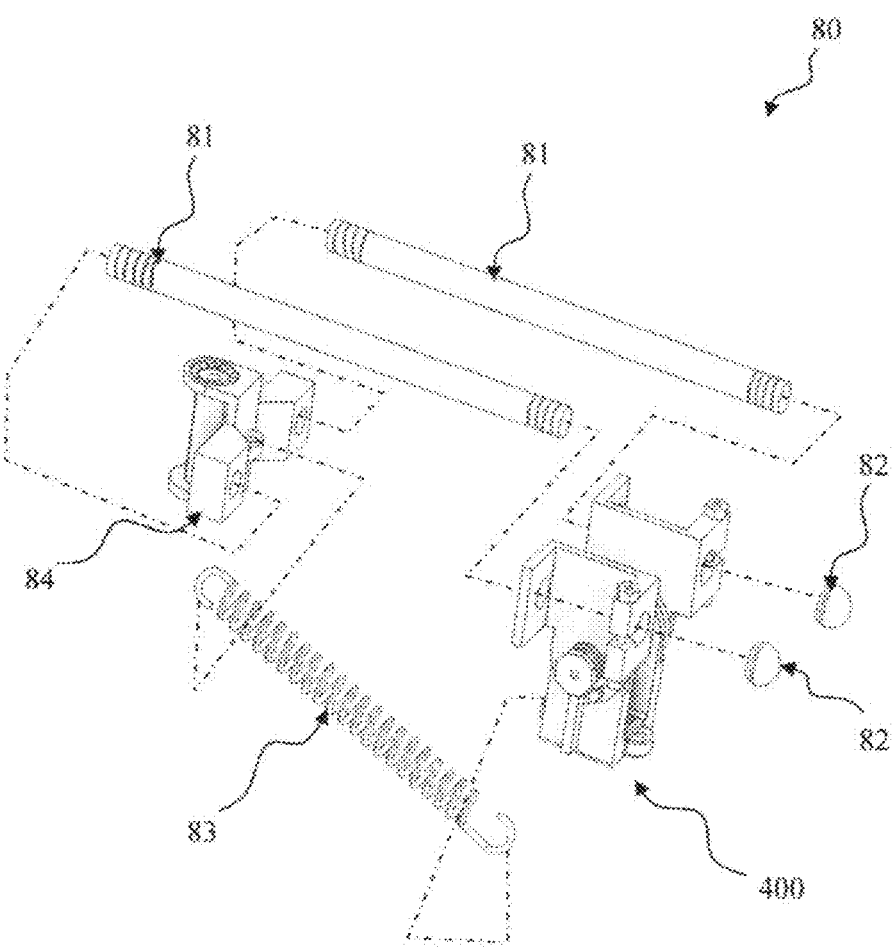
FIG. 11C Shows an exploded view of the Lower Arm 80
Figure 11D:
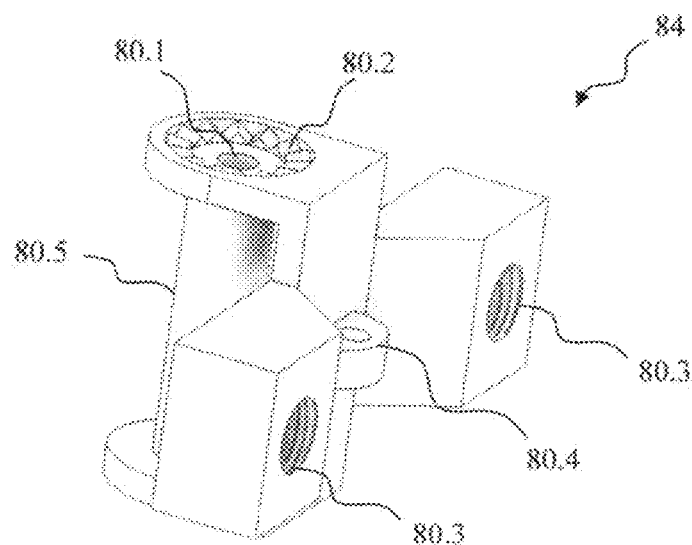
FIG. 11D Shows a top perspective view of one embodiment of the Rod Connector 84
Figure 11E:
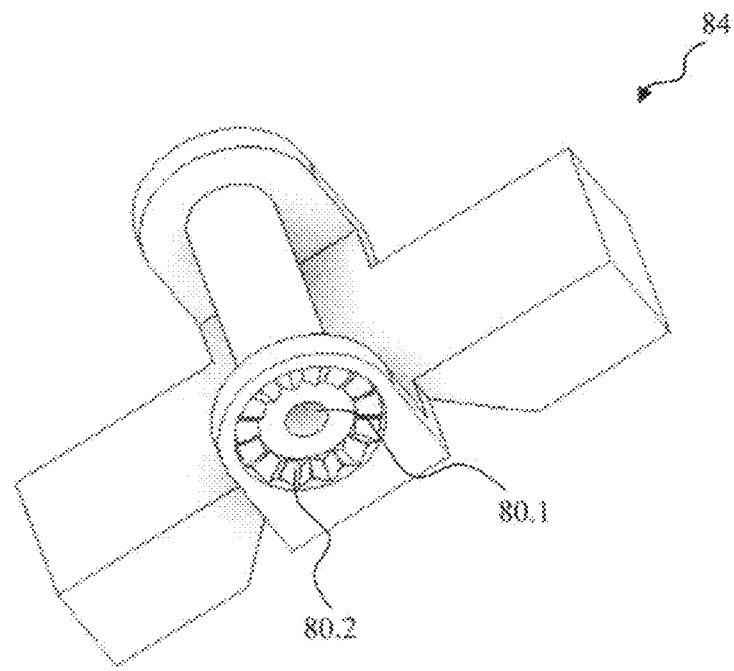
FIG. 11E Shows a bottom perspective view of the Rod Connector 84

Referring back to FIG. 6, the other end of the Upper Arm 60 is attached to the Lower Arm 80. FIG. 11A displays a top perspective view of the Lower Arm 80 whilst FIG. 11B shows a bottom perspective view of the Lower Arm 80. The exploded view of the Lower Arm FIG. 11C shows that it is made up of 6 parts and 1 component namely the two (2) Lower-Arm Rods 81, the Multi-Pivot Joint component 400, the two (2) Rod Caps 82, the Arm Support Spring 83 and the Rod Connector 84. The Rod Connector 84, illustrated in FIG. 11D is responsible for locking the two (2) Lower Arm Rods 81 in position relative to each other, and for providing a pivot base for the Wrist 100. FIG. 11E shows a bottom perspective view of the Rod Connector 84.

Figure 11F:
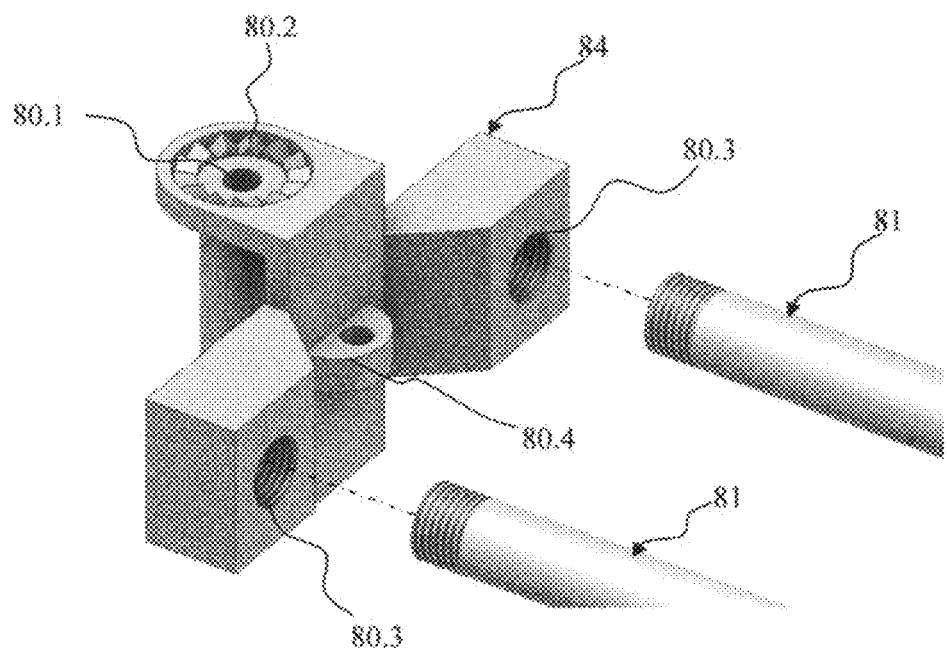
FIG. 11F Shows a detail view of the Rod Connector 84 attaching one embodiment of the Rods 81
Figure 11G:
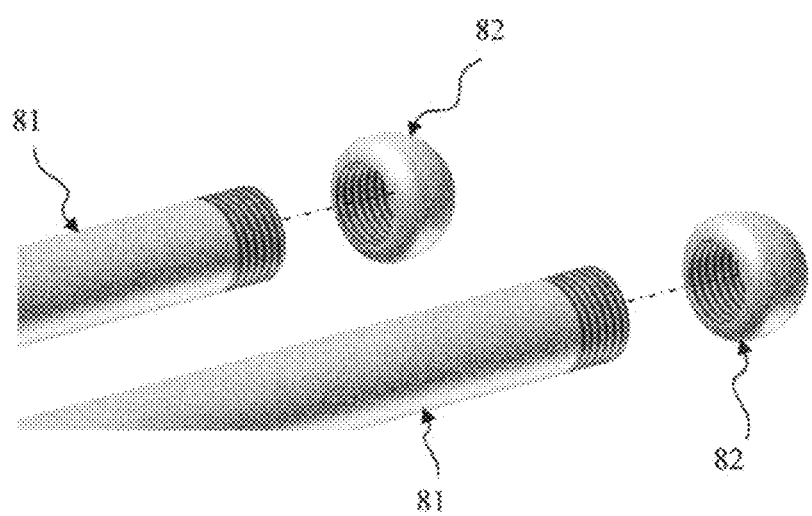
FIG. 11G Shows a detail view of the Rods 81 attaching one embodiment of the Rod Caps 80.2

The two (2) Lower-Arm Rods 81 are identical with screw threads on both ends as shown in FIG. 11C. The two (2) Lower-Arm Rods 81 are screwed into the Rod Connector port 80.3 as shown in FIG. 11F and the other end of the two (2) Lower-Arm Rods 81 are inserted through the Multi-Pivot Joint 400 and the two (2) Rod Caps 82 are screwed onto the exposed ends of the Lower-Arm Rods 81 as shown in FIG. 11G. The Rod Caps 82 prevent the Lower-Arm Rods 81 from withdrawing from the Multi-Pivot Joint component 400. The Arm Support Spring 83 shown in FIG. 11B is attached to the Rod Connector 84 at feature 80.4 and the Multi-Pivot Joint 400 at feature 404.3, and provides support to the Arm 200 when adjusting the vertical angle of the Lower Arm 80, as shown by arrow V in FIG. 13 A, relative to the Upper Arm 60, with or without an attached object.

Figure 12A:
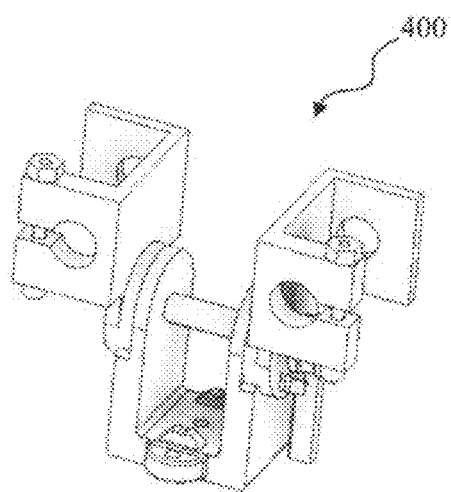
FIG. 12A Shows a top perspective view of one embodiment of the Multi-Pivot Joint Assembly 400 which is used, in one embodiment of the Lower Arm Assembly 80 and one embodiment of the Wrist Assembly 100, to provide horizontal and vertical rotation of attached components.
Figure 12B:
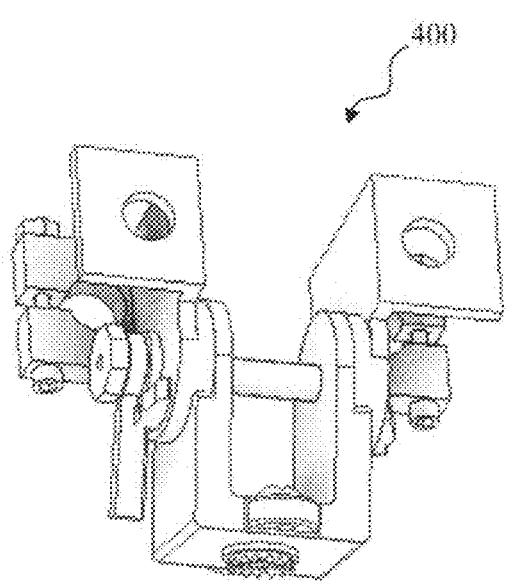
FIG. 12B Shows a bottom perspective view of the Multi-Pivot Joint Assembly 400

Referring back to FIG. 11C a Multi-Pivot Joint 400 is used in the Lower Arm 80 and gives the Lower Arm 80 its ability to rotate/tilt vertically through 180° as shown by arrow V, and to rotate 360° horizontally as shown by arrow A in FIG. 13A. The Multi-Pivot Joint 400 is also responsible for securing the two (2) Lower-Arm Rods 81 in position at the set extension and allows the Rods to be extended or retracted to increase or decrease the extension of the Arm 200. The Multi-Pivot Joint 400 uses a Quick-Lock 300 to secure the Left Rod-Holder 412, the Center Bracket 404, and the Right Rod-Holder 402 to each other using a Lock bolt 408 as illustrated in FIG. 12C. A front and back view of the Left Rod-Holder 412 is shown in FIG. 12D.1 and FIG. 12D.2 respectively, and FIG. 12D.3 and FIG. 12D.4 show a front and back view of the Right Rod-Holder 402. The Left Rod-Holder Teethed interface 412.1 FIG. 12D.1, and the Right Rod-Holder Teethed interface 402.1 FIG. 12D.3, bind to the teethed interface 404.4 on each side of the Center Bracket 404 illustrated in FIG. 12E.1 and FIG. 12E.2 to control rotation of the attached rods.

The Lower Arm 80 is attached to the Upper Arm 60 as shown in FIG. 13A. FIG. 13B illustrates how they are secured to each other using a Joint Bolt 67 and a Quick-Lock 300 after inserting a Spacer 66 inside the Upper-Arm Joint hole 61.7. Referring back to FIG. 6, it can be seen that the Lower Arm 80 is also connected to Wrist 100.

Figure 14A:
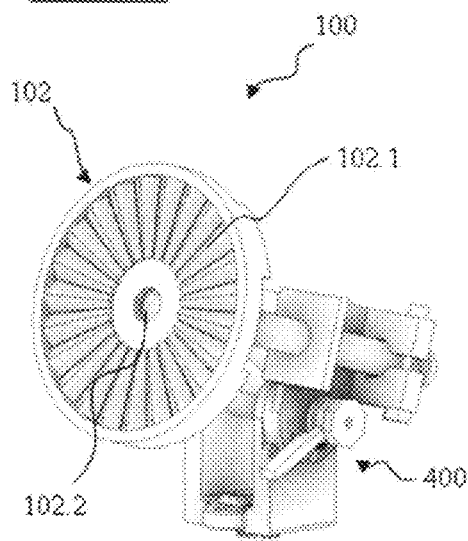
FIG. 14A Is a front perspective view of one embodiment of the Wrist 100
Figure 14B:
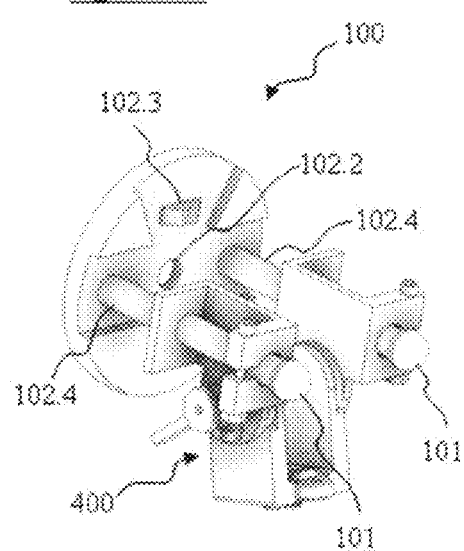
FIG. 14B Is a rear perspective view of the Wrist 100
Figure 14C:
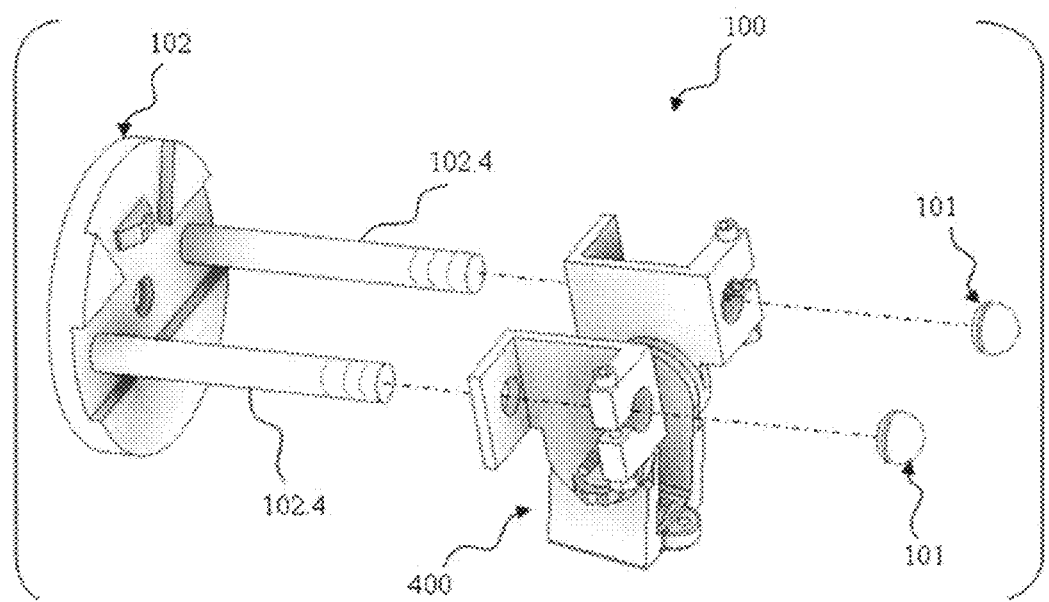
FIG. 14C Is an exploded view of the Wrist 100

The Wrist 100 is composed of the Palm Rotator 102, a Multi-Pivot Joint 400, and 2 Rod Caps 101 as shown in FIG. 14C. FIG. 14A shows a front perspective view of the Wrist 100 highlighting the Palm-Rotator Interface 102.1 which allows it to securely bind to the Palm 110 to hold it in position, and the Palm-Rotation hole 102.2 through which the Palm-Shaft 110.1 illustrated in FIG. 17A. FIG. 14B shows a rear perspective view of the Wrist 100 highlighting the back structure of the Palm Rotator 102 illustrating the elevated lock feature 102.3, and the two (2) Wrist-Shafts 102.4 secured within a Multi-Pivot Joint 400, which together with attached Rod Caps 101 ensure that the Wrist-Shafts 102.4 cannot be withdrawn from within the Multi-Pivot Joint 400.

Figure 15A:
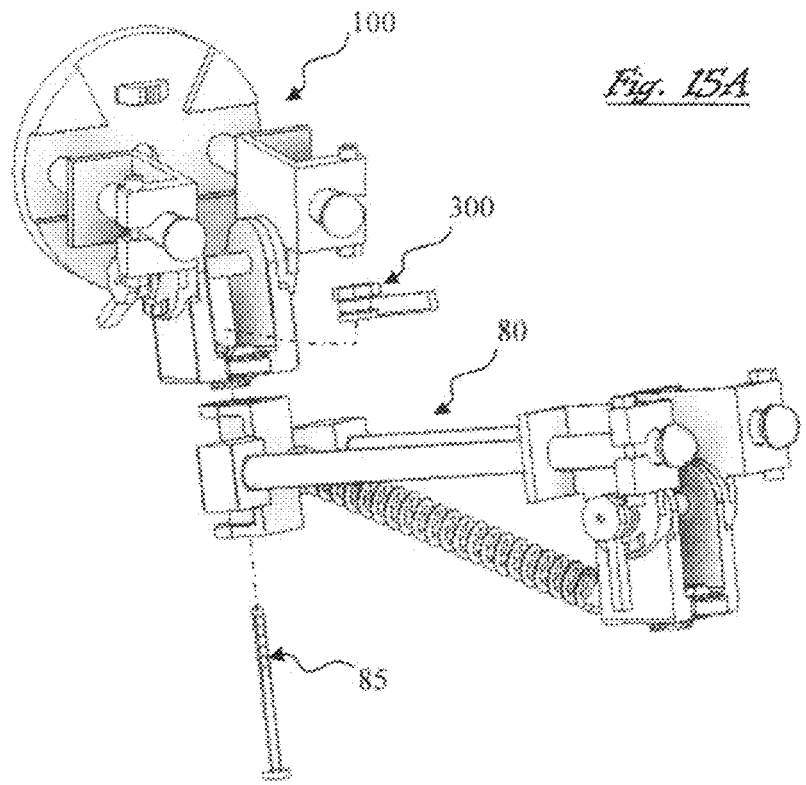
FIG. 15A Illustrates how the Wrist 100 connects to the Lower Arm 80
Figure 15B:
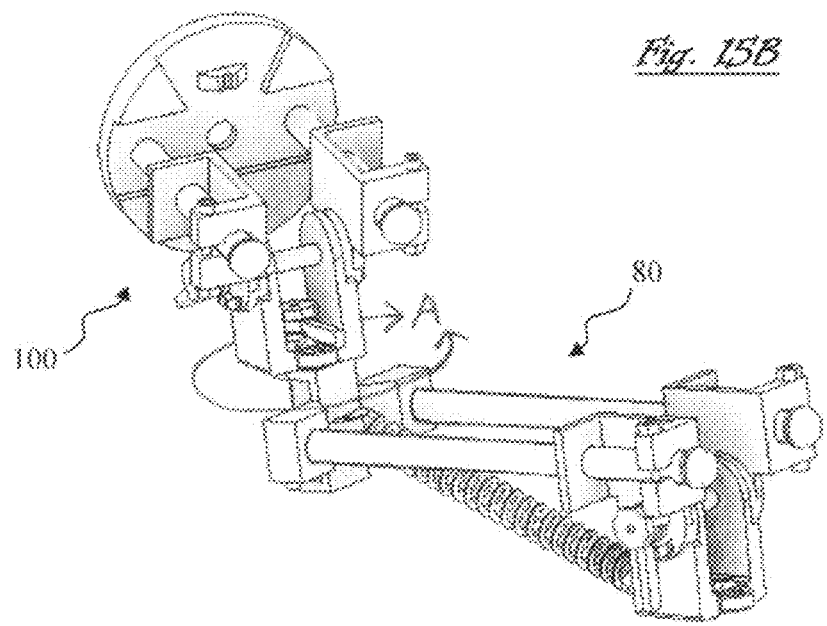
FIG. 15B Shows the Wrist 100 connected to the Lower Arm 80 which enables the Wrist to rotate 360° horizontally FIG. 16A Shows a top perspective view of one embodiment of the Palm 110

The Wrist 100 connects to the lower Arm 80 and is secured using a Quick-Lock 300 and Bolt 85 as shown in FIG. 15A. This configuration allows the Wrist 100 to rotate 360° horizontally about the Lower Arm 80 as illustrated by directional arrow A in FIG. 15B.

It should be noted that because the Wrist 100 utilizes a Multi-Pivot Joint 400 the same as the Lower Arm 80, it is possible to completely remove the Lower Arm 80 and attach the Wrist 100 directly to the Upper Arm 60 to create a shorter Arm 200

Figure 14D:
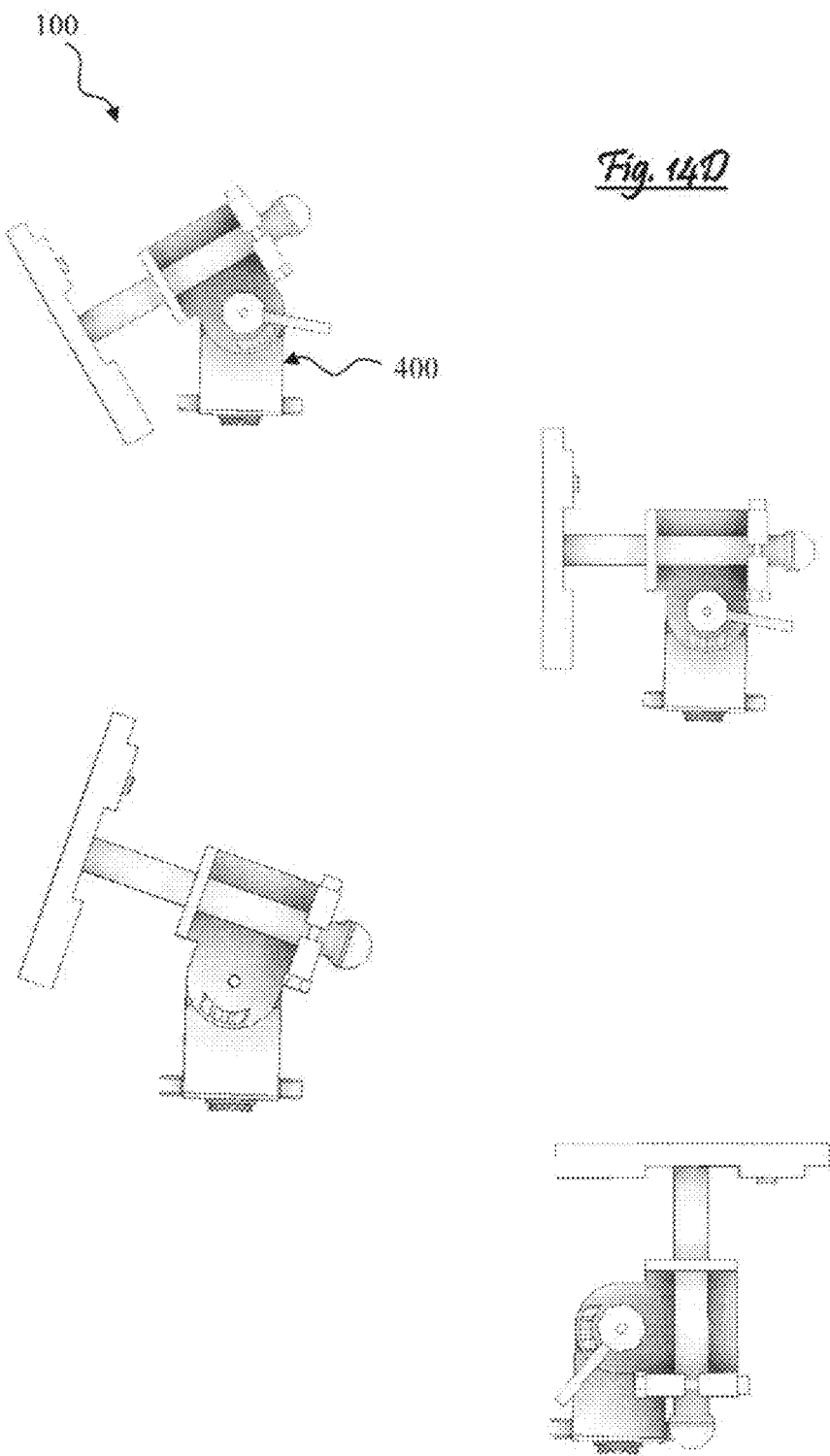
FIG. 14D Illustrates the Wrist 100 in various angled positions provided by the use of one embodiment of a Multi-Pivot Joint 400

Referring back to FIG. 6, the Wrist 100 serves to attach the Palm 110 to the Lower Arm 80 and to provide adjustability to the Palm 100 including 360° rotation of the Palm 110 about the Wrist 100, vertical up/down tilting of the Palm 110 as the Wrist 100 is tilted or vertically rotated as displayed in FIG. 14D.

The Palm 110 is a plate that has two faces where the top face 110.4 is completely flat and always faces the attached objects as shown in FIG. 16A, and the bottom face 110.5 which contains four (4) Finger Docking Ports 110.2 one in each corner of the Palm 110 for securing the Fingers 115, the Palm-Shaft 110.1 used for securing the Palm 110 to the Wrist 100 and the Palm-Rotator interface 110.3 as illustrated in FIG. 16B.

Figure 16C:
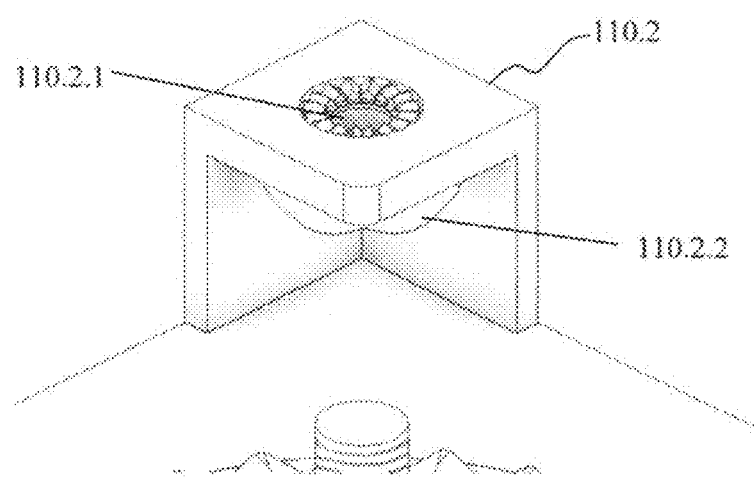
FIG. 16C Shows a top perspective magnified view of one embodiment of the Finger Docking Port.
Figure 16D:
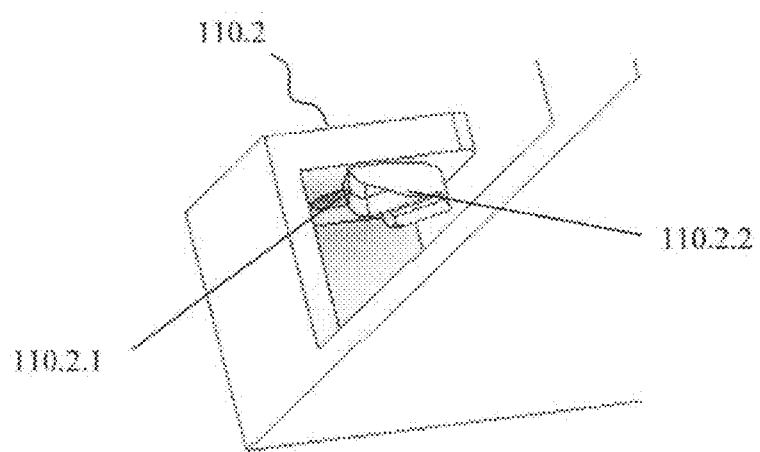
FIG. 16D Shows a bottom perspective magnified view of the Finger Docking Port.
Figure 17A:
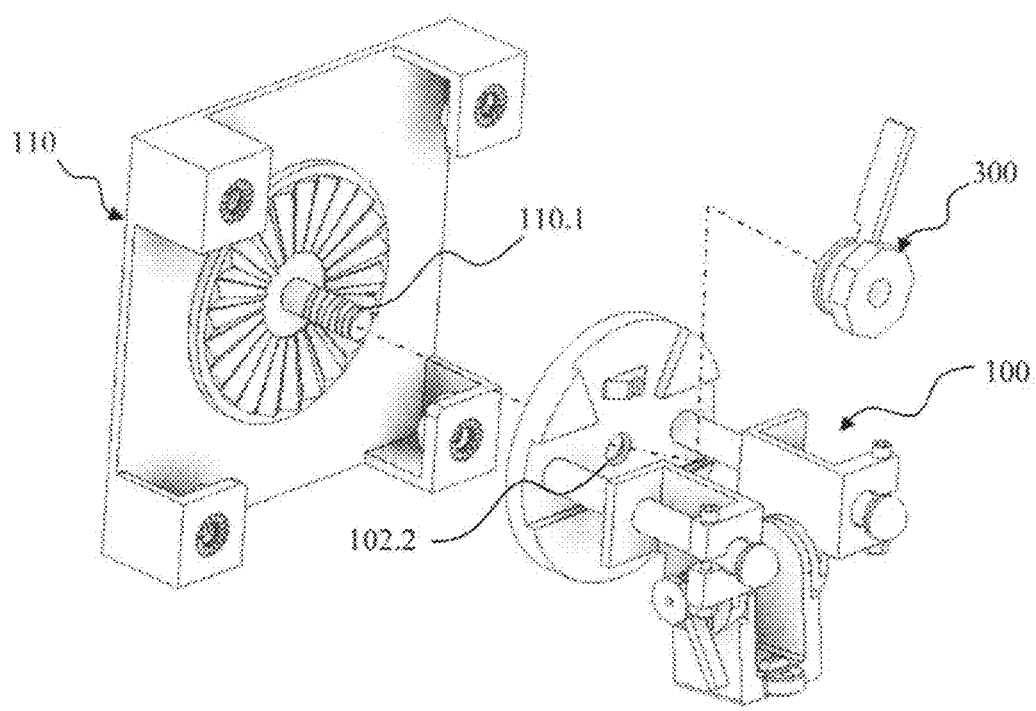
FIG. 17A Illustrates how the Palm 110 attaches to the Wrist 100
Figure 17B:
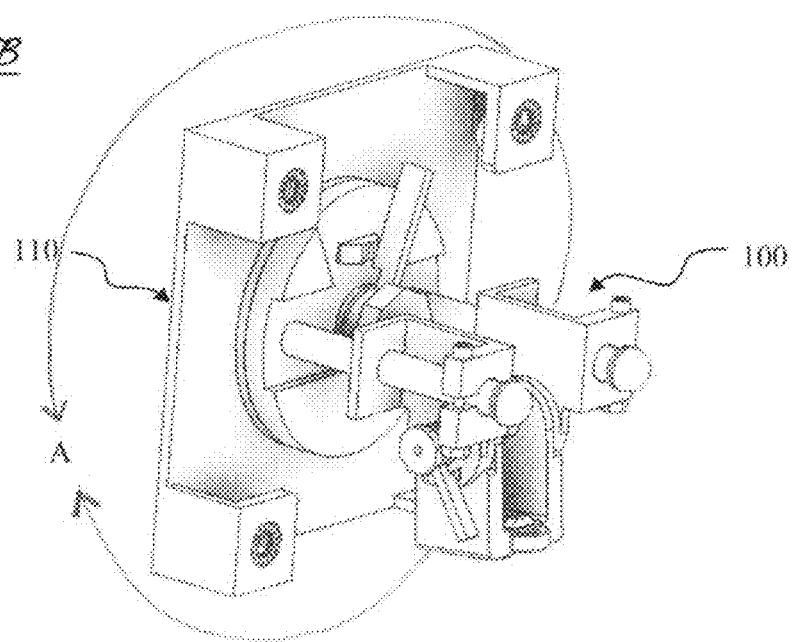
FIG. 17B Shows the Palm 110 attached to the Wrist 100 which gives the Palm 110 the ability to rotate 360° degrees about the Wrist 100.

The four (4) Finger Docking Ports 110.2 are identical in structure and as shown in FIG. 16C each has a Finger Docking hole 110.2.1 and an Elevated Quick-Lock Riser 110.2.2 displayed in FIG. 16D The Palm-Shaft 110.1 is inserted through the Palm-Rotation hole 102.2 and secured using a Quick-Lock 300 as shown in FIG. 17A. Once the Quick-Lock 300 isn't engaged the Palm 110 can rotate 360° about the Wrist 100 as indicated by arrow A in FIG. 17B.

As mentioned before, four (4) Fingers 115, identical in structure and operation, are attached to the four (4) Finger-Docking Ports 110.2 of the Palm 110 as illustrated in FIG. 18A. The assembled Palm 110 with all four (4) fingers forms the Hand 120.

The Finger component 115, illustrated in FIG. 18B is composed of a Knuckle Joint 115.1, an Upper Finger Rod 115.2, a Multi-Pivot Finger Joint component 500, a Lower Finger Rod 115.3, two (2) Rod End Caps 115.4 and a Finger End 115.5. FIG. 18C shows a full exploded view of the Finger 115.

The Finger 115 is attached to the Palm 110 via the Knuckle Joint 115.1 and is secured using a Quick-Lock 300 as illustrated in FIG. 18D. This gives the Finger 115 the ability to rotate 360° horizontally about the Finger Docking Ports 110.2 as shown by arrow A in FIG. 20.

Figure 19A:
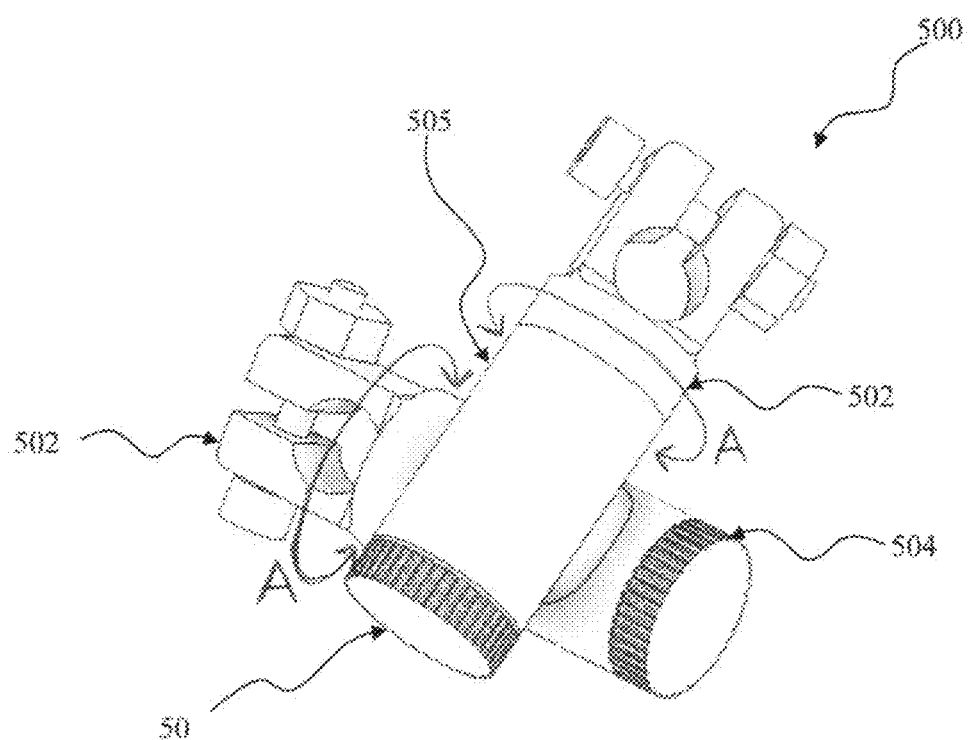
FIG. 19A Illustrates one embodiment of the Multi-Pivot Finger Joint 500
Figure 19B:
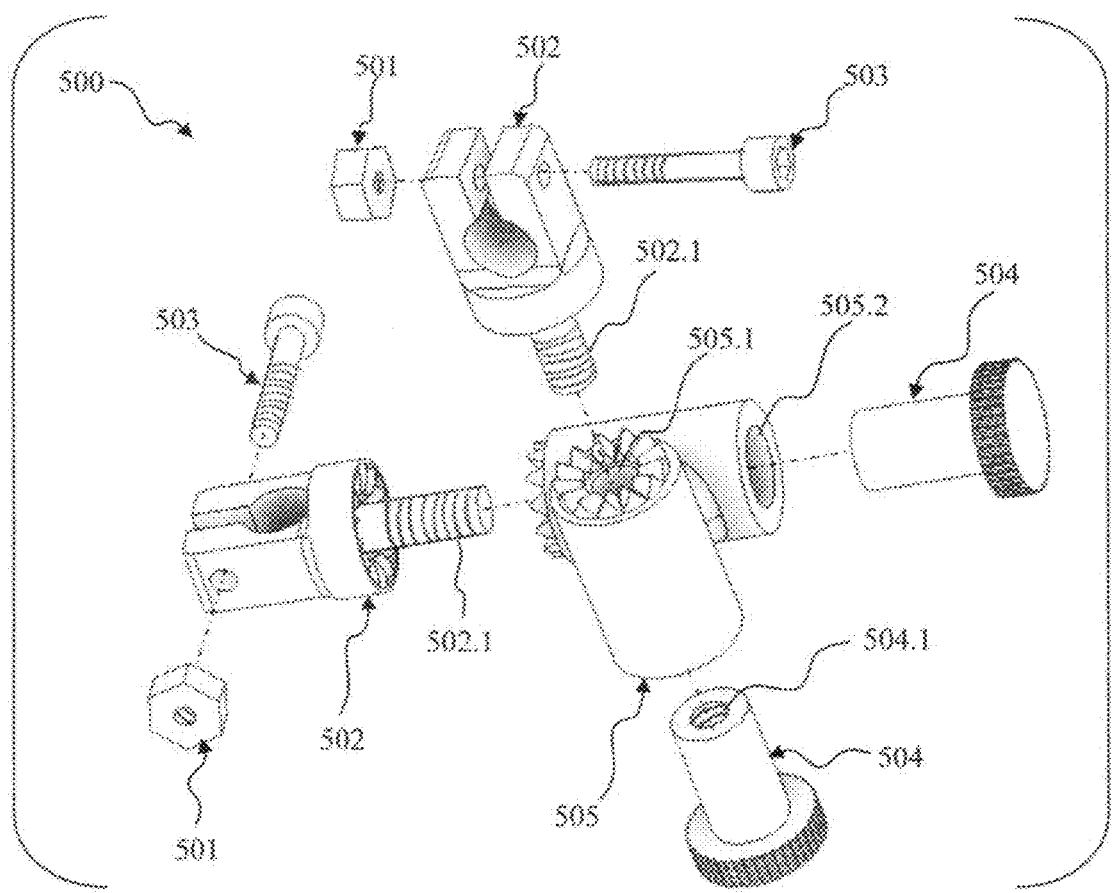
FIG. 19B Is an exploded view of the Multi-Pivot Finger Joint
Figure 19C:
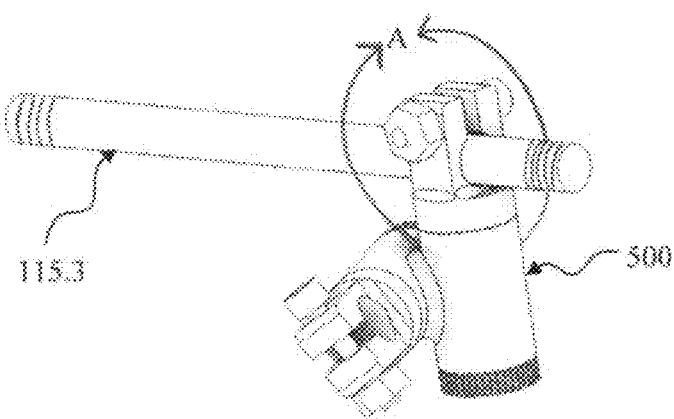
FIG. 19C Illustrates how the Multi-Pivot Finger Joint 500 and can rotate 360° around the Finger Rod.
Figure 19D:
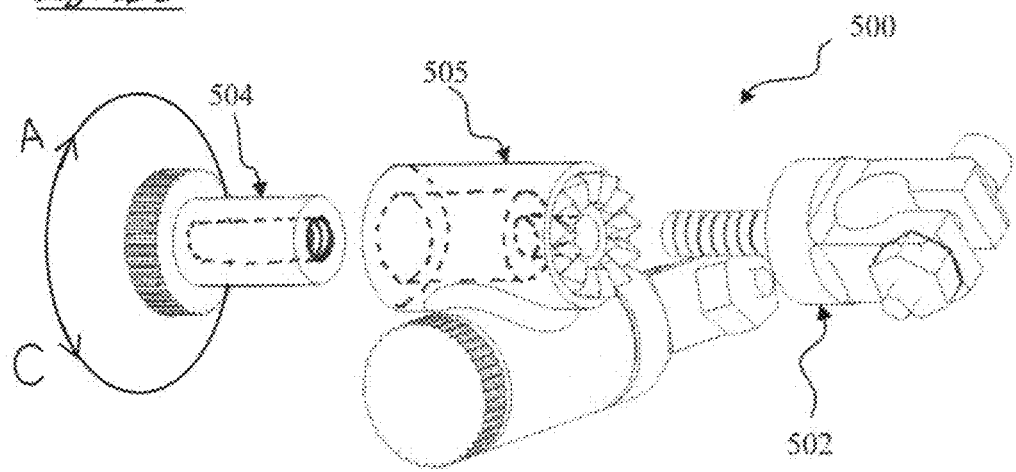
FIG. 19D Illustrates a transparent view of the Multi-Pivot Finger Joint 500 with one of its chambers disassembled.
Figure 19E:
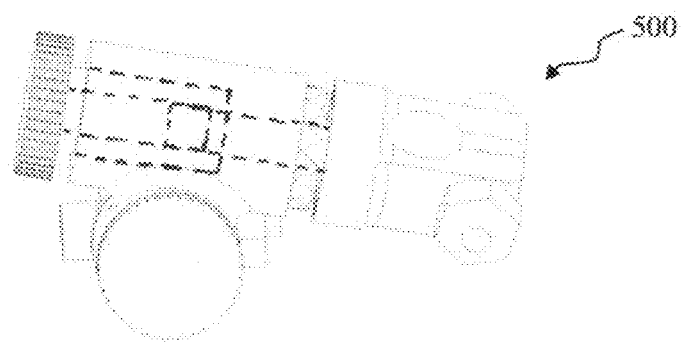
FIG. 19E Illustrates a transparent view of the Multi-Pivot Finger Joint 500 with one embodiment of the Rod-Clamp unlocked and free to rotate 360°
Figure 19F:
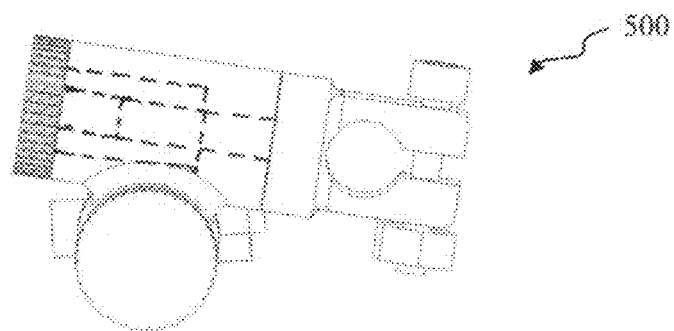
FIG. 19F Illustrates a transparent view of the Multi-Pivot Finger Joint 500 with the Rod-Clamp locked.

Referring back to FIG. 18B, it can be seen that the Multi-Pivot Finger Joint 500 joins the Upper Finger Rod 115.2 to the Lower Finger Rod 115.3. The Multi-Pivot Finger Joint 500 gives the Finger 115 the ability to conform itself to almost any shape or size of object that it needs to hold onto. FIG. 19A shows an enlarged view of the Multi-Pivot Finger Joint 500 and its main components namely the Main Chamber 505, two (2) Rod Clamps 502 and two (2) Clamp Rotation Locks 504. The Rod Clamps 502 secure the finger rods and can rotate 360° about the Main Chamber 505 as illustrated by arrow A in FIG. 19A. In addition the Rod Clamp 502 can rotate 360° around the attached finger rod itself as illustrated in FIG. 19C by arrow A. Effectively the Multi-Pivot Finger Joint 500 gives the Finger 115 the ability to position the two (2) finger rods in almost any position relative to each other. FIG. 19B shows an exploded view of the Multi-Pivot Finger Joint 500. The Main Chamber 505 consists of two identical cylinders joined at right angles. The Finger-Clamp Shaft 502.1 is inserted through the Main Chamber top hole 505.1 whilst the Clamp Rotation Lock 504 is inserted into the Main Chamber Bottom hole 505.2 where it engages the Finger-Clamp Shaft 502.1 where the shaft screws into the Shaft Hole 504.1 as illustrated in FIG. 19 D. Rotating the Clamp Rotation Lock 504 clockwise, illustrated by arrow C in FIG. 19D, pulls the Finger Clamp 502 onto the Main Chamber 505 which prevents the Finger Clamp 502 from rotating and so locking it in the set position as illustrated in FIG. 19E. In order for the Finger Clamp 502 to rotate freely, turn the Clamp Rotation Lock 504 anti-clockwise, as shown by arrow A in FIG. 19D, which pushes the Rod Clamp 502 off the Main Chamber 505 as shown in FIG. 19F. This process is repeated for the second cylinder of the Main Chamber 505. The Nut 501 and Bolt 503 secure the finger rods and can be replaced with any suitable quick lock mechanisms.

Referring back to FIG. 18B the Lower Finger Rod 115.3 is also secured into the Multi-Pivot Finger Joint 500. At the end of the Lower Finger Rod 115.3, the Finger End 115.5 is inserted onto the Lower Finger Shaft 115.3.1 and secured with a Nut 115.6 as shown in FIG. 18C. The unique construction of the Finger End 115.5 includes two (2) Finger Tips 115.5.3 which secure to the front of the attached object preventing the object from moving forward, a Seat 115.5.2 which sits on the rear of the attached object to prevent the object from moving backward, and two (2) Finger Arms 115.5.4 that keep the attached object from moving laterally as shown in FIG. 21B. In addition the Finger End 115.5 can rotate through 180° shown in FIG. 18B by arrow A, to position it in place for supporting objects where the object rests on the Seat 115.5.2 whilst the two (2) Finger Tips 115.5.3 together with the two (2) Finger Arms 115.5.4 keep the supported object in place as shown in FIG. 21D. On the open ends of both the Upper Finger Rod 115.2 and the Lower Finger Rod 115.3, a Rod Cap 115.4 is placed to secure the respective rods within the Multi-Pivot Finger Joint 500 as shown in FIG. 18B.

Mode of Operation

As mentioned previously, the Rail 20 can be Wall mounted, Desk mounted, or mounted on a Wheel base. Referring back to FIG. 5 (A-C) it can be seen how easily the Rail 20 can be wall mounted. Once the Top Wall Bracket 22 and the Bottom Wall Bracket 24 are secured to a wall, as in FIG. 5A, the Rail 20 can simply be slipped into the wall mounts by aligning the Rail Top-Mount 20.2 over the Top Wall Bracket 22 and the Rail Bottom-Mount 20.5 over the Bottom Wall-Mount 24, and sliding the Rail 20 down into the mounts as shown in FIG. 5B. Secure the Rail 20 in place by screwing in the Mount nut 23 as shown in FIG. 5C in the Rail Bottom-Mount 20.5 which is one possible way to secure the Rail 20. After inserting the Shoulder Brackets 40 on the Rail 20, the Rail Top-Cap 21 can be inserted through the Rail Top-Mount 20.2 and Top Wall-Mount Bracket 22 and secured in place using the Mount nut 23 as shown in FIG. 5C which helps to secure the Rail 20 to the wall brackets and to also prevent the Shoulder brackets from being removed from the Rail 20. To remove the Rail 20 from the wall mounts, remove the Mount Nuts 23 from the Bottom Wall Mount 24 and the Rail Top-Cap 21, remove the Rail Top-Cap 21 and slide the Rail 20 upward and then out as in FIG. 5B.

Figure 23A:
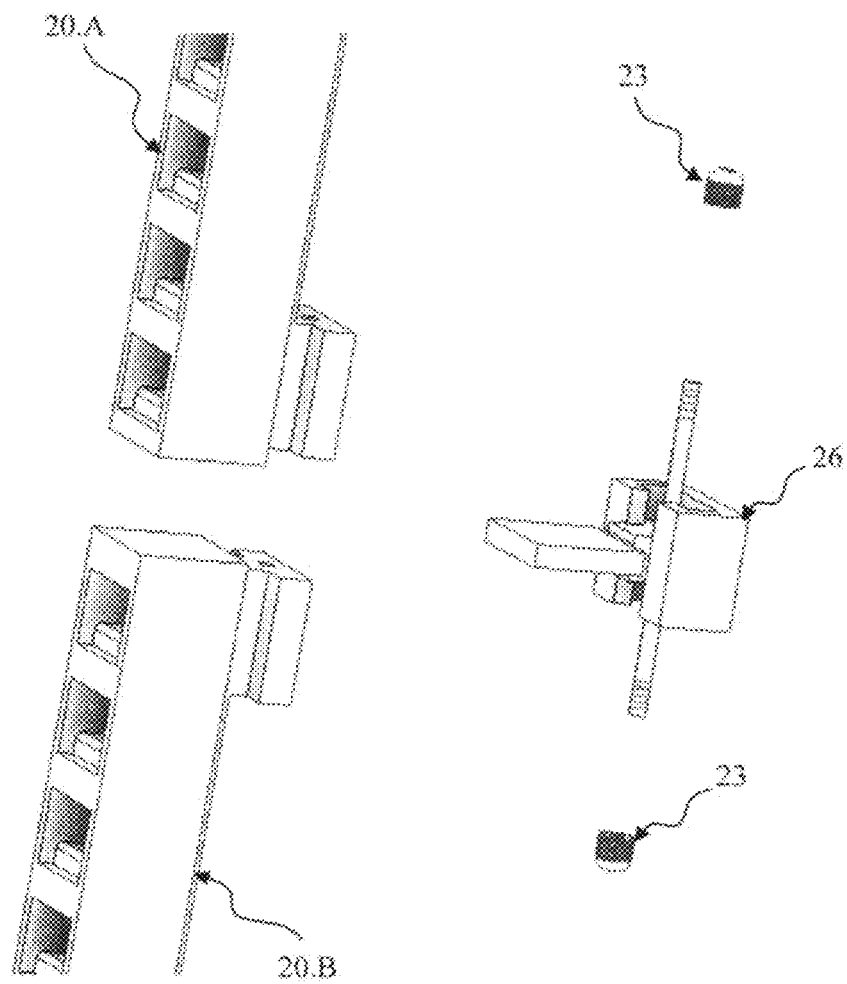
FIG. 23A Illustrates how two (2) Rails 20 can be joined using one embodiment of the Rail Joiner 26.
Figure 23B:
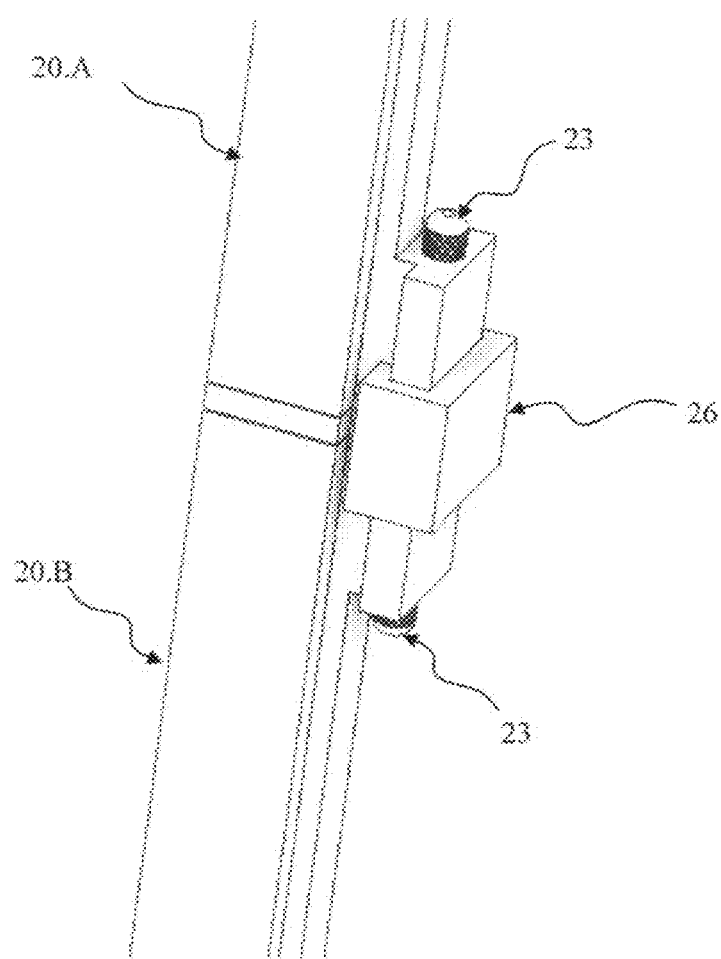
FIG. 23B Shows two (2) Rails 20 joined using the Rail Joiner 26.

An additional Rail 20 can be added to a mounted Rail 20 by removing the Rail Top-Cap 21 and using a Rail Joiner 26 as shown in FIG. 23(A-B). The Rail Joiner 26 is positioned between bottom Rail 20.B and the top Rail 20.A and is secured to both rails using two (2) Mount Nuts 23 as shown in FIG. 23B. An additional Top Wall Bracket 22 will be required to secure the top of the added Rail 20, and the Rail Top-Cap 21 is now secured to the top of the added Rail. Additional Rails 20 can be added in this same manner.

To Desk mount the Rail 20 first secure the Desktop Mount 25 onto the respective surface by rotating the Clamp Vice 27.1 clockwise until it can't turn anymore as shown by Arrow A in FIG. 5E. Align the Rail 20 with the Desktop Mount 25 as shown in FIG. 5G and push the Rail 20 down into the Mount Port 26.1 after which the displaced Lever-Shaft 25.3.1 will snap back into the Rail Slot 20.6 securing the Rail 20 in position as shown in FIG. 5H. To rotate the mounted Rail 20 turn the Rotation Clamp 28 anti-clockwise and rotate the Rail 20 as required, after which, turn the Rotation Clamp 28 clockwise until tightened to prevent further rotation.

To mount the Rail 20 in the Wheel Mount 30, extend the Lower Legs 32.2 out of the Upper Leg 32.1 and rotate legs up as shown by arrow D in FIG. 5K so that they form a cone shape. Once fully extended, lock the Wheels 34 and insert the Rail 20 into the Mount Port 31.2 as shown in FIG. 5J and push the Rail 20 down into the Mount Port 31.2 after which the Lock Lever 35 will snap back into the Rail Slot 20.6 securing the Rail 20 in position as shown in FIG. 5K. Unlock the Wheels 34 to move the Workstation if required. Referring to FIG. 5L, the Wheel Base 32 can be folded, for storage or geographic portability, by retracting the Lower Legs 32.2 into the Upper Legs 32.1 as shown by arrow B in FIG. 5K and rotating the legs down about the Base Joint 32.3 as shown by arrow D in FIG. 5K.

Once the Rail 20 is mounted, Arms can be attached. The Arm 200 is the part of the workstation that attaches objects to the Workstation 1 and allows objects to be placed in almost any dimensional space and provides a number of features that are customizable depending on the requirement.

The Arm 200 can be assembled with the Shoulder Bracket 40 prior to inserting onto the Rail 20, or the Shoulder Bracket 40 can be added first to the Rail 20 and the rest of the Arm 200 attached to the Shoulder Bracket 40 after, or the Hand 120 can be separated from the Arm 200 and attached to the object, while the rest of the Arm 200 is attached to the Rail 20 after which both are connected together. This hot swappable feature enables easily attaching objects to the Workstation 1 and allows for multiple Shoulder Brackets 40 to reside on the Rail 20 and be utilized whenever needed by simply attaching the rest of the Arm 200 to the respective Shoulder Bracket 40.

Figure 22A:
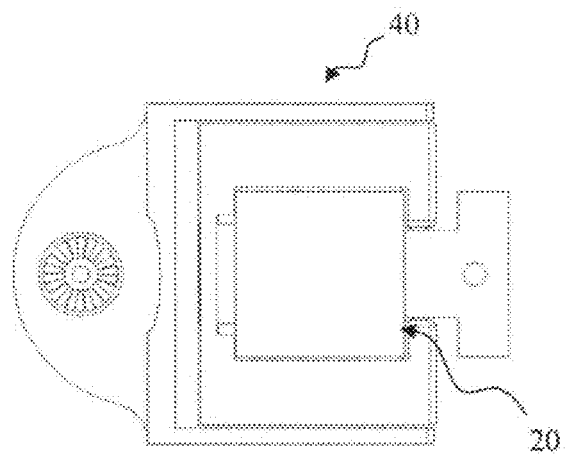
FIG. 22A Is a top view of the aligning of the Shoulder Bracket 40 with the Rail 20
Figure 22B:
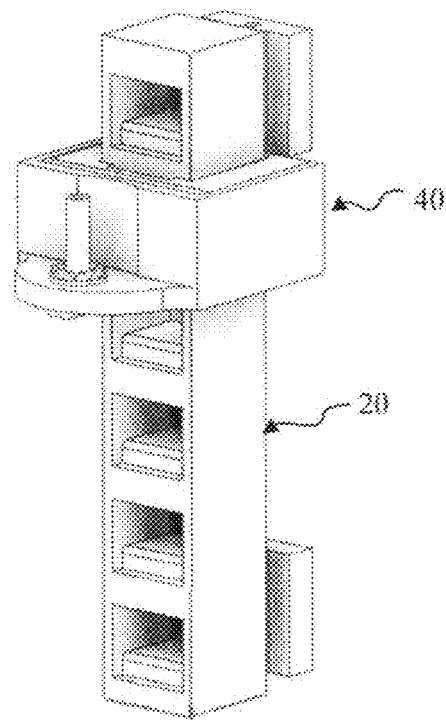
FIG. 22B Shows the Shoulder Bracket 40 secured to the Rail 20
Figure 22F:
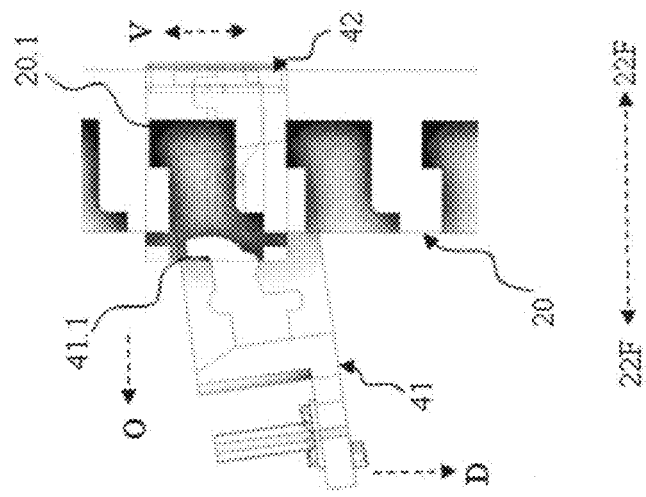
FIG. 22F Is a sectional view the Shoulder Bracket 40, disengage from the Rail 20, and so able to move freely along the Rail 20.
Figure 22E:
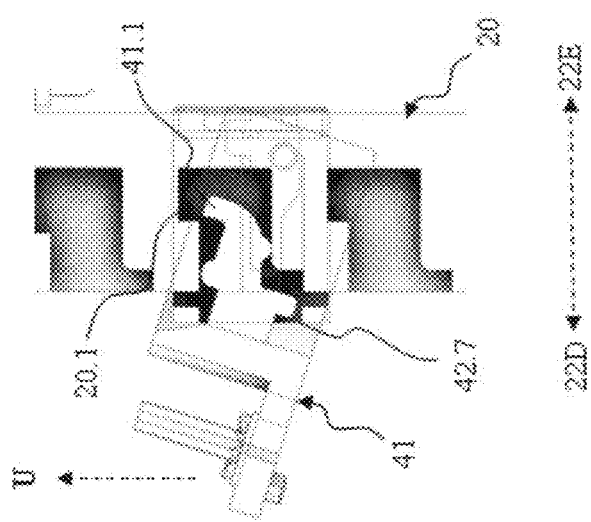
FIG. 22E Is a sectional view of the Shoulder Bracket 40 lifted to disengage from the Rail Port 20.1.
Figure 22D:
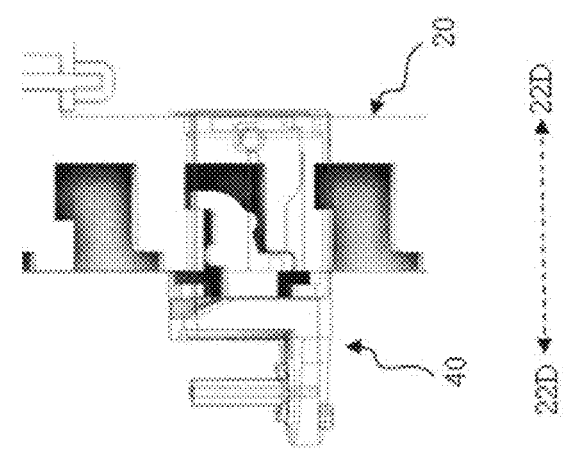
FIG. 22C Is a sectional view of Shoulder Bracket 40 secured to the Rail 20 highlighting the locking points L FIG. 22D Is a sectional view of the Shoulder Bracket docked in the Rail 20

The Shoulder Bracket 40 can be mounted onto the Rail 20 by itself or as the entire Arm 200. With the Arm 200, the Upper Arm 60 can be used as a handle to easily manipulate the motions of the Shoulder Bracket 40 when positioning on the Rail 20. The Shoulder Bracket 40 is positioned on the Rail 20 by aligning the Shoulder Bracket 40 with the top of the Rail 20 as shown in FIG. 22A and sliding the Shoulder Bracket 40 down into the Rail 20 as seen in FIG. 22B. As the Rail Insert 41.1 makes contact with the Rail 20 it will need to be retracted from within the Inner Shoulder Bracket 42 so that the Shoulder Bracket 40 can move freely along the Rail 20. FIG. 22(D-F) illustrates the motion to retract the Rail Insert 41.1 from the Rail Port 20.1 which allows the Shoulder Bracket 40 to move along the Rail 20. At rest the Shoulder Bracket 40 is positioned as shown in FIG. 22D. Referring to FIG. 22E the Outer shoulder Bracket 41 first needs to be lift as indicated by directional arrow U, which drops the Rail Insert 41.1 allowing it to move out off the Rail 20 if docked, and through the Bracket Window 42.7. Referring to FIG. 22F, pull the Outer shoulder Bracket 41 forward as far as it can go in direction O, and then push it down in direction D which retracts the Rail Insert 41.1 from the Rail Port 20.1 and allowing the Inner Shoulder Bracket 42 to be moved along the Rail 20 in direction V as required. Once in position, reverse the above process to insert the Rail Insert 41.1 into the Rail Port 20.1. Retracting the Rail Insert 41.1 as above compresses the Compression Springs 45 creating a resistance force which helps the Rail Insert 41.1 to recede back into the Rail Port 20.1 when released. The expanding Compression Springs push the Spring Blocks 44 back towards the rear of the Inner Shoulder Bracket track 42.5 which will help to pull the Outer Shoulder Bracket 41 into the Rail Port 20.1. Referring to sectional view FIG. 22C, after the Outer shoulder Bracket 41 has receded into the Rail 20 and can move no further, drop the Outer Shoulder Bracket 41 which will position Rail Insert 41.1 in the locked position inside the Rail Port 20.1 locking the Shoulder Bracket 40 into the Rail Port 20.1 where it is kept in position by the weight of the Outer Shoulder Bracket 41 acting downward which engages the two (2) lock points L that secure the Shoulder Bracket 40 onto the Rail 20. FIG. 22B illustrates a Shoulder Bracket 40 securely attached to the Rail 20.

Once the Arm 200 is secured onto the Rail 20 it can be positioned horizontally in numerous configurations based on three (3) pivot points which allows attached objects to be placed in any horizontal space relative to the Rail 20. These pivot points include the attachment of the Upper Arm 60 on the Shoulder Bracket Shaft 41.3 which provides a 180° rotation as shown by arrow A in FIG. 9A, the attachment between the Upper Arm 60 and the Lower Arm 80 which provides a 360° rotation as shown by arrow A in FIG. 13A, and the attachment between the Lower Arm 80 and the Wrist 100 which also gives a 360° rotation as shown by arrow A in FIG. 15B.

The Vertical adjustment of the Arm 200 can be adjusted by moving the Arm 200 up or down the Rail as described previously, and titling the Lower Arm 80 through a 180° vertical rotation as shown in FIG. 13A by direction arrow V. In addition to this vertical rotation, the attached object can be tilted through a 180° vertical angle by adjusting the Wrist 100 which allows the Arm 200 to position attached objects vertically as shown in FIG. 14D. The Arm 200 also has the ability to change the orientation of the attached object by rotating the Palm 110 in the Wrist 100 as illustrated by arrow A in FIG. 17B, which is useful for rotating horizontally attached objects such as keyboards or desktop surfaces or to switch vertically attached object such as a monitor or canvas from portrait to landscape, and once in position, lock with the Quick-Lock 300 which will compress the Wrist 100 to the Palm 110.

All horizontal and vertical rotations are controlled by Quick Locks 300 and are independent of each other. Once objects are not in use, they can easily be horizontally, and if necessary, vertically rotated, out of the current space they consume and prevent anyone from accidentally running into them as shown in FIG. 2.

The tilting or rotation of the Wrist 100 controls the positioning of the Hand 120 and attached object.

Figure 20:
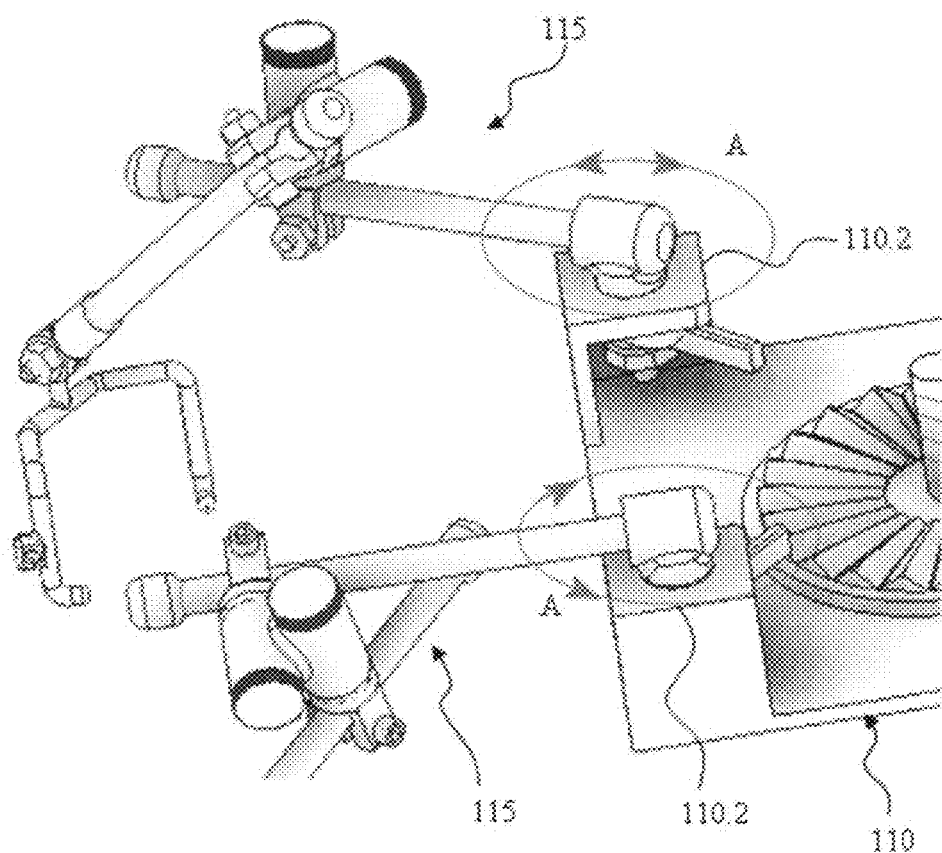
FIG. 20 Is a partial view of the Finger 115 connected to the Palm 110 highlighting the 360° horizontal rotation of the Finger 115.

The four (4) Fingers 115 allow the Arm 200 to clasp or support almost any object. Each Finger 115 has the ability to rotate 360° about its connection to the Palm 110 independently of each other as shown in FIG. 20. In addition, the Upper Finger Rod 115.2 and the Lower Finger Rod 115.3 can be extended or retracted within the Multi-Pivot Finger Joint 500 to facilitate objects of different sizes, see FIG. 18B. The Multi-Pivot Finger Joint 500 can be manipulated to position the finger rods in any position relative to each other which gives the Fingers 115 the ability to wrap around objects that are not flat, or irregular in shape. The Finger End 115.5 serves two purposes, namely to clasp objects as shown in FIG. 21(A-B) or to support objects as shown in FIG. 21(C-D), which it accomplishes by simply rotating the Lower Finger Rod 115.3 180° inside the Multi-Pivot Finger Joint Rod Clamp 502 and rotating the Finger End 115.5 180° about the Lower Finger Shaft 115.3.1. Once in position, tighten with bolt 115.6. as shown in FIG. 18C. Referring back to FIG. 18B, each Finger End 115.5 has two (2) Tension Band Holders 115.5.1 which can hold an optional elastic band that can be used to apply pressure against the front or rear of attached objects to help keep the objects in place.

The invention claimed is:
1. A workstation, comprising:
a rail having an elongated rectangular shape, the rail including a plurality of ports defined therein and a wheel track extending outward from, and along the length of, a rear surface thereof, each of the plurality of ports including an L-shaped cavity and having an upper lip extending downward from an upper portion thereof and a notch defined in a lower portion thereof;
at least one support arm connected to the rail for supporting a plurality of different components; and
a mounting interface connected to the rail for mounting the rail to a wall mount, desktop mount, or wheel mount;

wherein the mounting interface includes: a rail top mount connected to an upper portion of the wheel track of the rail, the rail top mount including a top mount hole defined therein, the top mount hole extending from a top edge of the rail top mount to a bottom edge of the top rail mount, the top mount hole and the upper portion of the wheel track positioned in, and extending along, two different but parallel planes;

wherein: the mounting interface includes a rail bottom mount connected to a lower portion of the wheel track of the rail, the rail bottom mount including a bottom mount hole and a rail hole defined therein, the bottom mount hole extending from a top edge of the rail bottom mount to a bottom edge of the rail bottom mount, the rail hole defined in a side portion of the rail bottom mount and extending partially through the rail bottom mount.

2. The workstation of claim 1, wherein:
the bottom mount hole and the lower portion of the wheel track positioned in, and extending along, two different but parallel planes, the bottom mount hole and the rail hole positioned in the same plane but extending perpendicularly with respect to each other; and
the rail top and bottom mounts each having a flat rectangular shape.

3. The workstation of claim 2, wherein:
the wall mount is connected to the mounting interface; and
the wall mount includes
a rail top cap having a base and an elongated partially threaded bolt extending perpendicularly outward therefrom, the base having a base opening sized to receive a top portion of the rail top mount and a portion of the wheel track located adjacent to the top portion of the rail top mount;
a top wall mount bracket having a bracket opening sized to receive a lower portion of the rail top mount and a portion of the wheel track located adjacent to the rail top mount; and
a bottom wall mount bracket having a bracket base and an elongated partially threaded bolt extending perpendicularly outward therefrom, the bracket base having a bracket base opening sized to receive a bottom portion of the rail bottom mount and a portion of the wheel track located adjacent to the bottom portion of the rail bottom mount.

4. The workstation of claim 2, wherein:
the desktop mount is connected to the mounting interface;
the desktop mount includes a docking port sized to receive a lower portion of the rail and a lower portion of the rail bottom mount, a mounting bolt disposed within the docking port for guiding the rail into the docking port, a locking assembly having a shaft feature mounted on the side of the docking port, and a clamp assembly rotatably connected to the docking port;
the lower portion of the rail and the lower portion of the rail bottom port are disposed within the docking port;
the mounting bolt is disposed within the bottom mount hole included in the rail bottom mount; and
the shaft feature is disposed within the rail hole included in the rail bottom mount.

5. The workstation of claim 2, wherein:
the wheel mount is connected to the mounting interface and includes a plurality of foldable legs;
the wheel mount includes a mount port sized to receive a lower portion of the rail and a lower portion of the rail bottom mount, a mounting bolt disposed within the mount port for guiding the rail into the docking port, a locking assembly having a shaft feature mounted on the side of the mount port, and a wheel assembly adjustably connected to the mount port so that the height of the wheel mount can be increased and decreased;
the lower portion of the rail and the lower portion of the rail bottom port are disposed within the mount port;
the mounting bolt is disposed within the bottom mount hole included in the rail bottom mount; and
the shaft feature is disposed within the rail hole included in the rail bottom mount.

6. The workstation of claim 2, further comprising a second rail connected to the rail using a rail joiner, the rail joiner including an upper docking port and an upper bolt partially disposed within and extending perpendicularly outward from the upper docking port, a lower docking port and a lower bolt partially disposed within and extending perpendicularly outward from the lower docking port, and a rail separator extending perpendicularly outward from the rail joiner between the upper and lower docking ports.

7. A workstation, comprising:
a rail;
a support arm for supporting a plurality of different components, the support arm including a plurality of rotatable and lockable joints;
connecting means for connecting the support arm to the rail in a plurality of different positions along the rail;
moving means for moving the support arm up and down the rail; rotating means for horizontally rotating the support arm with respect to the rail;
locking means for locking the support arm in a plurality of different positions with respect to the rail; and
mounting means for mounting the rail to a wall mount, desktop mount, or wheel mount;
wherein the connecting means includes a plurality of docking ports defined in the rail, each of the plurality of ports including an L-shaped cavity and having an upper lip extending downward from an upper portion thereof and a notch defined in a lower portion thereof; and a shoulder bracket included with the support arm, the shoulder bracket including a rail insert that can be inserted into any one of the plurality of docking ports and used to secure the shoulder bracket in place;
wherein the moving means includes a wheel track defined in a rear surface of the rail and a pair of wheels included in the shoulder bracket; an inner shoulder bracket included in the shoulder bracket for containing the shoulder bracket about the rail and moving the shoulder bracket along the rail; and
the connecting means further includes an outer shoulder bracket included in the shoulder bracket and slidably joined to the inner shoulder bracket for connecting the support arm to the rail.

8. The workstation of claim 7, wherein the rotating means includes an upper arm joint included in the support arm and a bracket shaft included with the shoulder bracket, the bracket shaft disposed within the upper arm joint, and the bracket shaft and upper arm joint rotatably secured together using a joint bolt.

9. The workstation of claim 8, wherein:
the locking means includes a teethed interface extending outward from the upper arm joint, a teethed interface extending outward from the shoulder bracket adjacent to the bracket shaft, a locking mound extending outward from a lower external surface of the shoulder bracket, and a locking handle connected to the joint bolt adjacent to the locking mound;

when the locking handle is moved to a locked position, the locking handle engages with the locking mound and the teethed interface of the upper arm joint engages with the teethed interface of the shoulder bracket and prevents the support arm from rotating with respect to the shoulder bracket; and when the locking handle is moved to an unlocked position, the locking handle disengages from the locking mound and the teethed interface of the upper arm joint disengages from the teethed interface of the shoulder bracket and allows the upper arm to rotate with respect to the shoulder bracket.

10. The workstation of claim 9, wherein the mounting means includes a rail bottom mount connected to a lower portion of the wheel track of the rail, the rail bottom mount including a bottom mount hole and a rail hole defined therein, the bottom mount hole extending from a top edge of the rail bottom mount to a bottom edge of the rail bottom mount, the rail hole defined in a side portion of the rail bottom mount and extending partially through the rail bottom mount, the bottom mount hole and the lower portion of the wheel track positioned in, and extending along, two different but parallel planes, and the bottom mount hole and the rail hole positioned in the same plane but extending perpendicularly with respect to each other.

11. A workstation, comprising:

a rail;

a support arm connected to the rail for supporting a plurality of different components, the support arm including a shoulder bracket connected to the rail, an upper arm connected to the shoulder bracket so that the upper arm can be rotated horizontally and locked in a plurality of different positions with respect to the shoulder bracket, a lower arm connected to the upper arm so that the lower arm can be rotated horizontally and vertically and locked in a plurality of different horizontal and vertical positions with respect to the upper arm, a wrist connected to the lower arm so that the wrist can be rotated horizontally and vertically and locked in a plurality of different horizontal and vertical positions with respect to the lower arm, a palm connected to the wrist so that the palm can be rotated and locked in a plurality of different positions with respect to the wrist, and a plurality of fingers connected to the palm so that each of the plurality of fingers can be rotated and locked in a plurality of different positions with respect to the palm; and a mounting interface connected to the rail for mounting the rail to a wall mount, desktop mount, or wheel mount;

wherein the shoulder bracket includes a bracket shaft extending outward from an upper surface, a teethed interface extending outward from the upper surface adjacent to and encircling the bracket shaft, and a locking mound extending outward from a lower surface.

12. The workstation of claim 11, wherein:

the upper arm includes an upper arm joint connected to an upper arm rod, the upper arm joint including a joint bolt opening defined therein and a teethed interface extending outward from an external surface of the upper arm joint adjacent to the joint bolt opening; the bracket shaft of the shoulder bracket is disposed within the joint bolt opening; the teethed interface on the shoulder bracket is positioned adjacent to the teethed interface of the upper arm joint; a joint bolt extends through the bracket shaft and the joint bolt opening and is connected to a locking handle positioned adjacent to the locking mound; when the locking handle is moved to a locked position, the teethed interface on the shoulder bracket engages with the teethed interface on the upper arm joint, the locking handle engages with the locking mound, and the upper arm is locked in place with respect to the shoulder bracket; and when the locking handle is moved to an unlocked position, the teethed interface on the shoulder bracket disengages from the teethed interface on the upper arm joint, the locking handle disengages from the locking mound, and the upper arm is free to rotate with respect to the shoulder bracket.

13. The workstation of claim 12, wherein:

the lower arm includes two lower arm rods, a multipivot joint component connected to one end of the two lower arms, a rod connector connected to an opposite end of the two lower arm rods, and an arm support spring connected to the multipivot joint component and the rod connector; and the multipivot joint component includes a center bracket rotatably connected to the upper arm and left and right rod holders rotatably connected to the center bracket, the two lower arm rods slidably connected to the multipivot joint component using the left and right rod holders.

14. The workstation of claim 13, wherein:

the wrist includes a multipivot joint component rotatably connected to the lower arm and a palm rotator connected to the multipivot joint component, the palm rotator including a a disk having a teethed interface defined on one side and two rotator shafts extending perpendicularly outward from an opposite side and slidably connected to the multipivot joint component; and the palm includes a plate having a substantially flat surface defined on one side and palm shaft, teethed interface, and four finger docking ports defined on an opposite side, the palm shaft extending perpendicularly outward from a center portion of the plate and the four finger docking ports extending perpendicularly outward from each corner of the plate, and the teethed interface encircling the palm shaft.

15. The workstation of claim 14, wherein at least one of the plurality of fingers includes a knuckle joint rotatably connected to the palm using one of the finger docking ports, an upper finger rod connected to the knuckle joint, a lower finger rod connected to the upper finger rod using a multipivot finger joint component, and a finger end rotatably connected to the lower finger rod, the multipivot finger joint component including a main chamber and two rod clamps connected to the main chamber so that the two rod clamps can be rotated and locked in a plurality of different positions with respect to the main chamber, the lower finger rod slidably connected to one of the two rod clamps and the upper finger rod slidably connected to the other of the two rod clamps.

16. The workstation of claim 15, wherein the mounting interface includes a rail bottom mount connected to a lower portion of the wheel track of the rail, the rail bottom mount including a bottom mount hole and a rail hole defined therein, the bottom mount hole extending from a top edge of the rail bottom mount to a bottom edge of the rail bottom mount, the rail hole defined in a side portion of the rail bottom mount and extending partially through the rail bottom mount, the bottom mount hole and the lower portion of the wheel track positioned in, and extending along, two different but parallel planes, and the bottom mount hole and the rail hole positioned in the same plane but extending perpendicularly with respect to each other.

* * * * *